(12) United States Patent
Abramov

(10) Patent No.: US 8,011,274 B2
(45) Date of Patent: Sep. 6, 2011

(54) GEAR BOX APPARATUS

(76) Inventor: Vladimir Abramov, Burnsville, MN (US)

(*) Notice: Subject to any disclaimer, the term of this patent is extended or adjusted under 35 U.S.C. 154(b) by 902 days.

(21) Appl. No.: 11/895,672

(22) Filed: Aug. 27, 2007

(65) Prior Publication Data

US 2008/0047380 A1    Feb. 28, 2008

Related U.S. Application Data

(60) Provisional application No. 60/840,665, filed on Aug. 28, 2006.

(51) Int. Cl.
*F16H 3/02* (2006.01)
(52) U.S. Cl. .......................................... 74/745
(58) Field of Classification Search .................. None
See application file for complete search history.

(56) References Cited

U.S. PATENT DOCUMENTS

| | | | |
|---|---|---|---|
| 3,916,714 A | 11/1975 | Sisson et al. | |
| 4,145,935 A | 3/1979 | Herlitzek | |
| 4,245,519 A | 1/1981 | Herlitzek | |
| 4,341,127 A | 7/1982 | Stodt | |
| 4,392,391 A | 7/1983 | Jameson et al. | |
| 4,549,443 A | 10/1985 | White | |
| 4,577,529 A | 3/1986 | Romi | |
| 4,614,133 A * | 9/1986 | Nerstad et al. | 475/218 |
| 4,637,269 A | 1/1987 | Hasegawa et al. | |
| 4,726,246 A | 2/1988 | Whalen | |
| 4,823,639 A | 4/1989 | Krause et al. | |
| 4,876,924 A * | 10/1989 | Fletcher et al. | 74/745 |
| 5,117,702 A * | 6/1992 | Rodeghiero et al. | 74/359 |
| 5,249,475 A | 10/1993 | McAskill | |
| 5,251,132 A | 10/1993 | Bulgrien | |
| 5,471,892 A | 12/1995 | Sherman | |
| 5,557,978 A | 9/1996 | McAskill | |
| 5,927,145 A | 7/1999 | Ahluwalia et al. | |
| 6,190,280 B1 * | 2/2001 | Horsch | 475/209 |
| 6,244,123 B1 | 6/2001 | Hegerath et al. | |
| 6,709,356 B2 * | 3/2004 | Fuhrer et al. | 475/207 |
| 6,889,131 B2 * | 5/2005 | Razzacki | 701/55 |
| 7,191,676 B2 | 3/2007 | Abramov | |
| 6,827,666 B2 | 12/2007 | Razzacki | |

* cited by examiner

*Primary Examiner* — Dirk Wright
(74) *Attorney, Agent, or Firm* — William R. Berggren

(57) ABSTRACT

A motorized machine with a "mutually definite units of energy for forced energy economy" (MDUFEE) gearbox family with a simplified shifting pattern of shifting mechanisms to cause a real gear dependence on mechanical inertia created by the weight of a load and a fast changeable resistant force in response to the movement. Each gearbox includes a sufficient number of gearsets with gear ratios selected from a faltering geometric sequence and arranged to provide a sufficient number of torques and overdrive speeds to the output shaft to satisfactorily operate the machine over a conventional range of machine speeds and at least limit the use of the acceleration system in the motor to reduce the heat and power generated from a the motor to less than 50 percent that used to generate a similar conventional range of machine speeds using a motor with a conventional gear box.

24 Claims, 50 Drawing Sheets

FIG. 1A-A
COMBINATIONS OF ENGAGABLE PINIONS

| For-ward speeds | Gearbox of 8X8 & 64 forward and 8 reverse speeds by 34 gears | | Gearbox of 7X8 & 56 forward and 7 reverse speeds by 32 gears | | Gearbox of 7X7 & 49 forward and 7 reverse speeds by 30 gears | | Gearbox of 6X7 & 42 forward and 6 reverse speeds by 28 gears | | Gearbox of 6X6 & 36 forward and 6 reverse speeds by 26 gears | | Gearbox of 5X6 & 30 forward and 5 reverse speeds by 24 gears | | Gearbox of 5X5 & 25 forward and 5 reverse speeds by 22 gears | |
|---|---|---|---|---|---|---|---|---|---|---|---|---|---|---|
| | A | B | A | B | A | B | A | B | A | B | A | B | A | B |
| 1 | 128 | 115 | 128 | 114 | 136 | 114 | 136 | 113 | 137 | 113 | 137 | 112 | 138 | 112 |
| 2 | 136 | 115 | 136 | 114 | 137 | 114 | 137 | 113 | 138 | 113 | 138 | 112 | 139 | 112 |
| 3 | 137 | 115 | 137 | 114 | 138 | 114 | 138 | 113 | 139 | 113 | 139 | 112 | 140 | 112 |
| 4 | 138 | 115 | 138 | 114 | 139 | 114 | 139 | 113 | 140 | 113 | 140 | 112 | 141 | 112 |
| 5 | 139 | 115 | 139 | 114 | 140 | 114 | 140 | 113 | 141 | 113 | 141 | 112 | 142 | 112 |
| 6 | 140 | 115 | 140 | 114 | 141 | 114 | 141 | 113 | 142 | 113 | 142 | 112 | 138 | 111 |
| 7 | 141 | 115 | 141 | 114 | 142 | 114 | 142 | 113 | 137 | 112 | 137 | 111 | 139 | 111 |
| 8 | 142 | 115 | 142 | 114 | 136 | 113 | 136 | 112 | 138 | 112 | 138 | 111 | 140 | 111 |
| 9 | 128 | 114 | 128 | 113 | 137 | 113 | 137 | 112 | 139 | 112 | 139 | 111 | 141 | 111 |
| 10 | 136 | 114 | 136 | 113 | 138 | 113 | 138 | 112 | 140 | 112 | 140 | 111 | 142 | 111 |
| 11 | 137 | 114 | 137 | 113 | 139 | 113 | 139 | 112 | 141 | 112 | 141 | 111 | 138 | 110 |
| 12 | 138 | 114 | 138 | 113 | 140 | 113 | 140 | 112 | 142 | 112 | 142 | 111 | 139 | 110 |
| 13 | 139 | 114 | 139 | 113 | 141 | 113 | 141 | 112 | 137 | 111 | 137 | 110 | 140 | 110 |
| 14 | 140 | 114 | 140 | 113 | 142 | 113 | 142 | 112 | 138 | 111 | 138 | 110 | 141 | 110 |
| 15 | 141 | 114 | 141 | 113 | 136 | 112 | 136 | 111 | 139 | 111 | 139 | 110 | 142 | 110 |
| 16 | 142 | 114 | 142 | 113 | 137 | 112 | 137 | 111 | 140 | 111 | 140 | 110 | 138 | 109 |
| 17 | 128 | 113 | 128 | 112 | 138 | 112 | 138 | 111 | 141 | 111 | 141 | 110 | 139 | 109 |
| 18 | 136 | 113 | 136 | 112 | 139 | 112 | 139 | 111 | 142 | 111 | 142 | 110 | 140 | 109 |
| 19 | 137 | 113 | 137 | 112 | 140 | 112 | 140 | 111 | 137 | 110 | 137 | 109 | 141 | 109 |
| 20 | 138 | 113 | 138 | 112 | 141 | 112 | 141 | 111 | 138 | 110 | 138 | 109 | 142 | 109 |
| 21 | 139 | 113 | 139 | 112 | 142 | 112 | 142 | 111 | 139 | 110 | 139 | 109 | 138 | 108 |
| 22 | 140 | 113 | 140 | 112 | 136 | 111 | 136 | 110 | 140 | 110 | 140 | 109 | 139 | 108 |
| 23 | 141 | 113 | 141 | 112 | 137 | 111 | 137 | 110 | 141 | 110 | 141 | 109 | 140 | 108 |
| 24 | 142 | 113 | 142 | 112 | 138 | 111 | 138 | 110 | 142 | 110 | 142 | 109 | 141 | 108 |
| 25 | 128 | 112 | 128 | 111 | 139 | 111 | 139 | 110 | 137 | 109 | 137 | 108 | 142 | 108 |
| 26 | 136 | 112 | 136 | 111 | 140 | 111 | 140 | 110 | 138 | 109 | 138 | 108 | | |
| 27 | 137 | 112 | 137 | 111 | 141 | 111 | 141 | 110 | 139 | 109 | 139 | 108 | | |
| 28 | 138 | 112 | 138 | 111 | 142 | 111 | 142 | 110 | 140 | 109 | 140 | 108 | | |
| 29 | 139 | 112 | 139 | 111 | 136 | 111 | 136 | 109 | 141 | 109 | 141 | 108 | | |
| 30 | 140 | 112 | 140 | 111 | 137 | 110 | 137 | 109 | 142 | 109 | 142 | 108 | | |
| 31 | 141 | 112 | 141 | 111 | 138 | 110 | 138 | 109 | 137 | 108 | | | | |
| 32 | 142 | 112 | 142 | 111 | 139 | 110 | 139 | 109 | 138 | 108 | | | | |
| 33 | 128 | 111 | 128 | 110 | 140 | 110 | 140 | 109 | 139 | 108 | | | | |
| 34 | 136 | 111 | 136 | 110 | 141 | 110 | 141 | 109 | 140 | 108 | | | | |
| 35 | 137 | 111 | 137 | 110 | 142 | 110 | 142 | 109 | 141 | 108 | | | | |

FIG. 1A-B

| 36 | 138 | 111 | 138 | 110 | 136 | 109 | 136 | 108 | 142 | 108 | | | | |
|----|-----|-----|-----|-----|-----|-----|-----|-----|-----|-----|---|---|---|---|
| 37 | 139 | 111 | 139 | 110 | 137 | 109 | 137 | 108 | | | | | | |
| 38 | 140 | 111 | 140 | 110 | 138 | 109 | 138 | 108 | | | | | | |
| 39 | 141 | 111 | 141 | 110 | 139 | 109 | 139 | 108 | | | | | | |
| 40 | 142 | 111 | 142 | 110 | 140 | 109 | 140 | 108 | | | | | | |
| 41 | 128 | 110 | 128 | 109 | 141 | 109 | 141 | 108 | | | | | | |
| 42 | 136 | 110 | 136 | 109 | 142 | 109 | 142 | 108 | | | | | | |
| 43 | 137 | 110 | 137 | 109 | 136 | 108 | | | | | | | | |
| 44 | 138 | 110 | 138 | 109 | 137 | 108 | | | | | | | | |
| 45 | 139 | 110 | 139 | 109 | 138 | 108 | | | | | | | | |
| 46 | 140 | 110 | 140 | 109 | 139 | 108 | | | | | | | | |
| 47 | 141 | 110 | 141 | 109 | 140 | 108 | | | | | | | | |
| 48 | 142 | 110 | 142 | 109 | 141 | 108 | | | | | | | | |
| 49 | 128 | 109 | 128 | 108 | 142 | 108 | | | | | | | | |
| 50 | 136 | 109 | 136 | 108 | | | | | | | | | | |
| 51 | 137 | 109 | 137 | 108 | | | | | | | | | | |
| 52 | 138 | 109 | 138 | 108 | | | | | | | | | | |
| 53 | 139 | 109 | 139 | 108 | | | | | | | | | | |
| 54 | 140 | 109 | 140 | 108 | | | | | | | | | | |
| 55 | 141 | 109 | 141 | 108 | | | | | | | | | | |
| 56 | 142 | 109 | 142 | 108 | | | | | | | | | | |
| 57 | 128 | 108 | | | | | | | | | | | | |
| 58 | 136 | 108 | | | | | | | | | | | | |
| 59 | 137 | 108 | | | | | | | | | | | | |
| 60 | 138 | 108 | | | | | | | | | | | | |
| 61 | 139 | 108 | | | | | | | | | | | | |
| 62 | 140 | 108 | | | | | | | | | | | | |
| 63 | 141 | 108 | | | | | | | | | | | | |
| 64 | 142 | 108 | | | | | | | | | | | | |

FIG. 1A-C
COMBINATIONS OF ENGAGABLE PINIONS

| Forward speeds | Gearbox of 4X5 & 20 forward and 4 reverse speeds by 20 gears | | Gearbox of 4X4 & 16 forward and 4 reverse speeds by 18 gears | | Gearbox of 3X4 & 12 forward and 3 reverse speeds by 16 gears | | Gearbox of 3X3 & 9 forward and 3 reverse speeds by 14 gears | | Gearbox of 2X3 & 6 forward and 2 reverse speeds by 12 gears | | Gearbox of 2X2 & 4 forward and 2 reverse speeds by 10 gears | |
|---|---|---|---|---|---|---|---|---|---|---|---|---|
| | A | B | A | B | A | B | A | B | A | B | A | B |
| 1 | 138 | 111 | 139 | 111 | 139 | 110 | 140 | 110 | 140 | 109 | 141 | 109 |
| 2 | 139 | 111 | 140 | 111 | 140 | 110 | 141 | 110 | 141 | 109 | 142 | 109 |
| 3 | 140 | 111 | 141 | 111 | 141 | 110 | 142 | 110 | 142 | 109 | 141 | 108 |
| 4 | 141 | 111 | 142 | 111 | 142 | 110 | 140 | 109 | 140 | 108 | 142 | 108 |
| 5 | 142 | 111 | 139 | 110 | 139 | 109 | 141 | 109 | 141 | 108 | | |
| 6 | 138 | 110 | 140 | 110 | 140 | 109 | 142 | 109 | 142 | 108 | | |
| 7 | 139 | 110 | 141 | 110 | 141 | 109 | 140 | 108 | | | | |
| 8 | 140 | 110 | 142 | 110 | 142 | 109 | 141 | 108 | | | | |
| 9 | 141 | 110 | 139 | 109 | 139 | 108 | 142 | 108 | | | | |
| 10 | 142 | 110 | 140 | 109 | 140 | 108 | | | | | | |
| 11 | 138 | 109 | 141 | 109 | 141 | 108 | | | | | | |
| 12 | 139 | 109 | 142 | 109 | 142 | 108 | | | | | | |
| 13 | 140 | 109 | 139 | 108 | | | | | | | | |
| 14 | 141 | 109 | 140 | 108 | | | | | | | | |
| 15 | 142 | 109 | 141 | 108 | | | | | | | | |
| 16 | 138 | 108 | 142 | 108 | | | | | | | | |
| 17 | 139 | 108 | | | | | | | | | | |
| 18 | 140 | 108 | | | | | | | | | | |
| 19 | 141 | 108 | | | | | | | | | | |
| 20 | 142 | 108 | | | | | | | | | | |

FIG. 1B-A
CHOSEN NUMBER OF OVERDRIVE SPEEDS & COMBINATIONS
OF DEFINED GEAR RATIOS IN EACH UNIT

| Gear sets | Gearbox of 8X8 & 64 forward and 8 reverse speeds by 34 gears | Gearbox of 7X8 & 56 forward and 7 reverse speeds by 32 gears | Gearbox of 7X7 & 49 forward and 7 reverse speeds by 30 gears | Gearbox of 6X7 & 42 forward and 6 reverse speeds by 28 gears | Gearbox of 6X6 & 36 forward and 6 reverse speeds by 26 gears | Gearbox of 5X6 & 30 forward and 5 reverse speeds by 24 gears | Gearbox of 5X5 & 25 forward and 5 reverse speeds by 22 gears |
|---|---|---|---|---|---|---|---|
| \multicolumn{8}{c}{UNIT A has 8 or 7 or 6 or 5 gearsets} |
| 143 | $1/R^7$ | $1/R^7$ | - | - | - | - | - |
| 144 | $1/R^6$ | $1/R^6$ | $1/R^6$ | $1/R^6$ | - | - | - |
| 145 | $1/R^5$ | $1/R^5$ | $1/R^5$ | $1/R^5$ | $1/R^5$ | $1/R^5$ | - |
| 146 | $1/R^4$ | $1/R^4$ | $1/R^4$ | $1/R^4$ | $1/R^4$ | $1/R^4$ | $1/R^4$ |
| 147 | $1/R^3$ | $1/R^3$ | $1/R^3$ | $1/R^3$ | $1/R^3$ | $1/R^3$ | $1/R^3$ |
| 148 | $1/R^2$ | $1/R^2$ | $1/R^2$ | $1/R^2$ | $1/R^2$ | $1/R^2$ | $1/R^2$ |
| 149 | $1/R^1$ | $1/R^1$ | $1/R^1$ | $1/R^1$ | $1/R^1$ | $1/R^1$ | $1/R^1$ |
| 150 | 1 | 1 | 1 | 1 | 1 | 1 | 1 |
| \multicolumn{8}{c}{UNIT B has 8 or 7 or 6 or 5 gearsets} |
| 116 | $R^{24+5}$ | $R^{16+5}$ | $R^{14+5}$ | $R^{14+5}$ | $R^{12+5}$ | $R^{11+5}$ | $R^{10+5}$ |
| 117 | $R^{16+5}$ | $R^{8+5}$ | $R^{7+5}$ | $R^{7+5}$ | $R^{6+5}$ | $R^{5+5}$ | $R^{5+5}$ |
| 118 | $R^{8+5}$ | $1/R^{0+3}$ | $1/R^{0+6}$ | $1/R^{0+6}$ | $1/R^{0+3}$ | $1/R^{1+3}$ | $1/R^{0+3}$ |
| 119 | $1/R^{0+3}$ | $1/R^{8+2}$ | $1/R^{7+6}$ | $1/R^{7+6}$ | $1/R^{6+3}$ | $1/R^{7+3}$ | $1/R^{5+3}$ |
| 120 | $1/R^{8+2}$ | $1/R^{16+3}$ | $1/R^{14+6}$ | $1/R^{14+6}$ | $1/R^{12+6}$ | $1/R^{13+3}$ | $1/R^{10+3}$ |
| 121 | $1/R^{16+3}$ | $1/R^{24+3}$ | $1/R^{21+3}$ | $1/R^{21+3}$ | $1/R^{18+3}$ | - | - |
| 122 | $1/R^{24+3}$ | $1/R^{32+3}$ | $1/R^{28+3}$ | - | - | - | - |
| 123 | $1/R^{32+3}$ | - | - | - | - | - | - |
| \multicolumn{8}{c}{CHOSEN NUMBER OF OVERDRIVE SPEEDS} |
|  | 24 | 16 | 14 | 14 | 12 | 11 | 10 |

FIG. 1B-B
CHOSEN NUMBER OF OVERDRIVE SPEEDS & COMBINATIONS
OF DEFINED GEAR RATIOS IN EACH UNIT

| List of Gearsets | Gearbox of 4X5 & 20/10 forward and 4 reverse speeds by 20 gears | Gearbox of 4X4 & 16/4 forward and 4 reverse speeds by 18 gears | Gearbox of 3X4 & 12/4 forward and 3 reverse speeds by 16 gears | Gearbox of 3X3 & 9/3 forward and 3 reverse speeds by 14 gears | Gearbox of 2X3 & 6/3 forward and 2 reverse speeds by 12 gears | Gearbox of 2X2 & 4/1 forward and 2 reverse speeds by 10 gears |
|---|---|---|---|---|---|---|
| \multicolumn{7}{c}{UNIT A has 5 or 4 or 3 or 2 gearsets} |
| 143 | - | - | - | - | - | - |
| 144 | - | - | - | - | - | - |
| 145 | - | - | - | - | - | - |
| 146 | $1/R^4$ | - | - | - | - | - |
| 147 | $1/R^3$ | $1/R^3$ | $1/R^3$ | - | - | - |
| 148 | $1/R^2$ | $1/R^2$ | $1/R^2$ | $1/R^2$ | $1/R^2$ | - |
| 149 | $1/R$ | $1/R$ | $1/R$ | $1/R$ | $1/R$ | $1/R$ |
| 150 | 1 | 1 | 1 | 1 | 1 | 1 |
| \multicolumn{7}{c}{UNIT B has 4 or 3 or 2 gearsets} |
| 116 | $R^{10+5}$ | $R^{4+5}$ | $R^{4+5}$ | $R^{3+5}$ | $R^{3+5}$ | $R^{1+5}$ |
| 117 | $R^{5+5}$ | $1/R^{0+3}$ | $1/R^{0+3}$ | $1/R^{0+3}$ | $1/R^{0+3}$ | $1/R^{1+3}$ |
| 118 | $1/R^{1+3}$ | $1/R^{4+3}$ | $1/R^{4+3}$ | $1/R^{3+3}$ | - | - |
| 119 | $1/R^{6+3}$ | $1/R^{8+3}$ | - | - | - | - |
| 120 | $1/R^{11+3}$ | - | - | - | - | - |
| 121 | - | - | - | - | - | - |
| 122 | - | - | - | - | - | - |
| 123 | - | - | - | - | - | - |
| \multicolumn{7}{c}{CHOSEN NUMBER OF OVERDRIVE SPEEDS} |
|  | 10 | 4 | 4 | 3 | 3 | 1 |

FIG. 1D-A
CHOSEN NUMBER OF OVERDRIVE SPEEDS & COMBINATIONS
OF DEFINED GEAR RATIOS IN EACH UNIT OF COMPOUND GEARBOX

| Gear sets | Gearbox of 8X8+1 & 65 forward 16 reverse speeds by 32 gears | Gearbox of 7X8+1 & 57 forward 15 reverse speeds by 30 gears | Gearbox of 7X7+1 & 50 forward 14 reverse speeds by 28 gears | Gearbox of 6X7+1 & 43 forward 13 reverse speeds by 26 gears | Gearbox of 6X6+1 & 37 forward 12 reverse speeds by 24 gears | Gearbox of 5X6+1 & 31 forward 11 reverse speeds by 22 gears | Gearbox of 5X5+1 & 26 forward 10 reverse speeds by 20 gears |
|---|---|---|---|---|---|---|---|
| FRONT WHEELS |||||||| 
| UNIT A has 8 or 7 or 6 or 5 gearsets |||||||| 
| 144 | $1/R^7$ | $1/R^7$ | - | - | - | - | - |
| 145 | $1/R^6$ | $1/R^6$ | $1/R^6$ | $1/R^6$ | - | - | - |
| 146 | $1/R^5$ | $1/R^5$ | $1/R^5$ | $1/R^5$ | $1/R^5$ | $1/R^5$ | - |
| 147 | $1/R^4$ | $1/R^4$ | $1/R^4$ | $1/R^4$ | $1/R^4$ | $1/R^4$ | $1/R^4$ |
| 148 | $1/R^3$ | $1/R^3$ | $1/R^3$ | $1/R^3$ | $1/R^3$ | $1/R^3$ | $1/R^3$ |
| 149 | $1/R^2$ | $1/R^2$ | $1/R^2$ | $1/R^2$ | $1/R^2$ | $1/R^2$ | $1/R^2$ |
| 150 | $1/R^1$ | $1/R^1$ | $1/R^1$ | $1/R^1$ | $1/R^1$ | $1/R^1$ | $1/R^1$ |
| 151 | 1 | 1 | 1 | 1 | 1 | 1 | 1 |
| UNIT B has 4 or 3 or 2 gearsets |||||||| 
| 116 | $R^{24+5}$ | $R^{16+5}$ | $R^{14+5}$ | $R^{14+5}$ | $R^{12+5}$ | $R^{11+5}$ | $R^{10+5}$ |
| 117 | $R^{16+5}$ | $R^{8+5}$ | $R^{7+5}$ | $R^{7+5}$ | $R^{6+5}$ | $R^{5+5}$ | $R^{5+5}$ |
| 118 | $R^{8+5}$ | $1/R^{0+3}$ | $1/R^{0+6}$ | $1/R^{0+6}$ | $1/R^{0+3}$ | $1/R^{1+3}$ | $1/R^{0+3}$ |
| 119 | $1/R^{0+3}$ | $1/R^{8+2}$ | $1/R^{7+6}$ | $1/R^{7+6}$ | $1/R^{6+3}$ | $1/R^{7+3}$ | $1/R^{5+3}$ |
| 120 | $1/R^{8+2}$ | $1/R^{16+3}$ | $1/R^{14+6}$ | $1/R^{14+6}$ | $1/R^{12+6}$ | $1/R^{13+3}$ | $1/R^{10+3}$ |
| 121 | $1/R^{16+3}$ | $1/R^{24+3}$ | $1/R^{21+3}$ | $1/R^{21+3}$ | $1/R^{18+3}$ | - | - |
| 122 | $1/R^{24+3}$ | $1/R^{32+3}$ | $1/R^{28+3}$ | - | - | - | - |
| 123 | $1/R^{32+3}$ | - | - | - | - | - | - |
| DIRECT | CLUTCH | 180 | - | - | - | - | - |
| REAR WHEELS |||||||| 
| UNIT B has 4 or 3 or 2 gearsets |||||||| 
| 116 | $R^{24+5}$ | $R^{16+5}$ | $R^{14+5}$ | $R^{14+5}$ | $R^{12+5}$ | $R^{11+5}$ | $R^{10+5}$ |
| 117 | $R^{16+5}$ | $R^{8+5}$ | $R^{7+5}$ | $R^{7+5}$ | $R^{6+5}$ | $R^{5+5}$ | $R^{5+5}$ |
| 118 | $R^{8+5}$ | $1/R^{0+3}$ | $1/R^{0+6}$ | $1/R^{0+6}$ | $1/R^{0+3}$ | $1/R^{1+3}$ | $1/R^{0+3}$ |
| 119 | $1/R^{0+3}$ | $1/R^{8+2}$ | $1/R^{7+6}$ | $1/R^{7+6}$ | $1/R^{6+3}$ | $1/R^{7+3}$ | $1/R^{5+3}$ |
| 120 | $1/R^{8+2}$ | $1/R^{16+3}$ | $1/R^{14+6}$ | $1/R^{14+6}$ | $1/R^{12+6}$ | $1/R^{13+3}$ | $1/R^{10+3}$ |
| 121 | $1/R^{16+3}$ | $1/R^{24+3}$ | $1/R^{21+3}$ | $1/R^{21+3}$ | $1/R^{18+3}$ | - | - |
| 122 | $1/R^{24+3}$ | $1/R^{32+3}$ | $1/R^{28+3}$ | - | - | - | - |
| 123 | $1/R^{32+3}$ | - | - | - | - | - | - |
| CHOSEN NUMBER OF OVERDRIVE SPEEDS |||||||| 
| | 24 | 16 | 14 | 14 | 12 | 11 | 10 |

FIG. 1D-B
CHOSEN NUMBER OF OVERDRIVE SPEEDS & COMBINATIONS OF DEFINED
GEAR RATIOS IN EACH UNIT OF COMPOUND GEARBOX

| List of Gearsets | Gearbox of 4X5+1 & 21 forward 9 reverse speeds by 18 gears | Gearbox of 4X4+1 & 17 forward 8 reverse speeds by 16 gears | Gearbox of 3X4+1 & 13 forward 7 reverse speeds by 14 gears | Gearbox of 3X3+1 & 10 forward 6 reverse speeds by 12 gears | Gearbox of 2X3+1 & 7 forward 5 reverse speeds by 10 gears | Gearbox of 2X2+1 & 5 forward 4 reverse speeds by 8 gears |
|---|---|---|---|---|---|---|
| FRONT WHEELS | | | | | | |
| UNIT A has 5 or 4 or 3 or 2 gearsets | | | | | | |
| 144 | - | - | - | - | - | - |
| 145 | - | - | - | - | - | - |
| 146 | - | - | - | - | - | - |
| 147 | $1/R^4$ | - | - | - | - | - |
| 148 | $1/R^3$ | $1/R^3$ | $1/R^3$ | - | - | - |
| 149 | $1/R^2$ | $1/R^2$ | $1/R^2$ | $1/R^2$ | $1/R^2$ | - |
| 150 | $1/R$ | $1/R$ | $1/R$ | $1/R$ | $1/R$ | $1/R$ |
| 151 | 1 | 1 | 1 | 1 | 1 | 1 |
| UNIT B has 4 or 3 or 2 gearsets | | | | | | |
| 116 | $R^{9+5}$ | $R^{4+5}$ | $R^{4+5}$ | $R^{3+5}$ | $R^{3+5}$ | $R^{2++5}$ |
| 117 | $R^{4+5}$ | $1/R^{0+3}$ | $1/R^{0+3}$ | $1/R^{0+3}$ | $1/R^{0+3}$ | $1/R^{0+3}$ |
| 118 | $1/R^{1+3}$ | $1/R^{4+3}$ | $1/R^{4+3}$ | $1/R^{3+3}$ | - | - |
| 119 | $1/R^{6+3}$ | $1/R^{8+3}$ | - | - | - | - |
| 120 | $1/R^{11+3}$ | - | - | - | - | - |
| 121 | - | - | - | - | - | - |
| 122 | - | - | - | - | - | - |
| 123 | - | - | - | - | - | - |
| DIRECT | 180 | - | - | - | - | - |
| REAR WHEELS | | | | | | |
| UNIT B has 4 or 3 or 2 gearsets | | | | | | |
| 116 | $R^{10+5}$ | $R^{4+5}$ | $R^{4+5}$ | $R^{3+5}$ | $R^{2+5}$ | $R^{1+5}$ |
| 117 | $R^{5+5}$ | $1/R^{0+3}$ | $1/R^{0+3}$ | $1/R^{0+3}$ | $1/R^{1+3}$ | $1/R^{1+3}$ |
| 118 | $1/R^{1+3}$ | $1/R^{4+3}$ | $1/R^{4+3}$ | $1/R^{3+3}$ | - | - |
| 119 | $1/R^{6+3}$ | $1/R^{8+3}$ | - | - | - | - |
| 120 | $1/R^{11+3}$ | - | - | - | - | - |
| 121 | - | - | - | - | - | - |
| 122 | - | - | - | - | - | - |
| 123 | - | - | - | - | - | - |
| CHOSEN NUMBER OF OVERDRIVE SPEEDS | | | | | | |
| | 10 | 4 | 4 | 3 | 2 | 1 |

FIG. 2A-A
COMBINATIONS OF ENGAGABLE PINIONS

| Forward speeds | Gearbox of 4X4X6 & 96 forward and 24 reverse speeds by 29 gears | | | Gearbox of 4X4X5 & 80 forward and 20 reverse speeds by 27 gears | | | Gearbox of 4X4X4 & 64 forward and 16 reverse speeds by 25 gears | | |
|---|---|---|---|---|---|---|---|---|---|
| | A | B | C | A | B | C | A | B | C |
| 1 | 240 | 219 | 212 | 239 | 219 | 212 | 238 | 219 | 212 |
| 2 | 239 | 219 | 212 | 238 | 219 | 212 | 237 | 219 | 212 |
| 3 | 238 | 219 | 212 | 237 | 219 | 212 | 236 | 219 | 212 |
| 4 | 237 | 219 | 212 | 236 | 219 | 212 | 235 | 219 | 212 |
| 5 | 236 | 219 | 212 | 235 | 219 | 212 | 238 | 223 | 212 |
| 6 | 235 | 219 | 212 | 239 | 223 | 212 | 237 | 223 | 212 |
| 7 | 240 | 223 | 212 | 238 | 223 | 212 | 236 | 223 | 212 |
| 8 | 239 | 223 | 212 | 237 | 223 | 212 | 235 | 223 | 212 |
| 9 | 238 | 223 | 212 | 236 | 223 | 212 | 238 | 224 | 212 |
| 10 | 237 | 223 | 212 | 235 | 223 | 212 | 237 | 224 | 212 |
| 11 | 236 | 223 | 212 | 239 | 224 | 212 | 236 | 224 | 212 |
| 12 | 235 | 223 | 212 | 238 | 224 | 212 | 235 | 224 | 212 |
| 13 | 240 | 224 | 212 | 237 | 224 | 212 | 238 | 225 | 212 |
| 14 | 239 | 224 | 212 | 236 | 224 | 212 | 237 | 225 | 212 |
| 15 | 238 | 224 | 212 | 235 | 224 | 212 | 236 | 225 | 212 |
| 16 | 237 | 224 | 212 | 239 | 225 | 212 | 235 | 225 | 212 |
| 17 | 236 | 224 | 212 | 238 | 225 | 212 | 238 | 219 | 211 |
| 18 | 235 | 224 | 212 | 237 | 225 | 212 | 237 | 219 | 211 |
| 19 | 240 | 225 | 212 | 236 | 225 | 212 | 236 | 219 | 211 |
| 20 | 239 | 225 | 212 | 235 | 225 | 212 | 235 | 219 | 211 |
| 21 | 238 | 225 | 212 | 239 | 229 | 211 | 238 | 223 | 211 |
| 22 | 237 | 225 | 212 | 238 | 229 | 211 | 237 | 223 | 211 |
| 23 | 236 | 225 | 212 | 237 | 229 | 211 | 236 | 223 | 211 |
| 24 | 235 | 225 | 212 | 236 | 229 | 211 | 235 | 223 | 211 |
| 25 | 240 | 229 | 211 | 235 | 229 | 211 | 238 | 224 | 211 |
| 26 | 239 | 229 | 211 | 239 | 228 | 211 | 237 | 224 | 211 |
| 27 | 238 | 229 | 211 | 238 | 228 | 211 | 236 | 224 | 211 |
| 28 | 237 | 229 | 211 | 237 | 228 | 211 | 235 | 224 | 211 |
| 29 | 236 | 229 | 211 | 236 | 228 | 211 | 238 | 225 | 211 |
| 30 | 235 | 229 | 211 | 235 | 228 | 211 | 237 | 225 | 211 |
| 31 | 240 | 228 | 211 | 239 | 227 | 211 | 236 | 225 | 211 |
| 32 | 239 | 228 | 211 | 238 | 227 | 211 | 235 | 225 | 211 |
| 33 | 238 | 228 | 211 | 237 | 227 | 211 | 238 | 219 | 210 |
| 34 | 237 | 228 | 211 | 236 | 227 | 211 | 237 | 219 | 210 |
| 35 | 236 | 228 | 211 | 235 | 227 | 211 | 236 | 219 | 210 |
| 36 | 235 | 228 | 211 | 239 | 226 | 211 | 235 | 219 | 210 |
| 37 | 240 | 227 | 211 | 238 | 226 | 211 | 238 | 223 | 210 |
| 38 | 239 | 227 | 211 | 237 | 226 | 211 | 237 | 223 | 210 |
| 39 | 238 | 227 | 211 | 236 | 226 | 211 | 236 | 223 | 210 |
| 40 | 237 | 227 | 211 | 235 | 226 | 211 | 235 | 223 | 210 |
| 41 | 236 | 227 | 211 | 239 | 229 | 210 | 238 | 224 | 210 |

FIG. 2A-B

| | | | | | | | | | |
|---|---|---|---|---|---|---|---|---|---|
| 42 | 235 | 227 | 211 | 238 | 229 | 210 | 237 | 224 | 210 |
| 43 | 240 | 226 | 211 | 237 | 229 | 210 | 236 | 224 | 210 |
| 44 | 239 | 226 | 211 | 236 | 229 | 210 | 235 | 224 | 210 |
| 45 | 238 | 226 | 211 | 235 | 229 | 210 | 238 | 225 | 210 |
| 46 | 237 | 226 | 211 | 239 | 228 | 210 | 237 | 225 | 210 |
| 47 | 236 | 226 | 211 | 238 | 228 | 210 | 236 | 225 | 210 |
| 48 | 235 | 226 | 211 | 237 | 228 | 210 | 235 | 225 | 210 |
| 49 | 240 | 229 | 210 | 236 | 228 | 210 | 238 | 219 | 209 |
| 50 | 239 | 229 | 210 | 235 | 228 | 210 | 237 | 219 | 209 |
| 51 | 238 | 229 | 210 | 239 | 227 | 210 | 236 | 219 | 209 |
| 52 | 237 | 229 | 210 | 238 | 227 | 210 | 235 | 219 | 209 |
| 53 | 236 | 229 | 210 | 237 | 227 | 210 | 238 | 223 | 209 |
| 54 | 235 | 229 | 210 | 236 | 227 | 210 | 237 | 223 | 209 |
| 55 | 240 | 228 | 210 | 235 | 227 | 210 | 236 | 223 | 209 |
| 56 | 239 | 228 | 210 | 239 | 226 | 210 | 235 | 223 | 209 |
| 57 | 238 | 228 | 210 | 238 | 226 | 210 | 238 | 224 | 209 |
| 58 | 237 | 228 | 210 | 237 | 226 | 210 | 237 | 224 | 209 |
| 59 | 236 | 228 | 210 | 236 | 226 | 210 | 236 | 224 | 209 |
| 60 | 235 | 228 | 210 | 235 | 226 | 210 | 235 | 224 | 209 |
| 61 | 240 | 227 | 210 | 239 | 229 | 209 | 238 | 225 | 209 |
| 62 | 239 | 227 | 210 | 238 | 229 | 209 | 237 | 225 | 209 |
| 63 | 238 | 227 | 210 | 237 | 229 | 209 | 236 | 225 | 209 |
| 64 | 237 | 227 | 210 | 236 | 229 | 209 | 235 | 225 | 209 |
| 65 | 236 | 227 | 210 | 235 | 229 | 209 | | | |
| 66 | 235 | 227 | 210 | 239 | 228 | 209 | | | |
| 67 | 240 | 226 | 210 | 238 | 228 | 209 | | | |
| 68 | 239 | 226 | 210 | 237 | 228 | 209 | | | |
| 69 | 238 | 226 | 210 | 236 | 228 | 209 | | | |
| 70 | 237 | 226 | 210 | 235 | 228 | 209 | | | |
| 71 | 236 | 226 | 210 | 239 | 227 | 209 | | | |
| 72 | 235 | 226 | 210 | 238 | 227 | 209 | | | |
| 73 | 240 | 229 | 209 | 237 | 227 | 209 | | | |
| 74 | 239 | 229 | 209 | 236 | 227 | 209 | | | |
| 75 | 238 | 229 | 209 | 235 | 227 | 209 | | | |
| 76 | 237 | 229 | 209 | 239 | 226 | 209 | | | |
| 77 | 236 | 229 | 209 | 238 | 226 | 209 | | | |
| 78 | 235 | 229 | 209 | 237 | 226 | 209 | | | |
| 79 | 240 | 228 | 209 | 236 | 226 | 209 | | | |
| 80 | 239 | 228 | 209 | 235 | 226 | 209 | | | |
| 81 | 238 | 228 | 209 | | | | | | |
| 82 | 237 | 228 | 209 | | | | | | |
| 83 | 236 | 228 | 209 | | | | | | |
| 84 | 235 | 228 | 209 | | | | | | |
| 85 | 240 | 227 | 209 | | | | | | |
| 86 | 239 | 227 | 209 | | | | | | |
| 87 | 238 | 227 | 209 | | | | | | |

FIG. 2A-C

| 88 | 237 | 227 | 209 | | | | | | |
|----|-----|-----|-----|--|--|--|--|--|--|
| 89 | 236 | 227 | 209 | | | | | | |
| 90 | 235 | 227 | 209 | | | | | | |
| 91 | 240 | 226 | 209 | | | | | | |
| 92 | 239 | 226 | 209 | | | | | | |
| 93 | 238 | 226 | 209 | | | | | | |
| 94 | 237 | 226 | 209 | | | | | | |
| 95 | 236 | 226 | 209 | | | | | | |
| 96 | 235 | 226 | 209 | | | | | | |

FIG. 2A-D
COMBINATIONS OF ENGAGABLE PINIONS

| Forward speeds | Gearbox of 3X4X4 & 48 forward and 16 reverse speeds by 23 gears | | | Gearbox of 3X3X4 & 36 forward and 12 reverse speeds by 21 gears | | | Gearbox of 3X3X3 & 27 forward and 9 reverse speeds by 19 gears | | |
|---|---|---|---|---|---|---|---|---|---|
| | A | B | C | A | B | C | A | B | C |
| 1 | 238 | 219 | 211 | 238 | 223 | 211 | 237 | 223 | 211 |
| 2 | 237 | 219 | 211 | 237 | 223 | 211 | 236 | 223 | 211 |
| 3 | 236 | 219 | 211 | 236 | 223 | 211 | 235 | 223 | 211 |
| 4 | 235 | 219 | 211 | 235 | 223 | 211 | 237 | 224 | 211 |
| 5 | 238 | 223 | 211 | 238 | 224 | 211 | 236 | 224 | 211 |
| 6 | 237 | 223 | 211 | 237 | 224 | 211 | 235 | 224 | 211 |
| 7 | 236 | 223 | 211 | 236 | 224 | 211 | 237 | 225 | 211 |
| 8 | 235 | 223 | 211 | 235 | 224 | 211 | 236 | 225 | 211 |
| 9 | 238 | 224 | 211 | 238 | 225 | 211 | 235 | 225 | 211 |
| 10 | 237 | 224 | 211 | 237 | 225 | 211 | 237 | 229 | 210 |
| 11 | 236 | 224 | 211 | 236 | 225 | 211 | 236 | 223 | 210 |
| 12 | 235 | 224 | 211 | 235 | 225 | 211 | 235 | 223 | 210 |
| 13 | 238 | 225 | 211 | 238 | 223 | 210 | 237 | 223 | 210 |
| 14 | 237 | 225 | 211 | 237 | 223 | 210 | 236 | 224 | 210 |
| 15 | 236 | 225 | 211 | 236 | 223 | 210 | 235 | 224 | 210 |
| 16 | 235 | 225 | 211 | 235 | 223 | 210 | 237 | 224 | 210 |
| 17 | 238 | 219 | 210 | 238 | 224 | 210 | 236 | 225 | 210 |
| 18 | 237 | 219 | 210 | 237 | 224 | 210 | 235 | 225 | 210 |
| 19 | 236 | 219 | 210 | 236 | 224 | 210 | 237 | 223 | 209 |
| 20 | 235 | 219 | 210 | 235 | 224 | 210 | 236 | 223 | 209 |
| 21 | 238 | 223 | 210 | 238 | 225 | 210 | 235 | 223 | 209 |
| 22 | 237 | 223 | 210 | 237 | 225 | 210 | 237 | 224 | 209 |
| 23 | 236 | 223 | 210 | 236 | 225 | 210 | 236 | 224 | 209 |
| 24 | 235 | 223 | 210 | 235 | 225 | 210 | 235 | 224 | 209 |
| 25 | 238 | 224 | 210 | 238 | 223 | 209 | 237 | 225 | 209 |
| 26 | 237 | 224 | 210 | 237 | 223 | 209 | 236 | 225 | 209 |
| 27 | 236 | 224 | 210 | 236 | 223 | 209 | 235 | 225 | 209 |
| 28 | 235 | 224 | 210 | 235 | 223 | 209 | | | |
| 29 | 238 | 225 | 210 | 238 | 224 | 209 | | | |
| 30 | 237 | 225 | 210 | 237 | 224 | 209 | | | |
| 31 | 236 | 225 | 210 | 236 | 224 | 209 | | | |
| 32 | 235 | 225 | 210 | 235 | 224 | 209 | | | |
| 33 | 238 | 219 | 209 | 238 | 225 | 209 | | | |
| 34 | 237 | 219 | 209 | 237 | 225 | 209 | | | |
| 35 | 236 | 219 | 209 | 236 | 225 | 209 | | | |

FIG. 2A-E

| 36 | 235 | 219 | 209 | 235 | 225 | 209 | | | |
|----|-----|-----|-----|-----|-----|-----|---|---|---|
| 37 | 238 | 223 | 209 | | | | | | |
| 38 | 237 | 223 | 209 | | | | | | |
| 39 | 236 | 223 | 209 | | | | | | |
| 40 | 235 | 223 | 209 | | | | | | |
| 41 | 238 | 224 | 209 | | | | | | |
| 42 | 237 | 224 | 209 | | | | | | |
| 43 | 236 | 224 | 209 | | | | | | |
| 44 | 235 | 224 | 209 | | | | | | |
| 45 | 238 | 225 | 209 | | | | | | |
| 46 | 237 | 225 | 209 | | | | | | |
| 47 | 236 | 225 | 209 | | | | | | |
| 48 | 235 | 225 | 209 | | | | | | |

FIG. 2A-F
COMBINATIONS OF ENGAGABLE PINIONS

| Forward speeds | Gearbox of 2X3X3 & 18 forward and 9 reverse speeds by 17 gears | | | Gearbox of 2X2X3 & 12 forward and 6 reverse speeds by 15 gears | | | Gearbox of 2X2X2 & 8 forward and 4 reverse speeds by 13 gears | | |
|---|---|---|---|---|---|---|---|---|---|
| | A | B | C | A | B | C | A | B | C |
| 1 | 237 | 223 | 210 | 237 | 224 | 210 | 236 | 224 | 210 |
| 2 | 236 | 223 | 210 | 236 | 224 | 210 | 235 | 224 | 210 |
| 3 | 235 | 223 | 210 | 235 | 224 | 210 | 236 | 225 | 210 |
| 4 | 237 | 224 | 210 | 237 | 225 | 210 | 235 | 225 | 210 |
| 5 | 236 | 224 | 210 | 236 | 225 | 210 | 236 | 224 | 209 |
| 6 | 235 | 224 | 210 | 235 | 225 | 210 | 235 | 224 | 209 |
| 7 | 237 | 225 | 210 | 237 | 224 | 209 | 236 | 225 | 209 |
| 8 | 236 | 225 | 210 | 236 | 224 | 209 | 235 | 225 | 209 |
| 9 | 235 | 225 | 210 | 235 | 224 | 209 | | | |
| 10 | 237 | 223 | 209 | 237 | 225 | 209 | | | |
| 11 | 236 | 223 | 209 | 236 | 225 | 209 | | | |
| 12 | 235 | 223 | 209 | 235 | 225 | 209 | | | |
| 13 | 237 | 224 | 209 | | | | | | |
| 14 | 236 | 224 | 209 | | | | | | |
| 15 | 235 | 224 | 209 | | | | | | |
| 16 | 237 | 225 | 209 | | | | | | |
| 17 | 236 | 225 | 209 | | | | | | |
| 18 | 235 | 225 | 209 | | | | | | |

FIG. 2B-A
CHOSEN NUMBER OF OVERDRIVE SPEEDS & COMBINATIONS OF DEFINED GEAR RATIOS IN EACH UNIT

| List of Gearsets | Gearbox of 4X4X6 & 96 forward 24 reverse speeds by 29 gears | Gearbox of 4X4X5 & 80 forward 20 reverse speeds by 27 gears | Gearbox of 4X4X4 & 64 forward 16 reverse speeds by 25 gears | Gearbox of 3X4X4 & 48 forward 12 reverse speeds by 23 gears | Gearbox of 3X3X4 & 36 forward 12 reverse speeds by 21 gears | Gearbox of 3X3X3 & 27 forward 9 reverse speeds by 19 gears | Gearbox of 2X3X3 & 18 forward 6 reverse speeds by 17 gears |
|---|---|---|---|---|---|---|---|
| \multicolumn{8}{UNIT A has 6 or 5 or 4 or 3 gearsets} |
| 246 | $1/R_2^3$ | - | - | - | - | - | - |
| 245 | $1/R_2^2$ | $1/R_2^2$ | - | - | - | - | - |
| 244 | $1/R_2$ | $1/R_2$ | $1/R_2$ | $1/R_2$ | $1/R_2$ | - | - |
| 243 | 1 | 1 | 1 | 1 | 1 | 1 | 1 |
| 242 | $R_1$ | $R_1$ | $R_1$ | $R_1$ | $R_1$ | $R_1$ | $R_1$ |
| 241 | $R_1^2$ | $R_1^2$ | $R_1^2$ | $R_1^2$ | $R_1^2$ | $R_1^2$ | $R_1^2$ |
| UNIT B has 4 or 3 gearsets | | | | | | | |
| 226 | $1/R_2^9$ | $1/R_2^8$ | $1/R_2^6$ | $1/R_2^6$ | - | - | - |
| 227 | $1/R_2^3$ | $1/R_2^2$ | $1/R_2^2$ | $1/R_2^2$ | $1/R_2^4$ | $1/R_2^3$ | $1/R_2^3$ |
| 228 | $R_1^3$ | $R_1^3$ | $R_1^2$ | $R_1^2$ | 1 | 1 | 1 |
| 229 | $R_1^9$ | $R_1^7$ | $R_1^6$ | $R_1^6$ | $R_1^4$ | $R_1^3$ | $R_1^3$ |
| UNIT C has 4 or 3 or 2 gearsets | | | | | | | |
| 213 | $R_1^{36+2}$ | $R_1^{30+2}$ | $R_1^{24+2}$ | $R_1^{16+2}$ | $R_1^{12+2}$ | $R_1^{9+2}$ | $R_1^{5+2}$ |
| 214 | $R_1^{12+2}$ | $R_1^{10+2}$ | $R_1^{8+2}$ | $1/R_2^{9+1}$ | $1/R_2^{7+1}$ | $1/R_2^{7+1}$ | $1/R_2^{4+1}$ |
| 215 | $1/R_2^{12+1}$ | $1/R_2^{10+1}$ | $1/R_2^{8+1}$ | $1/R_2^{16+1}$ | $1/R_2^{12+1}$ | $1/R_2^{9+1}$ | - |
| 216 | $1/R_2^{36+1}$ | $1/R_2^{30+1}$ | $1/R_2^{24+1}$ | - | - | - | - |
| CHOSEN NUMBER OF OVERDRIVE SPEEDS | | | | | | | |
|  | 48 | 40 | 32 | 24 | 18 | 14 | 9 |

FIG. 2B-B
CHOSEN NUMBER OF OVERDRIVE SPEEDS & COMBINATIONS
OF DEFINED GEAR RATIOS IN EACH UNIT

| List of Gearsets | Gearbox of 2X2X3 & 12 forward 6 reverse speeds by 15 gears | Gearbox of 2X2X2 & 8 forward 4 reverse speeds by 13 gears |
|---|---|---|
| UNIT A has 3 or 2 gearsets | | |
| 246 | - | - |
| 245 | - | - |
| 244 | - | - |
| 243 | $1/R_2$ | - |
| 242 | 1 | $1/R_2$ |
| 241 | $R_1$ | 1 |
| UNIT B has 2 gearsets | | |
| 226 | - | - |
| 227 | - | - |
| 228 | $1/R_2^2$ | $1/R_2$ |
| 229 | $R_1$ | $R_1$ |
| UNIT C has 2 gearsets | | |
| 213 | $R_1^{3+2}$ | $R_1^{2+2}$ |
| 214 | $1/R_2^{3+1}$ | $1/R_2^{2+1}$ |
| 215 | - | - |
| 216 | - | - |
| | CHOSEN NUMBER OF OVERDRIVE SPEEDS | |
| | 6 | 4 |

FIG. 3A-A
COMBINATIONS OF ENGAGABLE PINIONS

| Forward speeds | Gearbox of 3X3X3X4 & 108 forward and 27 reverse speeds by 26 gears | | | | Gearbox of 3X3X3X3 & 81 forward and 27 reverse speeds by 24 gears | | | | Gearbox of 2X3X3X3 & 54 forward and 18 reverse speeds by 22 gears | | | |
|---|---|---|---|---|---|---|---|---|---|---|---|---|
| | A | B | C | D | A | B | C | D | A | B | C | D |
| 1 | 343 | 332 | 318 | 310 | 342 | 332 | 318 | 310 | 342 | 332 | 318 | 310 |
| 2 | 342 | 332 | 318 | 310 | 341 | 332 | 318 | 310 | 341 | 332 | 318 | 310 |
| 3 | 341 | 332 | 318 | 310 | 340 | 332 | 318 | 310 | 340 | 332 | 318 | 310 |
| 4 | 340 | 332 | 318 | 310 | 342 | 331 | 318 | 310 | 342 | 331 | 318 | 310 |
| 5 | 343 | 331 | 318 | 310 | 341 | 331 | 318 | 310 | 341 | 331 | 318 | 310 |
| 6 | 342 | 331 | 318 | 310 | 340 | 331 | 318 | 310 | 340 | 331 | 318 | 310 |
| 7 | 341 | 331 | 318 | 310 | 342 | 330 | 318 | 310 | 342 | 330 | 318 | 310 |
| 8 | 340 | 331 | 318 | 310 | 341 | 330 | 318 | 310 | 341 | 330 | 318 | 310 |
| 9 | 343 | 330 | 318 | 310 | 340 | 330 | 318 | 310 | 340 | 330 | 318 | 310 |
| 10 | 342 | 330 | 318 | 310 | 342 | 332 | 321 | 310 | 342 | 332 | 321 | 310 |
| 11 | 341 | 330 | 318 | 310 | 341 | 332 | 321 | 310 | 341 | 332 | 321 | 310 |
| 12 | 340 | 330 | 318 | 310 | 340 | 332 | 321 | 310 | 340 | 332 | 321 | 310 |
| 13 | 343 | 332 | 321 | 310 | 342 | 331 | 321 | 310 | 342 | 331 | 321 | 310 |
| 14 | 342 | 332 | 321 | 310 | 341 | 331 | 321 | 310 | 341 | 331 | 321 | 310 |
| 15 | 341 | 332 | 321 | 310 | 340 | 331 | 321 | 310 | 340 | 331 | 321 | 310 |
| 16 | 340 | 332 | 321 | 310 | 342 | 330 | 321 | 310 | 342 | 330 | 321 | 310 |
| 17 | 343 | 331 | 321 | 310 | 341 | 330 | 321 | 310 | 341 | 330 | 321 | 310 |
| 18 | 342 | 331 | 321 | 310 | 340 | 330 | 321 | 310 | 340 | 330 | 321 | 310 |
| 19 | 341 | 331 | 321 | 310 | 342 | 332 | 322 | 310 | 342 | 332 | 322 | 310 |
| 20 | 340 | 331 | 321 | 310 | 341 | 332 | 322 | 310 | 341 | 332 | 322 | 310 |
| 21 | 343 | 330 | 321 | 310 | 340 | 332 | 322 | 310 | 340 | 332 | 322 | 310 |
| 22 | 342 | 330 | 321 | 310 | 342 | 331 | 322 | 310 | 342 | 331 | 322 | 310 |
| 23 | 341 | 330 | 321 | 310 | 341 | 331 | 322 | 310 | 341 | 331 | 322 | 310 |
| 24 | 340 | 330 | 321 | 310 | 340 | 331 | 322 | 310 | 340 | 331 | 322 | 310 |
| 25 | 343 | 332 | 322 | 310 | 342 | 330 | 322 | 310 | 342 | 330 | 322 | 310 |
| 26 | 342 | 332 | 322 | 310 | 341 | 330 | 322 | 310 | 341 | 330 | 322 | 310 |
| 27 | 341 | 332 | 322 | 310 | 340 | 330 | 322 | 310 | 340 | 330 | 322 | 310 |
| 28 | 340 | 332 | 322 | 310 | 342 | 332 | 318 | 311 | 342 | 332 | 318 | 210 |
| 29 | 343 | 331 | 322 | 310 | 341 | 332 | 318 | 311 | 341 | 332 | 318 | 311 |
| 30 | 342 | 331 | 322 | 310 | 340 | 332 | 318 | 311 | 340 | 332 | 318 | 311 |
| 31 | 341 | 331 | 322 | 310 | 342 | 331 | 318 | 311 | 342 | 331 | 318 | 311 |
| 32 | 340 | 331 | 322 | 310 | 341 | 331 | 318 | 311 | 341 | 331 | 318 | 311 |
| 33 | 343 | 330 | 322 | 310 | 340 | 331 | 318 | 311 | 340 | 331 | 318 | 311 |
| 34 | 342 | 330 | 322 | 310 | 342 | 330 | 318 | 311 | 342 | 330 | 318 | 311 |
| 35 | 341 | 330 | 322 | 310 | 341 | 330 | 318 | 311 | 341 | 330 | 318 | 311 |
| 36 | 340 | 330 | 322 | 311 | 340 | 330 | 318 | 311 | 340 | 330 | 318 | 311 |
| 37 | 343 | 332 | 318 | 311 | 342 | 332 | 321 | 311 | 342 | 332 | 321 | 311 |
| 38 | 342 | 332 | 318 | 311 | 341 | 332 | 321 | 311 | 341 | 332 | 321 | 311 |

FIG. 3A-B

| | | | | | | | | | | | |
|---|---|---|---|---|---|---|---|---|---|---|---|
| 39 | 341 | 332 | 318 | 311 | 340 | 332 | 321 | 311 | 340 | 332 | 321 | 311 |
| 40 | 340 | 332 | 318 | 311 | 342 | 331 | 321 | 311 | 342 | 331 | 321 | 311 |
| 41 | 343 | 331 | 318 | 311 | 341 | 331 | 321 | 311 | 341 | 331 | 321 | 311 |
| 42 | 342 | 331 | 318 | 311 | 340 | 331 | 321 | 311 | 340 | 331 | 321 | 311 |
| 43 | 341 | 331 | 318 | 311 | 342 | 330 | 321 | 311 | 342 | 330 | 321 | 311 |
| 44 | 340 | 331 | 318 | 311 | 341 | 330 | 321 | 311 | 341 | 330 | 321 | 311 |
| 45 | 343 | 330 | 318 | 311 | 340 | 330 | 321 | 311 | 340 | 330 | 321 | 311 |
| 46 | 342 | 330 | 318 | 311 | 342 | 332 | 322 | 311 | 342 | 332 | 322 | 311 |
| 47 | 341 | 330 | 318 | 311 | 341 | 332 | 322 | 311 | 341 | 332 | 322 | 311 |
| 48 | 340 | 330 | 318 | 311 | 340 | 332 | 322 | 311 | 340 | 332 | 322 | 311 |
| 49 | 343 | 332 | 321 | 311 | 342 | 331 | 322 | 311 | 342 | 331 | 322 | 311 |
| 50 | 342 | 332 | 321 | 311 | 341 | 331 | 322 | 311 | 341 | 331 | 322 | 311 |
| 51 | 341 | 332 | 321 | 311 | 340 | 331 | 322 | 311 | 340 | 331 | 322 | 311 |
| 52 | 340 | 332 | 321 | 311 | 342 | 330 | 322 | 311 | 342 | 330 | 322 | 311 |
| 53 | 343 | 331 | 321 | 311 | 341 | 330 | 322 | 311 | 341 | 330 | 322 | 311 |
| 54 | 342 | 331 | 321 | 311 | 340 | 330 | 322 | 311 | 340 | 330 | 322 | 311 |
| 55 | 341 | 331 | 321 | 311 | 342 | 332 | 318 | 312 | | | | |
| 56 | 340 | 331 | 321 | 311 | 341 | 332 | 318 | 312 | | | | |
| 57 | 343 | 330 | 321 | 311 | 340 | 332 | 318 | 312 | | | | |
| 58 | 342 | 330 | 321 | 311 | 342 | 331 | 318 | 312 | | | | |
| 59 | 341 | 330 | 321 | 311 | 341 | 331 | 318 | 312 | | | | |
| 60 | 340 | 330 | 321 | 311 | 340 | 331 | 318 | 312 | | | | |
| 61 | 343 | 332 | 322 | 311 | 342 | 330 | 318 | 312 | | | | |
| 62 | 342 | 332 | 322 | 311 | 341 | 330 | 318 | 312 | | | | |
| 63 | 341 | 332 | 322 | 311 | 340 | 330 | 318 | 312 | | | | |
| 64 | 340 | 332 | 322 | 311 | 342 | 332 | 321 | 312 | | | | |
| 65 | 343 | 331 | 322 | 311 | 341 | 332 | 321 | 312 | | | | |
| 66 | 342 | 331 | 322 | 311 | 340 | 332 | 321 | 312 | | | | |
| 67 | 341 | 331 | 322 | 311 | 342 | 331 | 321 | 312 | | | | |
| 68 | 340 | 331 | 322 | 311 | 341 | 331 | 321 | 312 | | | | |
| 69 | 343 | 330 | 322 | 311 | 340 | 331 | 321 | 312 | | | | |
| 70 | 342 | 330 | 322 | 311 | 342 | 330 | 321 | 312 | | | | |
| 71 | 341 | 330 | 322 | 311 | 341 | 330 | 321 | 312 | | | | |
| 72 | 340 | 330 | 322 | 311 | 340 | 330 | 321 | 312 | | | | |
| 73 | 343 | 332 | 318 | 312 | 342 | 332 | 322 | 312 | | | | |
| 74 | 342 | 332 | 318 | 312 | 341 | 332 | 322 | 312 | | | | |
| 75 | 341 | 332 | 318 | 312 | 340 | 332 | 322 | 312 | | | | |
| 76 | 340 | 332 | 318 | 312 | 342 | 331 | 322 | 312 | | | | |
| 77 | 343 | 331 | 318 | 312 | 341 | 331 | 322 | 312 | | | | |
| 78 | 342 | 331 | 318 | 312 | 340 | 331 | 322 | 312 | | | | |
| 79 | 341 | 331 | 318 | 312 | 342 | 330 | 322 | 312 | | | | |
| 80 | 340 | 331 | 318 | 312 | 341 | 330 | 322 | 312 | | | | |
| 81 | 343 | 330 | 318 | 312 | 340 | 330 | 322 | 312 | | | | |

FIG. 3A-C

| | | | | |
|---|---|---|---|---|
| 82 | 342 | 330 | 318 | 312 |
| 83 | 341 | 330 | 318 | 312 |
| 84 | 340 | 330 | 318 | 312 |
| 85 | 343 | 332 | 321 | 312 |
| 86 | 342 | 332 | 321 | 312 |
| 87 | 341 | 332 | 321 | 312 |
| 88 | 340 | 332 | 321 | 312 |
| 89 | 343 | 331 | 321 | 312 |
| 90 | 342 | 331 | 321 | 312 |
| 91 | 341 | 331 | 321 | 312 |
| 92 | 340 | 331 | 321 | 312 |
| 93 | 343 | 330 | 321 | 312 |
| 94 | 342 | 330 | 321 | 312 |
| 95 | 341 | 330 | 321 | 312 |
| 96 | 340 | 330 | 321 | 312 |
| 97 | 343 | 332 | 322 | 312 |
| 98 | 342 | 332 | 322 | 312 |
| 99 | 341 | 332 | 322 | 312 |
| 100 | 340 | 332 | 322 | 312 |
| 101 | 343 | 331 | 322 | 312 |
| 102 | 342 | 331 | 322 | 312 |
| 103 | 341 | 331 | 322 | 312 |
| 104 | 340 | 331 | 322 | 312 |
| 105 | 343 | 330 | 322 | 312 |
| 106 | 342 | 330 | 322 | 312 |
| 107 | 341 | 330 | 322 | 312 |
| 108 | 340 | 330 | 322 | 312 |

FIG. 3A-D
COMBINATIONS OF ENGAGABLE PINIONS

| Forward speeds | Gearbox of 2X2X3X3 & 36 forward 12 reverse speeds by 20 gears | | | | Gearbox of 2X2X2X3 & 24 forward 8 reverse speeds by 18 gears | | | | Gearbox of 2X2X2X2 & 16 forward 8 reverse speeds by 16 gears | | | |
|---|---|---|---|---|---|---|---|---|---|---|---|---|
| | A | B | C | D | A | B | C | D | A | B | C | D |
| 1 | 347 | 332 | 318 | 310 | 347 | 331 | 318 | 310 | 345 | 331 | 318 | 310 |
| 2 | 346 | 332 | 318 | 310 | 346 | 331 | 318 | 310 | 344 | 331 | 318 | 310 |
| 3 | 345 | 332 | 318 | 310 | 345 | 331 | 318 | 310 | 345 | 332 | 318 | 310 |
| 4 | 344 | 331 | 318 | 310 | 344 | 330 | 318 | 310 | 344 | 332 | 318 | 310 |
| 5 | 347 | 331 | 318 | 310 | 347 | 330 | 318 | 310 | 345 | 330 | 321 | 310 |
| 6 | 346 | 331 | 318 | 310 | 346 | 330 | 318 | 310 | 344 | 330 | 321 | 310 |
| 7 | 345 | 330 | 318 | 310 | 345 | 331 | 321 | 310 | 345 | 330 | 321 | 310 |
| 8 | 344 | 330 | 318 | 310 | 344 | 331 | 321 | 310 | 344 | 330 | 321 | 310 |
| 9 | 347 | 330 | 318 | 310 | 347 | 331 | 321 | 310 | 345 | 331 | 318 | 311 |
| 10 | 346 | 332 | 321 | 310 | 346 | 330 | 321 | 310 | 344 | 331 | 318 | 311 |
| 11 | 345 | 332 | 321 | 310 | 345 | 330 | 321 | 310 | 345 | 330 | 318 | 311 |
| 12 | 344 | 332 | 321 | 310 | 344 | 330 | 321 | 310 | 344 | 330 | 318 | 311 |
| 13 | 347 | 331 | 321 | 310 | 347 | 331 | 318 | 311 | 345 | 331 | 321 | 311 |
| 14 | 346 | 331 | 321 | 310 | 346 | 331 | 318 | 311 | 344 | 331 | 321 | 311 |
| 15 | 345 | 331 | 321 | 310 | 345 | 331 | 318 | 311 | 345 | 330 | 321 | 311 |
| 16 | 344 | 330 | 321 | 310 | 344 | 330 | 318 | 311 | 344 | 330 | 321 | 311 |
| 17 | 347 | 330 | 321 | 310 | 347 | 330 | 318 | 311 | | | | |
| 18 | 346 | 330 | 321 | 310 | 346 | 330 | 318 | 311 | | | | |
| 19 | 345 | 332 | 318 | 311 | 345 | 331 | 321 | 311 | | | | |
| 20 | 344 | 332 | 318 | 311 | 344 | 331 | 321 | 311 | | | | |
| 21 | 347 | 332 | 318 | 311 | 347 | 331 | 321 | 311 | | | | |
| 22 | 346 | 331 | 318 | 311 | 346 | 330 | 321 | 311 | | | | |
| 23 | 345 | 331 | 318 | 311 | 345 | 330 | 321 | 311 | | | | |
| 24 | 344 | 331 | 318 | 311 | 344 | 330 | 321 | 311 | | | | |
| 25 | 347 | 330 | 318 | 311 | 347 | | | | | | | |
| 26 | 346 | 330 | 318 | 311 | 346 | | | | | | | |
| 27 | 345 | 330 | 318 | 311 | 345 | | | | | | | |
| 28 | 344 | 332 | 321 | 311 | 344 | | | | | | | |
| 29 | 347 | 332 | 321 | 311 | 347 | | | | | | | |
| 30 | 346 | 332 | 321 | 311 | 346 | | | | | | | |
| 31 | 345 | 331 | 321 | 311 | 345 | | | | | | | |
| 32 | 344 | 331 | 321 | 311 | 344 | | | | | | | |
| 33 | 347 | 331 | 321 | 311 | 347 | | | | | | | |
| 34 | 346 | 330 | 321 | 311 | 346 | | | | | | | |
| 35 | 345 | 330 | 321 | 311 | 345 | | | | | | | |
| 36 | 344 | 330 | 321 | 311 | 344 | | | | | | | |

FIG. 3B
CHOSEN NUMBER OF OVERDRIVE SPEEDS & COMBINATIONS
OF DEFINED GEAR RATIOS IN EACH UNIT

| List of Gearsets | Gearbox of 3X3X3X4 & 108 forward 27 reverse speeds by 26 gears | Gearbox of 3X3X3X3 & 81 forward 27 reverse speeds by 24 gears | Gearbox of 2X3X3X3 & 54 forward 18 reverse speeds by 22 gears | Gearbox of 2X2X3X3 & 36 forward 12 reverse speeds by 20 gears | Gearbox of 2X2X2X3 & 24 forward 8 reverse speeds by 18 gears | Gearbox of 2X2X2X2 & 16 forward 8 reverse speeds by 16 gears |
|---|---|---|---|---|---|---|
| \multicolumn{7}{c}{UNIT A has 4 or 3 or 2 gearsets} |
| 347 | 1 | - | - | - | - | - |
| 346 | 1/R | 1 | 1 | 1 | 1 | - |
| 345 | $1/R^2$ | 1/R | 1/R | 1/R | 1/R | 1 |
| 344 | $1/R^3$ | $1/R^2$ | $1/R^2$ | $1/R^2$ | $1/R^2$ | 1/R |
| \multicolumn{7}{c}{UNIT B has 3 or 2 gearsets} |
| 334 | $1/R^8$ | $1/R^3$ | $1/R^3$ | $1/R^3$ | - | - |
| 333 | 1 | 1 | 1 | 1 | 1 | 1 |
| 335 | $1/R^4$ | $1/R^3$ | $1/R^3$ | $1/R^3$ | $R^3$ | $1/R^2$ |
| \multicolumn{7}{c}{UNIT C has 3 or 2 gearsets} |
| 325 | 1 | 1 | 1 | 1 | 1 | 1 |
| 324 | $1/R^{12}$ | $1/R^9$ | $1/R^9$ | - | - | - |
| 323 | $1/R^{24}$ | $1/R^{18}$ | $1/R^{18}$ | $1/R^9$ | $1/R^6$ | $1/R^4$ |
| \multicolumn{7}{c}{UNIT D has 4 or 3 or 2 gearsets} |
| 315 | $1/R^{36+5}$ | $1/R^{27+5}$ | - | - | - | - |
| 314 | $1/R^{0+5}$ | $1/R^{0+5}$ | $1/R^{14+5}$ | $1/R^{9+5}$ | $1/R^{6+5}$ | $1/R^{4+5}$ |
| 313 | $R^{36+3}$ | $R^{27+3}$ | $R^{13+3}$ | $R^{9+3}$ | $R^{6+3}$ | $R^{4+3}$ |
| \multicolumn{7}{c}{CHOSEN NUMBER OF OVERDRIVE SPEEDS} |
|  | 36 | 27 | 13 | 9 | 6 | 4 |

FIG. 4A-A
COMBINATIONS OF ENGAGABLE PINIONS

| Forward speeds | Gearbox of 2X2X3X3X3 & 108 forward and 36 reverse speeds by 25 gears | | | | | Gearbox of 2X2X2X3X3 & 72 forward and 24 reverse speeds by 23 gears | | | | |
|---|---|---|---|---|---|---|---|---|---|---|
| | A | B | C | D | E | A | B | C | D | E |
| 1 | 416 | 445 | 435 | 428 | 412 | 416 | 445 | 436 | 428 | 412 |
| 2 | 418 | 445 | 435 | 428 | 412 | 418 | 445 | 436 | 428 | 412 |
| 3 | 419 | 445 | 435 | 428 | 412 | 419 | 445 | 436 | 428 | 412 |
| 4 | 416 | 444 | 435 | 428 | 412 | 416 | 444 | 436 | 428 | 412 |
| 5 | 418 | 444 | 435 | 428 | 412 | 418 | 444 | 436 | 428 | 412 |
| 6 | 419 | 444 | 435 | 428 | 412 | 419 | 444 | 436 | 428 | 412 |
| 7 | 416 | 446 | 435 | 428 | 412 | 416 | 446 | 436 | 428 | 412 |
| 8 | 418 | 446 | 435 | 428 | 412 | 418 | 446 | 436 | 428 | 412 |
| 9 | 419 | 446 | 435 | 428 | 412 | 419 | 446 | 436 | 428 | 412 |
| 10 | 416 | 445 | 436 | 428 | 412 | 416 | 445 | 434 | 428 | 412 |
| 11 | 418 | 445 | 436 | 428 | 412 | 418 | 445 | 434 | 428 | 412 |
| 12 | 419 | 445 | 436 | 428 | 412 | 419 | 445 | 434 | 428 | 412 |
| 13 | 416 | 444 | 436 | 428 | 412 | 416 | 444 | 434 | 428 | 412 |
| 14 | 418 | 444 | 436 | 428 | 412 | 418 | 444 | 434 | 428 | 412 |
| 15 | 419 | 444 | 436 | 428 | 412 | 419 | 444 | 434 | 428 | 412 |
| 16 | 416 | 446 | 436 | 428 | 412 | 416 | 446 | 434 | 428 | 412 |
| 17 | 418 | 446 | 436 | 428 | 412 | 418 | 446 | 434 | 428 | 412 |
| 18 | 419 | 446 | 436 | 428 | 412 | 419 | 446 | 434 | 428 | 412 |
| 19 | 416 | 445 | 434 | 428 | 412 | 416 | 445 | 436 | 427 | 412 |
| 20 | 418 | 445 | 434 | 428 | 412 | 418 | 445 | 436 | 427 | 412 |
| 21 | 419 | 445 | 434 | 428 | 412 | 419 | 445 | 436 | 427 | 412 |
| 22 | 416 | 444 | 434 | 428 | 412 | 416 | 444 | 436 | 427 | 412 |
| 23 | 418 | 444 | 434 | 428 | 412 | 418 | 444 | 436 | 427 | 412 |
| 24 | 419 | 444 | 434 | 428 | 412 | 419 | 444 | 436 | 427 | 412 |
| 25 | 416 | 446 | 434 | 428 | 412 | 416 | 446 | 436 | 427 | 412 |
| 26 | 418 | 446 | 434 | 428 | 412 | 418 | 446 | 436 | 427 | 412 |
| 27 | 419 | 446 | 434 | 428 | 412 | 419 | 446 | 436 | 427 | 412 |
| 28 | 416 | 445 | 435 | 427 | 412 | 416 | 445 | 434 | 427 | 412 |
| 29 | 418 | 445 | 435 | 427 | 412 | 418 | 445 | 434 | 427 | 412 |
| 30 | 419 | 445 | 435 | 427 | 412 | 419 | 445 | 434 | 427 | 412 |
| 31 | 416 | 444 | 435 | 427 | 412 | 416 | 444 | 434 | 427 | 412 |
| 32 | 418 | 444 | 435 | 427 | 412 | 418 | 444 | 434 | 427 | 412 |
| 33 | 419 | 444 | 435 | 427 | 412 | 419 | 444 | 434 | 427 | 412 |
| 34 | 416 | 446 | 435 | 427 | 412 | 416 | 446 | 434 | 427 | 412 |
| 35 | 418 | 446 | 435 | 427 | 412 | 418 | 446 | 434 | 427 | 412 |
| 36 | 419 | 446 | 435 | 427 | 412 | 419 | 446 | 434 | 427 | 412 |
| 37 | 416 | 445 | 436 | 427 | 412 | 416 | 445 | 436 | 428 | 411 |

FIG. 4A-B

| | | | | | | | | | |
|---|---|---|---|---|---|---|---|---|---|
| 38 | 418 | 445 | 436 | 427 | 412 | 418 | 445 | 436 | 428 | 411 |
| 39 | 419 | 445 | 436 | 427 | 412 | 419 | 445 | 436 | 428 | 411 |
| 40 | 416 | 444 | 436 | 427 | 412 | 416 | 444 | 436 | 428 | 411 |
| 41 | 418 | 444 | 436 | 427 | 412 | 418 | 444 | 436 | 428 | 411 |
| 42 | 419 | 444 | 436 | 427 | 412 | 419 | 444 | 436 | 428 | 411 |
| 43 | 416 | 446 | 436 | 427 | 412 | 416 | 446 | 436 | 428 | 411 |
| 44 | 418 | 446 | 436 | 427 | 412 | 418 | 446 | 436 | 428 | 411 |
| 45 | 419 | 446 | 436 | 427 | 412 | 419 | 446 | 436 | 428 | 411 |
| 46 | 416 | 445 | 434 | 427 | 412 | 416 | 445 | 434 | 428 | 411 |
| 47 | 418 | 445 | 434 | 427 | 412 | 418 | 445 | 434 | 428 | 411 |
| 48 | 419 | 445 | 434 | 427 | 412 | 419 | 445 | 434 | 428 | 411 |
| 49 | 416 | 444 | 434 | 427 | 412 | 416 | 444 | 434 | 428 | 411 |
| 50 | 418 | 444 | 434 | 427 | 412 | 418 | 444 | 434 | 428 | 411 |
| 51 | 419 | 444 | 434 | 427 | 412 | 419 | 444 | 434 | 428 | 411 |
| 52 | 416 | 446 | 434 | 427 | 412 | 416 | 446 | 434 | 428 | 411 |
| 53 | 418 | 446 | 434 | 427 | 412 | 418 | 446 | 434 | 428 | 411 |
| 54 | 419 | 446 | 434 | 427 | 412 | 419 | 446 | 434 | 428 | 411 |
| 55 | 416 | 445 | 435 | 428 | 411 | 416 | 445 | 436 | 427 | 411 |
| 56 | 418 | 445 | 435 | 428 | 411 | 418 | 445 | 436 | 427 | 411 |
| 57 | 419 | 445 | 435 | 428 | 411 | 419 | 445 | 436 | 427 | 411 |
| 58 | 416 | 444 | 435 | 428 | 411 | 416 | 444 | 436 | 427 | 411 |
| 59 | 418 | 444 | 435 | 428 | 411 | 418 | 444 | 436 | 427 | 411 |
| 60 | 419 | 444 | 435 | 428 | 411 | 419 | 444 | 436 | 427 | 411 |
| 61 | 416 | 446 | 435 | 428 | 411 | 416 | 446 | 436 | 427 | 411 |
| 62 | 418 | 446 | 435 | 428 | 411 | 418 | 446 | 436 | 427 | 411 |
| 63 | 419 | 446 | 435 | 428 | 411 | 419 | 446 | 436 | 427 | 411 |
| 64 | 416 | 445 | 436 | 428 | 411 | 416 | 445 | 434 | 427 | 411 |
| 65 | 418 | 445 | 436 | 428 | 411 | 418 | 445 | 434 | 427 | 411 |
| 66 | 419 | 445 | 436 | 428 | 411 | 419 | 445 | 434 | 427 | 411 |
| 67 | 416 | 444 | 436 | 428 | 411 | 416 | 444 | 434 | 427 | 411 |
| 68 | 418 | 444 | 436 | 428 | 411 | 418 | 444 | 434 | 427 | 411 |
| 69 | 419 | 444 | 436 | 428 | 411 | 419 | 444 | 434 | 427 | 411 |
| 70 | 416 | 446 | 436 | 428 | 411 | 416 | 446 | 434 | 427 | 411 |
| 71 | 418 | 446 | 436 | 428 | 411 | 418 | 446 | 434 | 427 | 411 |
| 72 | 419 | 446 | 436 | 428 | 411 | 419 | 446 | 434 | 427 | 411 |
| 73 | 416 | 445 | 434 | 428 | 411 | | | | | |
| 74 | 418 | 445 | 434 | 428 | 411 | | | | | |
| 75 | 419 | 445 | 434 | 428 | 411 | | | | | |
| 76 | 416 | 444 | 434 | 428 | 411 | | | | | |
| 77 | 418 | 444 | 434 | 428 | 411 | | | | | |
| 78 | 419 | 444 | 434 | 428 | 411 | | | | | |
| 79 | 416 | 446 | 434 | 428 | 411 | | | | | |
| 80 | 418 | 446 | 434 | 428 | 411 | | | | | |

FIG. 4A-C

| 81 | 419 | 446 | 434 | 428 | 411 | | | | |
|---|---|---|---|---|---|---|---|---|---|
| 82 | 416 | 445 | 435 | 427 | 411 | | | | |
| 83 | 418 | 445 | 435 | 427 | 411 | | | | |
| 84 | 419 | 445 | 435 | 427 | 411 | | | | |
| 85 | 416 | 444 | 435 | 427 | 411 | | | | |
| 86 | 418 | 444 | 435 | 427 | 411 | | | | |
| 87 | 419 | 444 | 435 | 427 | 411 | | | | |
| 88 | 416 | 446 | 435 | 427 | 411 | | | | |
| 89 | 418 | 446 | 435 | 427 | 411 | | | | |
| 90 | 419 | 446 | 435 | 427 | 411 | | | | |
| 91 | 416 | 445 | 436 | 427 | 411 | | | | |
| 92 | 418 | 445 | 436 | 427 | 411 | | | | |
| 93 | 419 | 445 | 436 | 427 | 411 | | | | |
| 94 | 416 | 444 | 436 | 427 | 411 | | | | |
| 95 | 418 | 444 | 436 | 427 | 411 | | | | |
| 96 | 419 | 444 | 436 | 427 | 411 | | | | |
| 97 | 416 | 446 | 436 | 427 | 411 | | | | |
| 98 | 418 | 446 | 436 | 427 | 411 | | | | |
| 99 | 419 | 446 | 436 | 427 | 411 | | | | |
| 100 | 416 | 445 | 434 | 427 | 411 | | | | |
| 101 | 418 | 445 | 434 | 427 | 411 | | | | |
| 102 | 419 | 445 | 434 | 427 | 411 | | | | |
| 103 | 416 | 444 | 434 | 427 | 411 | | | | |
| 104 | 418 | 444 | 434 | 427 | 411 | | | | |
| 105 | 419 | 444 | 434 | 427 | 411 | | | | |
| 106 | 416 | 446 | 434 | 427 | 411 | | | | |
| 107 | 418 | 446 | 434 | 427 | 411 | | | | |
| 108 | 419 | 446 | 434 | 427 | 411 | | | | |

FIG. 4A-D
COMBINATIONS OF ENGAGABLE PINIONS

| Forward speeds | Gearbox of 2X2X2X2X3 & 48 forward and 24 reverse speeds by 21 gears | | | | | Gearbox of 2X2X2X2X2 & 32 forward and 16 reverse speeds by 19 gears | | | | |
|---|---|---|---|---|---|---|---|---|---|---|
| | A | B | C | D | E | A | B | C | D | E |
| 1 | 416 | 446 | 436 | 428 | 412 | 416 | 446 | 436 | 428 | 412 |
| 2 | 418 | 446 | 436 | 428 | 412 | 419 | 446 | 436 | 428 | 412 |
| 3 | 419 | 446 | 436 | 428 | 412 | 416 | 447 | 436 | 428 | 412 |
| 4 | 416 | 447 | 436 | 428 | 412 | 419 | 447 | 436 | 428 | 412 |
| 5 | 418 | 447 | 436 | 428 | 412 | 416 | 446 | 437 | 428 | 412 |
| 6 | 419 | 447 | 436 | 428 | 412 | 419 | 446 | 437 | 428 | 412 |
| 7 | 416 | 446 | 437 | 428 | 412 | 416 | 447 | 437 | 428 | 412 |
| 8 | 418 | 446 | 437 | 428 | 412 | 419 | 447 | 437 | 428 | 412 |
| 9 | 419 | 446 | 437 | 428 | 412 | 416 | 446 | 436 | 437 | 412 |
| 10 | 416 | 447 | 437 | 428 | 412 | 419 | 446 | 436 | 437 | 412 |
| 11 | 418 | 447 | 437 | 428 | 412 | 416 | 447 | 436 | 437 | 412 |
| 12 | 419 | 447 | 437 | 428 | 412 | 419 | 447 | 436 | 437 | 412 |
| 13 | 416 | 446 | 436 | 427 | 412 | 416 | 446 | 437 | 437 | 412 |
| 14 | 418 | 446 | 436 | 427 | 412 | 419 | 446 | 437 | 437 | 412 |
| 15 | 419 | 446 | 436 | 427 | 412 | 416 | 447 | 437 | 437 | 412 |
| 16 | 416 | 447 | 436 | 427 | 412 | 419 | 447 | 437 | 437 | 412 |
| 17 | 418 | 447 | 436 | 427 | 412 | 416 | 446 | 436 | 438 | 412 |
| 18 | 419 | 447 | 436 | 427 | 412 | 419 | 446 | 436 | 438 | 412 |
| 19 | 416 | 446 | 437 | 427 | 412 | 416 | 447 | 436 | 438 | 412 |
| 20 | 418 | 446 | 437 | 427 | 412 | 419 | 447 | 436 | 438 | 412 |
| 21 | 419 | 446 | 437 | 427 | 412 | 416 | 446 | 437 | 438 | 412 |
| 22 | 416 | 447 | 437 | 427 | 412 | 419 | 446 | 437 | 438 | 412 |
| 23 | 418 | 447 | 437 | 427 | 412 | 416 | 447 | 437 | 438 | 412 |
| 24 | 419 | 447 | 437 | 427 | 412 | 419 | 447 | 437 | 438 | 412 |
| 25 | 416 | 446 | 436 | 428 | 411 | 416 | 446 | 436 | 438 | 412 |
| 26 | 418 | 446 | 436 | 428 | 411 | 419 | 446 | 436 | 438 | 412 |
| 27 | 419 | 446 | 436 | 428 | 411 | 416 | 447 | 436 | 438 | 412 |
| 28 | 416 | 447 | 436 | 428 | 411 | 419 | 447 | 436 | 438 | 412 |
| 29 | 418 | 447 | 436 | 428 | 411 | 416 | 446 | 437 | 438 | 412 |
| 30 | 419 | 447 | 436 | 428 | 411 | 419 | 446 | 437 | 438 | 412 |
| 31 | 416 | 446 | 437 | 428 | 411 | 416 | 447 | 437 | 438 | 412 |
| 32 | 418 | 446 | 437 | 428 | 411 | 419 | 447 | 437 | 438 | 412 |
| 33 | 419 | 446 | 437 | 428 | 411 | | | | | |
| 34 | 416 | 447 | 437 | 428 | 411 | | | | | |
| 35 | 418 | 447 | 437 | 428 | 411 | | | | | |
| 36 | 419 | 447 | 437 | 428 | 411 | | | | | |
| 37 | 416 | 446 | 436 | 427 | 411 | | | | | |

FIG. 4A-E

| 38 | 418 | 446 | 436 | 427 | 411 | | | | |
|---|---|---|---|---|---|---|---|---|---|
| 39 | 419 | 446 | 436 | 427 | 411 | | | | |
| 40 | 416 | 447 | 436 | 427 | 411 | | | | |
| 41 | 418 | 447 | 436 | 427 | 411 | | | | |
| 42 | 419 | 447 | 436 | 427 | 411 | | | | |
| 43 | 416 | 446 | 437 | 427 | 411 | | | | |
| 44 | 418 | 446 | 437 | 427 | 411 | | | | |
| 45 | 419 | 446 | 437 | 427 | 411 | | | | |
| 46 | 416 | 447 | 437 | 427 | 411 | | | | |
| 47 | 418 | 447 | 437 | 427 | 411 | | | | |
| 48 | 419 | 447 | 437 | 427 | 411 | | | | |

FIG. 4B
CHOSEN NUMBER OF OVERDRIVE SPEEDS & COMBINATIONS
OF DEFINED GEAR RATIOS IN EACH UNIT

| List of Gearsets | Gearbox of 2X2X3X3X3 & 108 forward 36 reverse speeds by 25 gears | Gearbox of 2X2X2X3X3 & 72 forward 36 reverse speeds by 23 gears | Gearbox of 2X2X2X2X3 & 54 forward 24 reverse speeds by 21 gears | Gearbox of 2X2X2X2X2 & 32 forward 16 reverse speeds by19 gears |
|---|---|---|---|---|
| UNIT A has 3 gearsets | | | | |
| 420 | 1/ R | 1/ R | 1/ R | 1 |
| 421 | 1 | 1 | 1 | - |
| 422 | R | R | R | R |
| UNIT B has 3 or 2 gearsets | | | | |
| 448 | $1/R^3$ | $1/R^3$ | $1/R^2$ | $1/R$ |
| 449 | 1 | 1 | - | - |
| 447 | $R^3$ | $R^3$ | R | R |
| UNIT C has 3 or 2 gearsets | | | | |
| 438 | $1/R^9$ | $1/R^9$ | $1/R^9$ | $1/R^9$ |
| 439 | 1 | 1 | - | - |
| 437 | $R^9$ | $R^9$ | $R^9$ | $R^9$ |
| UNIT D has 2 gearsets | | | | |
| 430 | $1/R^{13}$ | $1/R^9$ | $1/R^6$ | $1/R^4$ |
| 429 | $R^{14}$ | $R^9$ | $R^6$ | $R^4$ |
| UNIT E has 2 gearsets | | | | |
| 414 | $1/R^{36+2}$ | $1/R^{18+2}$ | $1/R^{12+2}$ | $1/R^{8+2}$ |
| 413 | $R^{36+2}$ | $R^{18+2}$ | $R^{12+2}$ | $R^{8+2}$ |
| CHOSEN NUMBER OF OVERDRIVE SPEEDS | | | | |
|  | 63 | 40 | 29 | 23 |

FIG. 5A-A
COMBINATIONS OF ENGAGABLE PINIONS

| Forward speeds | Gearbox of 2X2X2X2X3X3 & 144 forward and 48 reverse speeds by 26 gears | | | | | | Gearbox of 2X2X2X2X2X3 & 96 forward and 48 reverse speeds by 24 gears | | | | | |
|---|---|---|---|---|---|---|---|---|---|---|---|---|
| | A | B | C | D | E | F | A | B | C | D | E | F |
| 1 | 517 | 535 | 546 | 528 | 552 | 513 | 517 | 536 | 546 | 528 | 552 | 513 |
| 2 | 519 | 535 | 546 | 528 | 552 | 513 | 519 | 536 | 546 | 528 | 552 | 513 |
| 3 | 520 | 535 | 546 | 528 | 552 | 513 | 520 | 536 | 546 | 528 | 552 | 513 |
| 4 | 517 | 536 | 546 | 528 | 552 | 513 | 517 | 537 | 546 | 528 | 552 | 513 |
| 5 | 519 | 536 | 546 | 528 | 552 | 513 | 519 | 537 | 546 | 528 | 552 | 513 |
| 6 | 520 | 536 | 546 | 528 | 552 | 513 | 520 | 537 | 546 | 528 | 552 | 513 |
| 7 | 517 | 537 | 546 | 528 | 552 | 513 | 517 | 536 | 545 | 528 | 552 | 513 |
| 8 | 519 | 537 | 546 | 528 | 552 | 513 | 519 | 536 | 545 | 528 | 552 | 513 |
| 9 | 520 | 537 | 546 | 528 | 552 | 513 | 520 | 536 | 545 | 528 | 552 | 513 |
| 10 | 517 | 535 | 545 | 528 | 552 | 513 | 517 | 537 | 545 | 528 | 552 | 513 |
| 11 | 519 | 535 | 545 | 528 | 552 | 513 | 519 | 537 | 545 | 528 | 552 | 513 |
| 12 | 520 | 535 | 545 | 528 | 552 | 513 | 520 | 537 | 545 | 528 | 552 | 513 |
| 13 | 517 | 536 | 545 | 528 | 552 | 513 | 517 | 536 | 546 | 529 | 552 | 513 |
| 14 | 519 | 536 | 545 | 528 | 552 | 513 | 519 | 536 | 546 | 529 | 552 | 513 |
| 15 | 520 | 536 | 545 | 528 | 552 | 513 | 520 | 536 | 546 | 529 | 552 | 513 |
| 16 | 517 | 537 | 545 | 528 | 552 | 513 | 517 | 537 | 546 | 529 | 552 | 513 |
| 17 | 519 | 537 | 545 | 528 | 552 | 513 | 519 | 537 | 546 | 529 | 552 | 513 |
| 18 | 520 | 537 | 545 | 528 | 552 | 513 | 520 | 537 | 546 | 529 | 552 | 513 |
| 19 | 517 | 535 | 546 | 529 | 552 | 513 | 517 | 536 | 545 | 529 | 552 | 513 |
| 20 | 519 | 535 | 546 | 529 | 552 | 513 | 519 | 536 | 545 | 529 | 552 | 513 |
| 21 | 520 | 535 | 546 | 529 | 552 | 513 | 520 | 536 | 545 | 529 | 552 | 513 |
| 22 | 517 | 536 | 546 | 529 | 552 | 513 | 517 | 537 | 545 | 529 | 552 | 513 |
| 23 | 519 | 536 | 546 | 529 | 552 | 513 | 519 | 537 | 545 | 529 | 552 | 513 |
| 24 | 520 | 536 | 546 | 529 | 552 | 513 | 520 | 537 | 545 | 529 | 552 | 513 |
| 25 | 517 | 537 | 546 | 529 | 552 | 513 | 517 | 536 | 546 | 528 | 552 | 513 |
| 26 | 519 | 537 | 546 | 529 | 552 | 513 | 519 | 536 | 546 | 528 | 552 | 513 |
| 27 | 520 | 537 | 546 | 529 | 552 | 513 | 520 | 536 | 546 | 528 | 552 | 513 |
| 28 | 517 | 535 | 545 | 529 | 552 | 513 | 517 | 537 | 546 | 528 | 552 | 513 |
| 29 | 519 | 535 | 545 | 529 | 552 | 513 | 519 | 537 | 546 | 528 | 552 | 513 |
| 30 | 520 | 535 | 545 | 529 | 552 | 513 | 520 | 537 | 546 | 528 | 552 | 513 |
| 31 | 517 | 536 | 545 | 529 | 552 | 513 | 517 | 536 | 545 | 528 | 552 | 513 |
| 32 | 519 | 536 | 545 | 529 | 552 | 513 | 519 | 536 | 545 | 528 | 552 | 513 |
| 33 | 520 | 536 | 545 | 529 | 552 | 513 | 520 | 536 | 545 | 528 | 552 | 513 |
| 34 | 517 | 537 | 545 | 529 | 552 | 513 | 517 | 537 | 545 | 528 | 552 | 513 |
| 35 | 519 | 537 | 545 | 529 | 552 | 513 | 519 | 537 | 545 | 528 | 552 | 513 |
| 36 | 520 | 537 | 545 | 529 | 552 | 513 | 520 | 537 | 545 | 528 | 552 | 513 |
| 37 | 517 | 535 | 546 | 528 | 553 | 513 | 517 | 536 | 546 | 529 | 552 | 513 |

FIG. 5A-B

| | | | | | | | | | | | |
|---|---|---|---|---|---|---|---|---|---|---|---|
| 38 | 519 | 535 | 546 | 528 | 553 | 513 | 519 | 536 | 546 | 529 | 552 | 513 |
| 39 | 520 | 535 | 546 | 528 | 553 | 513 | 520 | 536 | 546 | 529 | 552 | 513 |
| 40 | 517 | 536 | 546 | 528 | 553 | 513 | 517 | 537 | 546 | 529 | 552 | 513 |
| 41 | 519 | 536 | 546 | 528 | 553 | 513 | 519 | 537 | 546 | 529 | 552 | 513 |
| 42 | 520 | 536 | 546 | 528 | 553 | 513 | 520 | 537 | 546 | 529 | 552 | 513 |
| 43 | 517 | 537 | 546 | 528 | 553 | 513 | 517 | 536 | 545 | 529 | 552 | 513 |
| 44 | 519 | 537 | 546 | 528 | 553 | 513 | 519 | 536 | 545 | 529 | 552 | 513 |
| 45 | 520 | 537 | 546 | 528 | 553 | 513 | 520 | 536 | 545 | 529 | 552 | 513 |
| 46 | 517 | 535 | 545 | 528 | 553 | 513 | 517 | 537 | 545 | 529 | 552 | 513 |
| 47 | 519 | 535 | 545 | 528 | 553 | 513 | 519 | 537 | 545 | 529 | 552 | 513 |
| 48 | 520 | 535 | 545 | 528 | 553 | 513 | 520 | 537 | 545 | 529 | 552 | 513 |
| 49 | 517 | 536 | 545 | 528 | 553 | 513 | 517 | 536 | 546 | 528 | 553 | 512 |
| 50 | 519 | 536 | 545 | 528 | 553 | 513 | 519 | 536 | 546 | 528 | 553 | 512 |
| 51 | 520 | 536 | 545 | 528 | 553 | 513 | 520 | 536 | 546 | 528 | 553 | 512 |
| 52 | 517 | 537 | 545 | 528 | 553 | 513 | 517 | 537 | 546 | 528 | 553 | 512 |
| 53 | 519 | 537 | 545 | 528 | 553 | 513 | 519 | 537 | 546 | 528 | 553 | 512 |
| 54 | 520 | 537 | 545 | 528 | 553 | 513 | 520 | 537 | 546 | 528 | 553 | 512 |
| 55 | 517 | 535 | 546 | 529 | 553 | 513 | 517 | 536 | 545 | 528 | 553 | 512 |
| 56 | 519 | 535 | 546 | 529 | 553 | 513 | 519 | 536 | 545 | 528 | 553 | 512 |
| 57 | 520 | 535 | 546 | 529 | 553 | 513 | 520 | 536 | 545 | 528 | 553 | 512 |
| 58 | 517 | 536 | 546 | 529 | 553 | 513 | 517 | 537 | 545 | 528 | 553 | 512 |
| 59 | 519 | 536 | 546 | 529 | 553 | 513 | 519 | 537 | 545 | 528 | 553 | 512 |
| 60 | 520 | 536 | 546 | 529 | 553 | 513 | 520 | 537 | 545 | 528 | 553 | 512 |
| 61 | 517 | 537 | 546 | 529 | 553 | 513 | 517 | 536 | 546 | 529 | 553 | 512 |
| 62 | 519 | 537 | 546 | 529 | 553 | 513 | 519 | 536 | 546 | 529 | 553 | 512 |
| 63 | 520 | 537 | 546 | 529 | 553 | 513 | 520 | 536 | 546 | 529 | 553 | 512 |
| 64 | 517 | 535 | 545 | 529 | 553 | 513 | 517 | 537 | 546 | 529 | 553 | 512 |
| 65 | 519 | 535 | 545 | 529 | 553 | 513 | 519 | 537 | 546 | 529 | 553 | 512 |
| 66 | 520 | 535 | 545 | 529 | 553 | 513 | 520 | 537 | 546 | 529 | 553 | 512 |
| 67 | 517 | 536 | 545 | 529 | 553 | 513 | 517 | 536 | 545 | 529 | 553 | 512 |
| 68 | 519 | 536 | 545 | 529 | 553 | 513 | 519 | 536 | 545 | 529 | 553 | 512 |
| 69 | 520 | 536 | 545 | 529 | 553 | 513 | 520 | 536 | 545 | 529 | 553 | 512 |
| 70 | 517 | 537 | 545 | 529 | 553 | 513 | 517 | 537 | 545 | 529 | 553 | 512 |
| 71 | 519 | 537 | 545 | 529 | 553 | 513 | 519 | 537 | 545 | 529 | 553 | 512 |
| 72 | 520 | 537 | 545 | 529 | 553 | 513 | 520 | 537 | 545 | 529 | 553 | 512 |
| 73 | 517 | 535 | 546 | 528 | 552 | 512 | 517 | 536 | 546 | 528 | 553 | 512 |
| 74 | 519 | 535 | 546 | 528 | 552 | 512 | 519 | 536 | 546 | 528 | 553 | 512 |
| 75 | 520 | 535 | 546 | 528 | 552 | 512 | 520 | 536 | 546 | 528 | 553 | 512 |
| 76 | 517 | 536 | 546 | 528 | 552 | 512 | 517 | 537 | 546 | 528 | 553 | 512 |
| 77 | 519 | 536 | 546 | 528 | 552 | 512 | 519 | 537 | 546 | 528 | 553 | 512 |

FIG. 5A-C

| | | | | | | | | | | | |
|---|---|---|---|---|---|---|---|---|---|---|---|
| 78  | 520 | 536 | 546 | 528 | 552 | 512 | 520 | 537 | 546 | 528 | 553 | 512 |
| 79  | 517 | 537 | 546 | 528 | 552 | 512 | 517 | 536 | 545 | 528 | 553 | 512 |
| 80  | 519 | 537 | 546 | 528 | 552 | 512 | 519 | 536 | 545 | 528 | 553 | 512 |
| 81  | 520 | 537 | 546 | 528 | 552 | 512 | 520 | 536 | 545 | 528 | 553 | 512 |
| 82  | 517 | 535 | 545 | 528 | 552 | 512 | 517 | 537 | 545 | 528 | 553 | 512 |
| 83  | 519 | 535 | 545 | 528 | 552 | 512 | 519 | 537 | 545 | 528 | 553 | 512 |
| 84  | 520 | 535 | 545 | 528 | 552 | 512 | 520 | 537 | 545 | 528 | 553 | 512 |
| 85  | 517 | 536 | 545 | 528 | 552 | 512 | 517 | 536 | 546 | 529 | 553 | 512 |
| 86  | 519 | 536 | 545 | 528 | 552 | 512 | 519 | 536 | 546 | 529 | 553 | 512 |
| 87  | 520 | 536 | 545 | 528 | 552 | 512 | 520 | 536 | 546 | 529 | 553 | 512 |
| 88  | 517 | 537 | 545 | 528 | 552 | 512 | 517 | 537 | 546 | 529 | 553 | 512 |
| 89  | 519 | 537 | 545 | 528 | 552 | 512 | 519 | 537 | 546 | 529 | 553 | 512 |
| 90  | 520 | 537 | 545 | 528 | 552 | 512 | 520 | 537 | 546 | 529 | 553 | 512 |
| 91  | 517 | 535 | 546 | 529 | 552 | 512 | 517 | 536 | 545 | 529 | 553 | 512 |
| 92  | 519 | 535 | 546 | 529 | 552 | 512 | 519 | 536 | 545 | 529 | 553 | 512 |
| 93  | 520 | 535 | 546 | 529 | 552 | 512 | 520 | 536 | 545 | 529 | 553 | 512 |
| 94  | 517 | 536 | 546 | 529 | 552 | 512 | 517 | 537 | 545 | 529 | 553 | 512 |
| 95  | 519 | 536 | 546 | 529 | 552 | 512 | 519 | 537 | 545 | 529 | 553 | 512 |
| 96  | 520 | 536 | 546 | 529 | 552 | 512 | 520 | 537 | 545 | 529 | 553 | 512 |
| 97  | 517 | 537 | 546 | 529 | 552 | 512 | | | | | | |
| 98  | 519 | 537 | 546 | 529 | 552 | 512 | | | | | | |
| 99  | 520 | 537 | 546 | 529 | 552 | 512 | | | | | | |
| 100 | 517 | 535 | 545 | 529 | 552 | 512 | | | | | | |
| 101 | 519 | 535 | 545 | 529 | 552 | 512 | | | | | | |
| 102 | 520 | 535 | 545 | 529 | 552 | 512 | | | | | | |
| 103 | 517 | 536 | 545 | 529 | 552 | 512 | | | | | | |
| 104 | 519 | 536 | 545 | 529 | 552 | 512 | | | | | | |
| 105 | 520 | 536 | 545 | 529 | 552 | 512 | | | | | | |
| 106 | 517 | 537 | 545 | 529 | 552 | 512 | | | | | | |
| 107 | 519 | 537 | 545 | 529 | 552 | 512 | | | | | | |
| 108 | 520 | 537 | 545 | 529 | 552 | 512 | | | | | | |
| 109 | 517 | 535 | 546 | 528 | 553 | 512 | | | | | | |
| 110 | 519 | 535 | 546 | 528 | 553 | 512 | | | | | | |
| 111 | 520 | 535 | 546 | 528 | 553 | 512 | | | | | | |
| 112 | 517 | 536 | 546 | 528 | 553 | 512 | | | | | | |
| 113 | 519 | 536 | 546 | 528 | 553 | 512 | | | | | | |
| 114 | 520 | 536 | 546 | 528 | 553 | 512 | | | | | | |
| 115 | 517 | 537 | 546 | 528 | 553 | 512 | | | | | | |
| 116 | 519 | 537 | 546 | 528 | 553 | 512 | | | | | | |
| 117 | 520 | 537 | 546 | 528 | 553 | 512 | | | | | | |

FIG. 5A-D

| | | | | | | | | | | | | |
|---|---|---|---|---|---|---|---|---|---|---|---|---|
| 118 | 517 | 535 | 545 | 528 | 553 | 512 | | | | | | |
| 119 | 519 | 535 | 545 | 528 | 553 | 512 | | | | | | |
| 120 | 520 | 535 | 545 | 528 | 553 | 512 | | | | | | |
| 121 | 517 | 536 | 545 | 528 | 553 | 512 | | | | | | |
| 122 | 519 | 536 | 545 | 528 | 553 | 512 | | | | | | |
| 123 | 520 | 536 | 545 | 528 | 553 | 512 | | | | | | |
| 124 | 517 | 537 | 545 | 528 | 553 | 512 | | | | | | |
| 125 | 519 | 537 | 545 | 528 | 553 | 512 | | | | | | |
| 126 | 520 | 537 | 545 | 528 | 553 | 512 | | | | | | |
| 127 | 517 | 535 | 546 | 529 | 553 | 512 | | | | | | |
| 128 | 519 | 535 | 546 | 529 | 553 | 512 | | | | | | |
| 129 | 520 | 535 | 546 | 529 | 553 | 512 | | | | | | |
| 130 | 517 | 536 | 546 | 529 | 553 | 512 | | | | | | |
| 131 | 519 | 536 | 546 | 529 | 553 | 512 | | | | | | |
| 132 | 520 | 536 | 546 | 529 | 553 | 512 | | | | | | |
| 133 | 517 | 537 | 546 | 529 | 553 | 512 | | | | | | |
| 134 | 519 | 537 | 546 | 529 | 553 | 512 | | | | | | |
| 135 | 520 | 537 | 546 | 529 | 553 | 512 | | | | | | |
| 136 | 517 | 535 | 545 | 529 | 553 | 512 | | | | | | |
| 137 | 519 | 535 | 545 | 529 | 553 | 512 | | | | | | |
| 138 | 520 | 535 | 545 | 529 | 553 | 512 | | | | | | |
| 139 | 517 | 536 | 545 | 529 | 553 | 512 | | | | | | |
| 140 | 519 | 536 | 545 | 529 | 553 | 512 | | | | | | |
| 141 | 520 | 536 | 545 | 529 | 553 | 512 | | | | | | |
| 142 | 517 | 537 | 545 | 529 | 553 | 512 | | | | | | |
| 143 | 519 | 537 | 545 | 529 | 553 | 512 | | | | | | |
| 144 | 520 | 537 | 545 | 529 | 553 | 512 | | | | | | |

FIG. 5A-E
COMBINATIONS OF ENGAGABLE PINIONS

| Forward speeds | Gearbox of 2X2X2X2X2X2 & 64 forward and 8 reverse speeds by 19 gears | | | | | |
|---|---|---|---|---|---|---|
| | A | B | C | D | E | F |
| 1 | 519 | 536 | 546 | 528 | 552 | 513 |
| 2 | 520 | 536 | 546 | 528 | 552 | 513 |
| 3 | 519 | 537 | 546 | 528 | 552 | 513 |
| 4 | 520 | 537 | 546 | 528 | 552 | 513 |
| 5 | 517 | 535 | 545 | 528 | 552 | 513 |
| 6 | 520 | 535 | 545 | 528 | 552 | 513 |
| 7 | 517 | 536 | 545 | 528 | 552 | 513 |
| 8 | 520 | 536 | 545 | 528 | 552 | 513 |
| 9 | 517 | 535 | 546 | 529 | 552 | 513 |
| 10 | 520 | 535 | 546 | 529 | 552 | 513 |
| 11 | 517 | 536 | 546 | 529 | 552 | 513 |
| 12 | 520 | 536 | 546 | 529 | 552 | 513 |
| 13 | 517 | 535 | 545 | 529 | 552 | 513 |
| 14 | 520 | 535 | 545 | 529 | 552 | 513 |
| 15 | 517 | 536 | 545 | 529 | 552 | 513 |
| 16 | 520 | 536 | 545 | 529 | 552 | 513 |
| 17 | 517 | 535 | 546 | 528 | 553 | 513 |
| 18 | 520 | 535 | 546 | 528 | 553 | 513 |
| 19 | 517 | 536 | 546 | 528 | 553 | 513 |
| 20 | 520 | 536 | 546 | 528 | 553 | 513 |
| 21 | 517 | 535 | 545 | 528 | 553 | 513 |
| 22 | 520 | 535 | 545 | 528 | 553 | 513 |
| 23 | 517 | 536 | 545 | 528 | 553 | 513 |
| 24 | 520 | 536 | 545 | 528 | 553 | 513 |
| 25 | 517 | 535 | 546 | 529 | 553 | 513 |
| 26 | 520 | 535 | 546 | 529 | 553 | 513 |
| 27 | 517 | 536 | 546 | 529 | 553 | 513 |
| 28 | 520 | 536 | 546 | 529 | 553 | 513 |
| 29 | 517 | 535 | 545 | 529 | 553 | 513 |
| 30 | 520 | 535 | 545 | 529 | 553 | 513 |
| 31 | 517 | 536 | 545 | 529 | 553 | 513 |
| 32 | 520 | 536 | 545 | 529 | 553 | 513 |
| 33 | 517 | 535 | 546 | 528 | 552 | 512 |
| 34 | 520 | 535 | 546 | 528 | 552 | 512 |
| 35 | 517 | 536 | 546 | 528 | 552 | 512 |
| 36 | 520 | 536 | 546 | 528 | 552 | 512 |

FIG. 5A-F

| 37 | 517 | 535 | 545 | 528 | 552 | 512 |
|----|-----|-----|-----|-----|-----|-----|
| 38 | 520 | 535 | 545 | 528 | 552 | 512 |
| 39 | 517 | 536 | 545 | 528 | 552 | 512 |
| 40 | 520 | 536 | 545 | 528 | 552 | 512 |
| 41 | 517 | 535 | 546 | 529 | 552 | 512 |
| 42 | 520 | 535 | 546 | 529 | 552 | 512 |
| 43 | 517 | 536 | 546 | 529 | 552 | 512 |
| 44 | 520 | 536 | 546 | 529 | 552 | 512 |
| 45 | 517 | 535 | 545 | 529 | 552 | 512 |
| 46 | 520 | 535 | 545 | 529 | 552 | 512 |
| 47 | 517 | 536 | 545 | 529 | 552 | 512 |
| 48 | 520 | 536 | 545 | 529 | 552 | 512 |
| 49 | 517 | 535 | 546 | 528 | 553 | 512 |
| 50 | 520 | 535 | 546 | 528 | 553 | 512 |
| 51 | 517 | 536 | 546 | 528 | 553 | 512 |
| 52 | 520 | 536 | 546 | 528 | 553 | 512 |
| 53 | 517 | 535 | 545 | 528 | 553 | 512 |
| 54 | 520 | 535 | 545 | 528 | 553 | 512 |
| 55 | 517 | 536 | 545 | 528 | 553 | 512 |
| 56 | 520 | 536 | 545 | 528 | 553 | 512 |
| 57 | 517 | 535 | 546 | 529 | 553 | 512 |
| 58 | 520 | 535 | 546 | 529 | 553 | 512 |
| 59 | 517 | 536 | 546 | 529 | 553 | 512 |
| 60 | 520 | 536 | 546 | 529 | 553 | 512 |
| 61 | 517 | 535 | 545 | 529 | 553 | 512 |
| 62 | 520 | 535 | 545 | 529 | 553 | 512 |
| 63 | 517 | 536 | 545 | 529 | 553 | 512 |
| 64 | 520 | 536 | 545 | 529 | 553 | 512 |

FIG. 5B
CHOSEN NUMBER OF OVERDRIVE SPEEDS & COMBINATIONS OF DEFINED
GEAR RATIOS IN EACH UNIT

| List of Gearsets | Gearbox of 2X2X2X2X3X3 & 144 forward and 48 reverse speeds by 26 gears | Gearbox of 2X2X2X2X2X3 & 96 forward and 48 reverse speeds by 24 gears | Gearbox of 2X2X2X2X2X2 & 64 forward and 32 reverse speeds by 22 gears |
|---|---|---|---|
| | UNIT A has 3 or 2 gearsets | | |
| 523 | R | R | R |
| 522 | 1 | 1 | 1 |
| 521 | 1/R | 1/R | - |
| | UNIT B has 3 or 2 gearsets | | |
| 539 | $1/R^3$ | 1 | $1/R$ |
| 540 | $R^3$ | $R^3$ | $R^2$ |
| 538 | 1 | - | - |
| | UNIT C has 2 gearsets | | |
| 547 | $1/R^4$ | $1/R^3$ | $1/R^2$ |
| 348 | $R^5$ | $R^3$ | $R^2$ |
| | UNIT D has 2 gearsets | | |
| 530 | $1/R^9$ | $1/R^6$ | $1/R^4$ |
| 531 | $R^9$ | $R^6$ | $R^4$ |
| | UNIT E has 2 gearsets | | |
| 554 | $1/R^{18}$ | $1/R^{12}$ | $1/R^8$ |
| 555 | $R^{18}$ | $R^{12}$ | $R^8$ |
| | UNIT F has 2 gearsets | | |
| OVERDRIVE SPEEDS | 72 Forward | 48 Forward | 32 Forward |
| 514 | $R^{36+2}$ | $R^{24+2}$ | $R^{16+2}$ |
| 515 | $1/R^{36+3}$ | $1/R^{24+3}$ | $1/R^{16+3}$ |

FIG. 6A
COMBINATIONS OF SELECTED COMPOUND MDU GEARBOX
PINIONS ARE DRIVING FRONT, REAR, AND FOUR WHEELS

| Forward torque and overdrive | 2 pinion group A | 2 pinion group B | 2 pinion group C | 2 pinion group D | Reverse torques, Overdrive speeds |
|---|---|---|---|---|---|
| FRONT- WHEELS DRIVE | | | | | |
| 1 | 630 | 623 | 617 | 611 | |
| 2 | 631 | 623 | 617 | 611 | |
| 3 | 630 | 627 | 617 | 611 | |
| 4 | 631 | 627 | 617 | 611 | |
| 5 | 630 | 623 | 618 | 611 | |
| 6 | 631 | 623 | 618 | 611 | |
| 7 | 630 | 627 | 618 | 611 | |
| 8 | 631 | 627 | 618 | 611 | |
| 9 | 630 | 623 | 617 | 610 | |
| 10 | 631 | 623 | 617 | 610 | |
| 11 | 630 | 627 | 617 | 610 | |
| 12 | 631 | 627 | 617 | 610 | |
| 13 | 630 | 623 | 618 | 610 | |
| 14 | 631 | 623 | 618 | 610 | |
| 15 | 630 | 627 | 618 | 610 | |
| 16 | 631 | 627 | 618 | 610 | |
| CLUTCH 650 | | | | | |
| 17 | 17 | 17 | 17 | 17 | 17 |
| 18 | 18 | 18 | 18 | 18 | 18 |
| 19 | 19 | 19 | 19 | 19 | 19 |
| 20 | 20 | 20 | 20 | 20 | 20 |
| FIRST REAR WHEELS | | | | | |
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| Clutch 650 | | | | | |
| SECOND REAR WHEELS | | | | | |
| | - | 623 | 617 | 611 | 1 |
| | - | 627 | 617 | 611 | 2 |
| | - | 623 | 618 | 611 | 3 |
| | - | 627 | 618 | 611 | 4 |
| | - | 623 | 617 | 610 | 5 |
| | - | 627 | 617 | 610 | 6 |
| | - | 623 | 617 | 610 | 7 |
| | - | 627 | 617 | 610 | 8 |
| CLUTCH 650 | | | | | |
| | - | 623 | - | - | 9 |
| | - | 627 | - | - | 10 |

FIG. 6B
FOUR GROUPS TO FORM GEARSETS DEFINITE RATIOS

| GROUP A GEARSETS/ RATIO | GROUP B GEARSETS/ RATIO | GROUP C GEARSET/ RATIO | GROUP D GEARSET/ RATIO |
|---|---|---|---|
| 632/ 1/R | 624 / $R^3$ | 619 / $1/R^8$ | 612 / $1/R^8$ |
| 633/ 1 | 628/ $R^5$ | 620/ $1/R^4$ | 613/1 |

FIG. 7A
COMBINATIONS OF SELECTED PINIONS OF FRONT AND REAR WHEELS DRIVE

| FORWARD TORQUES | 2 PINIONS GROUP A | 2 PINIONS GROUP B1 | 2 PINIONS GROUP B2 | 2 PINIONS GROUP 1/B2 | REVERSE TORQUES | PINION LIST |
|---|---|---|---|---|---|---|
| REAR WHEELS ||||||||
| 1 | 722 | CLUTCH 740 | - | 716 | 1 | 706 |
| 2 | 708 | CLUTCH 740 | - | 716 | 2 | 706 |
| 3 | 722 | 709 | - | - | - | - |
| 4 | 708 | 709 | - | - | - | - |
| 5 | 722 | 710 | - | - | - | - |
| 6 | 708 | 710 | - | - | - | - |
| 7 direct | 722 | CLUTCH 740 | - | 717 | - | - |
| 8 overdrive | 708 | CLUTCH 740 | - | 717 | - | - |
| FRONT WHEELS ||||||||
| 1 | - | 709 | 722 | - | 1 | 708 |
| 2 | - | 709 | 721 | - | 2 | 708 |
| 3 overdrive | - | 710 | 722 | - | - | - |
| 4 overdrive | - | 710 | 721 | - | - | - |
| 5 direct | CLUTCH 740 ||||||
| ALL WHEELS DRIVE ||||||||
| torque $1/R^5$ | 722 | 709 | - | 722 | | |
| torque $1/R^3$ | 722 | 710 | - | 722 | | |
| direct speed | 722 | Clutch 740 | 717 | - | | |

FIG. 7B
FOUR GROUPS TO FORM GEARSETS DEFINITE RATIOS

| GROUP A GEARSETS/ RATIO | GROUP B1 GEARSETS/ RATIO | GROUP B2 GEARSET/ RATIO | GROUP 1/B2 GEARSET/ RATIO |
|---|---|---|---|
| 723/$1/R^2$ | 712 / $1/R$ | 718 / $1/R^3$ | 718' / $R^3$ |
| 724/$1/R$ | 711/ $1/R^3$ | 719/ $R^2$ | 719'/ $1/R^2$ |

| First front wheels | First rear wheels |
|---|---|
| 4 forward overdrive speeds | 4 forward torques |
| Second front wheels | Second rear wheels |
| 2 reverse speeds | 2 reverse speeds |

| First front and rear wheels | Second front and rear wheels |
|---|---|
| 2 forward torques | 2 reverse speeds |
| 2 overdrive speeds | |
| First or rear wheels | Second front or rear wheels |
| 2 forward torques | 2 reverse speeds |
| 2 overdrive speeds | |

FIG. 11A
COMBINATIONS OF SELECTED PINIONS THAT
DRIVES THE FRONT, REAR, FOUR, AND SIX WHEELS

| Forward torque and overdrive | 2 pinion group A | 2 pinion group B1 | 2 pinion group B2 | 2 pinion group B2 | Reverse torques | List reverse torques |
|---|---|---|---|---|---|---|
| FRONT- WHEELS DRIVE | | | | | | |
| 1 | 1116 | - | 1119 | - | - | - |
| 2 | 1123 | - | 1119 | - | - | - |
| 3 | 1116 | - | 1118 | - | - | - |
| 4 | 1123 | - | 1118 | - | - | - |
| 5 | 1116 | 1109 | - | | 1 | 1114 |
| 6 | 1123 | 1109 | - | | 2 | 1114 |
| FIRST PAIR OF REAR-WHEELS DRIVE | | | | | | |
| 1 | - | 1109 | - | 1123 | 1 | 1114 clutch 1151 |
| 2 | - | 1109 | - | 1124 | 2 | 1114 clutch 1151 |
| direct | | clutch 1150 | clutch 1151 | | | |
| SECOND PAIR OF REAR-WHEELS DRIVE | | | | | | |
| 1 | - | 1108 | - | - | 1 | 1119 clutch 1152 |
| | - | | - | - | 2 | 1118 clutch 1152 |
| - | - | - | - | - | 3 | 1109 clutch 1152 |
| 4X4 all rear wheels drive | | 1108 clutch 1150 | clutch 1151 | - | | |
| 4X4 front and rear wheels #1 | 1116 | 1109 clutch 1150 | clutch 1151 | - | | |
| 4X4 front and rear wheels #2 | 1116 | 1108, 1109 | clutch 1152 | - | 1 | 1108, 1123, 1118 clutch 1150, 1152 |
| 6X6 all wheels drive | 1116 | 1108, 1109 clutch 1150 | clutch 1151, 1152 | - | | |

FIG. 11B
FOUR GROUPS TO FORM GEARSETS DEFINITE RATIOS

| GROUP A GEARSETS/ RATIO | GROUP B1 GEARSETS/ RATIO | GROUP B2 GEARSET/ RATIO | GROUP 1/B2 GEARSET/ RATIO |
|---|---|---|---|
| 1125/ 1 | 1111/ 1 | 1120/ $R^2$ | 1120/ $1/R^2$ |
| 1126/ $1/R^2$ | 1112/ $1/R^2$ | 1121/ $1/R^3$ | 1121/ $R^3$ |

GEAR BOX APPARATUS

CROSS REFERENCE TO RELATED APPLICATIONS

This application claims the benefit of PPA App. No. 60/840,665 filed 2006 Aug. 28 by the Vladimir Abramov.

FIELD OF THE INVENTION

This invention relates to a gearbox with at least two independent shafts from other; each shaft supported two pair gearsets and more having degrees of constant ratios in a geometric sequence and/or faltering geometric sequence to provide both a number of torques and a number of overdrive speeds shifting by at least two levers in manual regime that is switched to semi-automatic and automatic regimes.

BACKGROUND OF THE INVENTION

There is a need for power systems to move land, sea and air transporting vehicles, heavy equipment, conveyer system, and machine tools to produce parts with dramatically increased fuel, natural gas and/or electricity efficiency. In addition, there is a need for improvement in the maneuverability of land, sea and air transporting vehicles. Also there is a need to extend the field of use of wind energy generation by reducing the sizes of wind turbines. For example, existing gearbox of land vehicle never drives part time front then rear wheels then four wheels to forward and reverse then six wheels to forward. The existing gearbox of sea and air transporting vehicles never provide additional directions up or down when moving forward and up or down when making turns, and produces limited forward speeds and torques.

Similarly, other motorized machines such as universal machine tools and heavy equipment that have several speeds use motors with gearboxes that are inefficient and consume much power. This is no longer satisfactory since the cost of power has increased sharply in recent years.

These motorized systems have three major disadvantages. Firstly, current motors with interior acceleration systems lose a substantial amount of energy, up to 80% in some cases, in the form of heat. These systems use overly large motors with internal acceleration systems to cause a drive shaft to move at excessive speeds. The gearboxes or transmissions are used as brakes to obtain useful speeds as are required in work process. Other words, the function of a shift gearbox as brakes is opposite to the function of the acceleration system. In operation, they result in the creation of a large amount of wasted energy in the form of heat.

Secondly, larger motors are required than necessary to perform a task when they work without any gearbox or with existing gearbox-transmission designs. The huge motors of a locomotive, helicopter, ship, submarine, CNC machine tools, or conveyer consume too much fuel and/or electricity when their power sources are directly joined to working organ (wheels, propeller, and part) without levers through a shift gearbox. For example, the huge cruise ship without transmission wastes one gallon of fuel per 30 inches of distant. Use of planetary or hydraulic transmissions of present designs requires increasing the size of engine. Present transmission designed in automobiles require large motors because the gas in the gas-powered engine or magnetic field in the electric motor requires much time to increase the lower torque up to a sufficient magnitude of higher torque.

Thirdly, present gearboxes use a design concept of gearbox design that use only one independent shaft and requires very complex shifting pattern for one-two gearshift lever or other similar design. As a result, it provides too many gears, requires the use clutch(s) for interrupting of motor power and prevents the creation of a fully automatic shifting mechanism that can be governed by computer.

The existing method creates each shift gearbox comprising an excessive number of gears and too much number of shafts if it has more than three shafts quantity. It never creates a shift gearbox that produces more than from one or two reverse speeds to up to the same number of forward speeds without additional gear numbers. The shift gearbox designs of the present method of design prevent the creation of one overdrive speed without additional gear numbers.

An attempt has been used to save energy for heavy-duty trucks by use of a detached unit to create overdrive speeds that is installed on rear wheels. It is inefficient because the expensive unit for one- two overdrive speeds with an additional gearshift lever creates complex operations and the economy of energy is dependent to driver's experience.

Most existing vehicles have one power source joined to one drive shaft of the gearbox. These designs are inefficient for save energy since a power source has two significantly different energy consumptions in movement. First power consumption is as static friction as vehicle increases speed from stop. Second power consumption is as inertia in the process of movement with much lower friction after acceleration.

Present motors operate to move land, sea and air vehicles, conveyers, and parts of machine tools in a manner that consumes an excessive amount of fuel and electricity. Currently engines and motors operate to create excessive speeds and inefficient torques that are increased with reduced speeds by such means as transmissions to torques appropriate to turn shafts or rotors at desired speeds. Acceleration systems then inject more fuel and electricity to maintain or increase speeds. As a result, a large amount of energy is not used directly to move a vehicle, heavy equipment and parts of machine tools.

When the cost of fuel, natural gas and electricity was relatively inexpensive, fuel, natural gas and electricity consumption was less of a concern. Large industries were built with vehicles, heavy equipment, crafts with propellers, CNC machine tools, conveyer system, and others powered by propulsion systems that were inefficient.

Semi-automatic and automatic transmissions of vehicle did not significantly improve fuel and/or electricity consumption. They made the shifting of gears easier and often times faster but did not change the system where excessive power was generated by motors and transmissions were used to reduce the torque to amounts useful to drive shafts, rotors and axels, and acceleration systems were used to maintain and increase speeds.

The torque magnitude is increased too slowly through use of gas by the engine or of the electromagnetic field of the motor since acceleration of vehicle from zero to sufficient torque magnitude demands too much time. In addition, the acceleration system reduces torque magnitude of engine shaft in the same time. Therefore, the excessive power of engine or motor of machine propulsion is capable to solve this technical problem as excessive weight of shift gearbox comprising only steel gears and shafts.

Most conveyer systems have a constant speed of movement. However, they frequently are empty or insufficient loaded. Therefore, the transporting and manufacturing processes use the excessive electricity and waste the time of work.

The problem of the wind energy technology is excessively large size of wind turbines and a fast changeable force of wind that reduce the efficiency of use.

With the rising cost of energy, there is an increasing need for power systems to move land, sea and air transporting vehicles, heavy equipment, conveyer systems, and machine tools to produce parts with substantially increased fuel, natural gas and/or electricity efficiency. In addition, there is a need for improvement of maneuverability land, sea and air transporting vehicles and the extending the field to use wind energy technology.

SUMMARY OF THE INVENTION

I have invented a motorized machine that includes a gear box and system that more efficiently converts momentum and engine or motor power to speed in vehicles, heavy equipment, craft, conveyer, and machine tools or other machines to dramatically increase fuel and/or electricity efficiency. The motorized machine includes (1) at least one motor in communication with a source of energy and comprising an internal acceleration system, (2) at least one drive shaft connected to the motor, and (3) a gearbox connected by at least one drive shaft to the motor. The gearbox includes (1) at least two independent shafts, (2) at least one output shaft, and (3) a sufficient number of gearsets with gear ratios selected from a faltering geometric sequence and arranged to provide a sufficient number of torques and overdrive speeds to the output shaft to satisfactorily operate the machine over a conventional range of machine speeds and at least limit the use of the acceleration system in the motor to reduce the heat and power generated from the motor to less than 50 percent that used to generate a similar conventional range of machine speeds using a motor with a conventional gearbox.

Thus, conventional ranges of speed and rates of acceleration can be achieved with significantly less fuel consumption. In some embodiments, motors able to produce 500 horsepower (hp) may be replaced with motors able to produce less than 100 hp with little if any loss in speed or acceleration capabilities. In other embodiments, motors able to produce 250 hp may be replaces with those able to produce less than 25 hp without significant loss of speed or acceleration. An acceleration time of vehicle may be shorter if MDUFEE gearbox with sufficient number of overdrive speeds eliminates the acceleration system.

The gearboxes use gearsets that are arranged in geometric sequences to transmit mutually definite units of energy (MDU) similar to what is taught in U.S. Pat. No. 7,191,676. However, incorporation of gearsets with sequences transformed into faltering geometric sequences result in designs with reduced number of gears, increased efficiency and greater maneuverability where beneficial. The faltering geometric sequence is composed of two general geometric sequences that are created by two different common ratios and/or a general geometric sequence comprising at least two adjacent items that differ by degrees of two or more. This embodiment includes 260 families of above 1,000 MDU gearbox designs with forced energy economy system (FEES), called mutually definite units of energy forced energy economy (MDUFEE) gearbox families, comprising 3, 4, 5, 6, 7, 8, and 9 shafts. A FEES comprising semi-automatic and/or full automatic regimes with a shifting mechanism with computer control and incorporation of gearsets to vary both torques and overdrive speeds greatly extends the uses and applications previously taught. It is work dependent to a changeable load and inertia of movement.

MDUFEE gearbox apparatus more efficiently converts momentum and engine or motor power to speed in vehicles based on land, water, and air such as, cars, trucks, motorcycles, locomotives, helicopters, propeller airplanes, ships, submarines, boats etc, heavy equipment such as combine harvester, bulldozer, all tractors, excavators etc, all conveyer systems, and machine tools such as CNC and universal to dramatically increase fuel and/or electricity efficiency. The gearbox includes a sufficient number of gearsets arranged to provide a sufficient number of torques and overdrive speeds to at least one drive shaft to reduce the power generated from a motor to generate a conventional range of vehicular and machine tool speeds to less than 50 percent that of conventional motors powers.

I have also invented a motorized machine similar to above except the motor does not include a motor without an internal acceleration system. Motors without internal accelerating systems only deliver the maximum torque or one speed magnitude. The MDUFEE gearbox apparatuses are designed to convert efficiently this torque or one speed into the necessary torques or speeds required for a task with the use of a sufficient numbers of overdrive speeds and torques in manual, semi-automatic and automatic regimes. In this embodiment, MDUFEE gearbox apparatus has the additional function of changing torques and speeds that was done by the internal accelerating system of the engine. This opens up the opportunity to use fewer parts for a motor made with less weighty materials. The resulting motorized machine has a reduced energy consumption that is estimated to be less than 25 percent that of a conventional motor operating at similar speeds.

These families greatly extend fields of using of highest torque and overdrive speed magnitudes from 25 to 390,625 times and maximum numbers of forward torques and overdrive speeds of 64, 96, 108, 108, 144, and 272 that correspond to 3, 4, 5, 6, 7, 8, and 9 shafts. A compound MDUFEE gearbox family of a said mirror-close-many-sided type produces 272 forward and 170 reverse torques and overdrive speeds by 27 gears and 9 shafts. There is number of torques and overdrive speeds of 442 is provided by 37 gears and shafts since efficient ratio equal 442/37=12 times is best among all compound MDUFEE gearbox families today for vehicles and other machines.

Some embodiments of the gearboxes of my invention may replace heavy planetary and expensive hydraulic transmissions that are used in the tractor, tank, construction and other heavy vehicles and heavy equipment where it is necessary to achieve a strong torque. In addition, motors including gearboxes with MDUFEE gearbox designs will increase the field of use and reduce energy consumption of these devices by increasing the mummer of torques and speeds available.

A small electric motor with one torque joined to automatic programmed MDUFEE gearbox apparatus would produce a large number of forward and reverse speeds such that it could replace larger electric programmed motors in CNC machine tool. This would result in a dramatic improvement in the electricity economy and reduce its cost to a more affordable cost for smaller businesses. In addition, smaller and more electrically efficient CNC machine tools open the opportunity for the businesses to reduce cost of their products.

Some MDUFEE gearbox apparatus families that produce a large number of torques and overdrive speeds could be installed within wind turbines that convert wind energy into electrical power. It maintains a permanent revolution of generator rotor by an automatic system that timely reacts to fast changeable forces of wind so that generator provides a constant current.

This innovation also could modernize the conveyer system. The automatic system timely shifts needed gears according to changeable weight of the loads such that movement of the conveyer is increased by decreasing loads and vice versa. This design dramatically cuts time and electricity consumption in the manufacturing or transporting processes.

An acceleration time of vehicle may be shorter if MDUFEE gearbox with sufficient number of overdrive speeds eliminates the acceleration system. The engine gas and/or electric motor magnetic field provides the maximum permanent torque because acceleration time of vehicle is approximately zero. It dependent only to the static friction magnitude between wheels and road that may provide moving the vehicle from a stop or speed of zero up to a speed attained when there is no braking action upon the wheels.

Each embodiment of MDUFEE gearbox apparatus family has less number of gears than comparable conventional transmissions and some embodiments have less number of shafts than comparable conventional transmissions. In addition, the new designs opens the opportunity to replace steel gears and shafts with plastic parts and to use the second side of the gear teeth when a gearset is turned around on a shaft to increase duration of gearbox. Eliminating a number of gears and shafts, using both sides of their teeth and using plastic material for parts dramatically cut consumption of natural gas and other energy as well as a quantity of hard steel used to create the unneeded gears and shafts. This causes further energy savings since the energy consuming process of steel heat treatment in manufacturing is not needed for the eliminated parts. Embodiments of this system are also useful for motors powered by a variety of fuels including gasoline, diesel, hydrogen, steam, and electricity.

Embodiments of this invention are useful in designs of gearboxes that use a simplification of the shifting pattern such that shifting mechanism available for a semi-automatic and automatic system. In these mechanisms, the shifts of real gears depend on mechanical inertia created by weight of a load and result a in fast changeable resistant force in the process of work.

Other useful embodiments are ones where a compound MDUFEE gearbox family is used. The gearbox has two or three output shafts that drive front wheels, one or two pair of rear wheels or all wheels on a part-time basis. One embodiment with four output shafts operating part-time drives front or rear wheels in forward and reverse directions or four front and rear wheels in forward and reverse directions (4×4). These embodiments allow more opportunity to use a land-based vehicle in off-road environments. There it saves additional energy when an automatic system of the vehicle gearbox uses front wheels on uphill segments and rear wheels on downhill segments of travel.

The compound MDUFEE gearbox apparatus family with multiple output shafts could replace the operation systems and drives of current air and sea craft to substantially increase craft maneuverability. When this embodiment is used also as an operating system, opportunities are opened to be able to drive a boat so that it turns around on water and stops more quickly that similar boats with conventional operating systems.

Air-based vehicles that use my invention are also more efficient and maneuverable than similar vehicles with traditional operating systems. A shift gearbox of about 300 lb has a capability to reduce the power drawn from an engine by up to 25 times. The resulting dramatically reduced fuel consumption of engine provides a much lighter weight of aircraft by using much less weight of fuel. In addition, MDUFEE gearbox apparatus opens up the opportunity to use two or more motors. This also increases safety and range of flight.

At least two general gearshift levers in the manual regime and one gearshift lever in the semi-automatic regime are shifted by a MDUFEE gearbox family. A shifting pattern is created such that driver using only one gearshift lever or button is able to shifts gearsets with gear ratios different by common ratio of one (unit A) in most times of movement. The shifting of other gearshift levers or buttons is dependent on the load or is determined automatically before start up.

BRIEF DESCRIPTION OF THE DRAWINGS

One or more embodiments of the invention are described in the accompanying drawings. The drawings are briefly described below.

FIG. 1A is a table of the possible combinations of selected pinions of gearbox families according to formulas from 8×8 to 2×2 producing 4, 6, 9, 12, 16, 20, 25, 30, 36, 42, 49, 56, 64 forward and reverse torques 2, 2, 3, 3, 3, 4, 4, 5, 5, 6, 6, 7, 7, 8 and 1, 2, 3, 4, 6, 8, 10, 12, 15, 18, 21, 24, 28 forward and half reverse overdrive speeds by 3 shafts and from 10 to 34 gears shown in FIG. 1.

FIG. 1B is a chart of ratios of the gearsets in the two units shown in FIG. 1.

FIG. 1D is a table showing the gearset ratio of a MDUFEE gearbox family of formula 8×8+1.

FIG. 2A is a table of the possible combinations of selected pinions of gearbox families according to formulas from 4×4×6 to 2×2×2 producing 8, 12, 18, 27, 36, 48, 64, 80, 96 forward speeds and 4, 6, 9, 9, 12, 16, 16, 20, 24 reverse torques for engaging the gearsets of from 29 to 13 gears on 4 shafts.

FIG. 2B is a chart of ratios of the gearsets in the three units shown in FIG. 2.

FIG. 3A is a table of the possible combinations of selected pinions of gearbox families according to formulas from 3×3×3×4 to 2×2×2×2 producing 16, 24, 36, 54, 81, 108 forward speeds and 8, 8, 12, 18, 27, 27 reverse torques for engaging the gearsets of from 26 to 16 gears on 4 shafts.

FIG. 3B is a chart of ratios of the gearsets in the four units shown in FIG. 3.

FIG. 4A is a table of the possible combinations of selected pinions of MDUFEE gearbox family according to formulas from 2×2×3×3×3 to 2×2×2×2×2 producing 32, 48, 72, 108 forward speeds and 16, 24, 36, 36 reverse torques for engaging the gearsets of from 25 to 19 gears on 6 shafts.

FIG. 4B is a chart of ratios of the gearsets in the five units shown in FIG. 4.

FIG. 5A is a table of the possible combinations of selected pinions of MDUFEE gearbox families according to formulas from 2×2×2×2×3×3 to 2×2×2×2×2×2 producing 64, 96, 144 forward speeds and 32, 48, 48 reverse torques for engaging the gearsets of from 26 to 22 gears on 7 shafts.

FIG. 5B is a chart of ratios of the gearsets in the six units shown in FIG. 5.

FIG. 6A is a table of the possible combinations of selected pinions for engaging the gearsets shown in FIG. 6.

FIG. 6B is a chart of ratios of the gearsets in the four units shown in FIG. 6.

FIG. 7A is a table of the possible combinations of selected pinions for engaging the gearsets shown in FIG. 7.

FIG. 7B is a chart of ratios of the gearsets in the four units shown in FIG. 7.

FIGS. 8, 8A, 8B, and 8C are diagrams of (2×2)+(2×2) compound MDUFEE gearbox family of mirror type has two changeable designs produced 8 forward and 4 reverse speeds or 4 forward and 2 reverse speeds separately and simultaneously first front and rear wheels and second front and rear wheels by 5 shafts and 12 gears.

FIG. 10 in combination with 10B are diagrams of compound MDUFEE gearbox family of close-many-sided type with two power sources produces 272 forward and 170 reverse torques and overdrive speeds by 9 shafts and 27 gears.

FIG. 11A is a table of the possible combinations of selected pinions for engaging the gearsets shown in FIG. 11.

FIG. 11B is a chart of ratios of the gearsets in the four units shown in FIG. 11.

FIGS. 12 and 12A are diagrams of 2×2 compound MDUFEE gearbox family with two drive shafts produces 4 forward and 2 reverse speeds by 5 shafts and 12 gears.

DETAILED DESCRIPTION OF SOME EMBODIMENTS OF THE INVENTION

Figure 1:
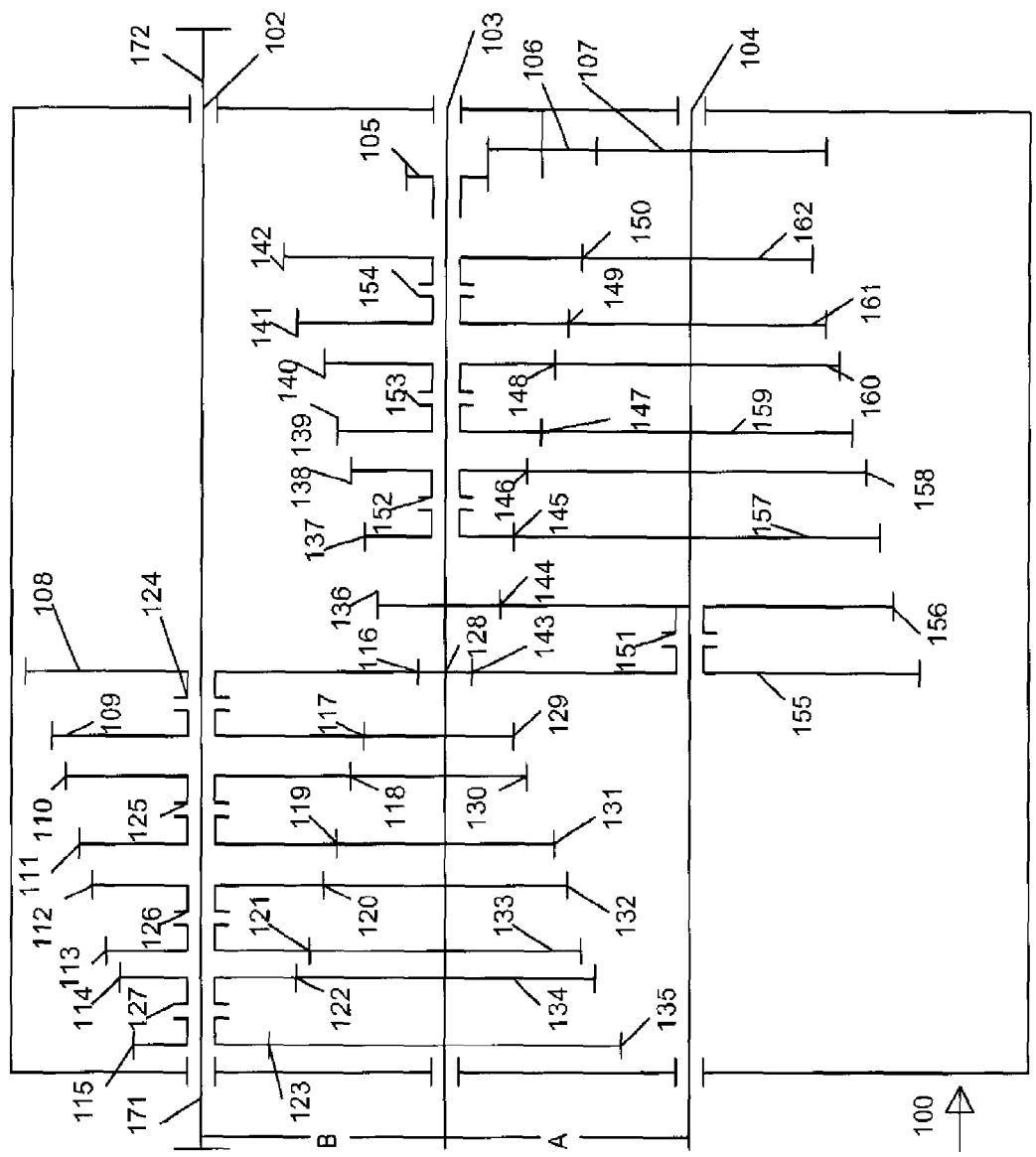
FIG. 1 is a diagram of a MDUFEE gearbox family of range type according to formula 8×8 producing most torque number of 64 forward and 8 reverse torques with 28 forward and half reverse overdrive speeds

This invention is further illustrated by the following discussion of various embodiments that use MDUFEE gearbox configuration incorporating geometric sequences of the nature taught in U.S. Pat. No. 7,191,676. Gearboxes with other sequences are also included in this invention but are not discussed here.

The invention includes a motorized machine with MDUFEE gearbox family with a simplified shifting pattern of shifting mechanisms to cause a real gear dependence on mechanical inertia created by the weight of a load and a fast changeable resistant force in response to the movement. Each family of designs produces torques and overdrive speeds in a faltering geometric sequence that significantly reduces the power that a motorized vehicle or craft, heavy equipment, machine tool or conveyer system and other machines that experience variable loads needs of a power source from a ratio of highest revolution of its shaft to idle revolution. This is achieved by using the unique function to keep highest torque of power source shaft within its work process. Therefore, an existing power source could be replaced by power source with substantially reduced power when gearbox of a MDUFEE gearbox family has replaced an existing gearbox. In addition, the new gearbox substantially limits or eliminates the need for conventional acceleration systems to control speed produced by power source for maximizing the reduced energy consumption, emission and wear of power source.

In addition, the greater degree of control of power usage with a compound MDUFEE gearbox family leads to a dramatic increase in the maneuvering capability of a motorized object on land, water or air because it has four characteristics. First, it has a shorter time in an acceleration period. Second, it has two or more reverse speeds without additional gears. Third, it is able to produce faster turns by using both up-down direction of forward and turn movement on water and air. Fourth, it has unlimited forward speeds with highest torque magnitude. The motorized machine includes a gearbox connected by at least one drive shaft to the motor. The gearbox includes a sufficient number of gearsets with gear ratios selected from a faltering geometric sequence and arranged to provide a sufficient number of torques and overdrive speeds to the output shaft to satisfactorily operate the machine over a conventional range of machine speeds and at least limit the use of the acceleration system in the motor to reduce the heat and power generated from a the motor to less than 50 percent that used to generate a similar conventional range of machine speeds using a motor with a conventional gearbox.

There are 260 MDUFEE gearbox families that include compound MDUFEE gearbox families. There is above 1000 designs. The 260 families are divided into 125 MDUFEE gearbox families of range type and 125 MDUFEE gearbox families splitter type and 10 of the compound range-splitter type. FIGS. 1, 1A, 1B, 2, 2A, 2B, 3, 3A, 3B, 4, 4A, 4B, 5, 5A and 5B describe 35 MDUFEE gearbox families of range type and FIG. 1C, 1D, 6, 6A, 6B, 7, 7A, 7B, 8, 8A, 8B, 9, 10, 10A, 10B, 11, 11A, 11B, 12, describe 10 compound MDUFEE gearbox families. Other 90 MDUFEE gearbox families of the range type have mathematical formulas: 8×9, 6×8, 5×8, 4×8, 3×8, 2×8, 5×7, 4×7, 3×7, 2×7, 4×6, 3×6, 2×6, 3×5, 2×5, 2×4, 2××4, 2××5, 2××6, 2××7, 2××8, 2××9, 2××4, 2××5, 2××6, 2××7, 2××8, 2××9, 2×4×4, 2×4×5, 2×4×6, 2×4×7, 2×4×8, 2×4×9, 2×5×5, 2×5×6, 2×5×7, 2×5×8, 2×5×9, 2×6×6, 2×6×7, 2×6×8, 2×6×9, 2×7×7, 2×7×8, 2×7×9, 2×8×8, 2×8×9, 3×4×4, 3×4×5, 3×4×6, 3×4×7, 3×4×8, 3×4×9, 3×5×5, 3×5×6, 3×5×7, 3×6×6, 4×4×4, 4×4×5, 4×4×6, 4×5×5, 2×2×2×4, 2×2×2×5, 2××2×6, 2××2×7, 2××2×8, 2××2×9, 2××3×4, 2××3×5, 2××3×6, 2××3×7, 2××3×8, 2××3×9, 2××3×4, 2××3×5, 2××3×6, 2××3×7, 2××3×8, 2××4×4, 2××4×5, 2××4×6, 2××4×7, 2××4×8, 2××4×9, 2××4×4, 2××4×5, 2××5×5, 2××5×5, 2××5×6 and 125 MDUFEE gearbox families of the splitter type are not shown since these designs have the same or less number of torques or gears than those designs that are illustrated. The MDUFEE gearbox family designs of the 35 families are divided into 7 families groups according to whether the number of shafts is 3, 4, 5, 6, 7, 8, and 9.

Each group has a drawing that shows MDUFEE gearbox family design comprising most number of the torques and overdrive speeds permitted by size of the gear pair. A family of 8×8 produces 64 forward and 8 reverse speeds with 3 shafts and 34 gears (FIG. 1); family of 4×4×6 produces 96 forward and 24 reverse speeds with 4 shafts and 29 gears (FIG. 2); family of 3×3×3×4 produces 108 forward and 27 reverse speeds with 5 shafts and 26 gears (FIG. 3); family of 2×2×3× 3×3 produces 108 forward and 36 reverse speeds with 6 shafts and 25 gears (FIG. 4); family of 2×2×2×2×3×3 produces 144 forward and 48 reverse speeds with 7 shafts and 26 gears (FIG. 5). The mathematical formula table of other designs is formed so that one multiplier of next design is less by one and number of gears has two gears less than previous design in each group.

For example, a MDUFEE gearbox family of 3×3 produces 5 torques included direct torque, 4 overdrives when geometric sequence 1, 1.20, 1.44, 1.728; 2.074, 2.48, 2.986, 3.58, and 4.3 is transformed in the faltering geometric sequence 0.48; 0.576, 0.69, 0.83, 1, 1.2, 1.44, 1.728; 2.074. It consists from two general geometric sequences are formed by direct and inverse common ratios are 1 to 1.20 and 1 to 1/1.20. One geometric sequence with direct speed has been transformed to the faltering geometric sequence (1.44, 1.728; 2.074, 2.49, 3.0 by (1, 1.2, 1.44, 1.728; 2.074)×1.44.

Four compound MDUFEE gearbox families of vehicle (FIG. 1C, 6, 7, 11,) are different from known existing design of range-splitter types by two output shafts and more at least one intermediate shaft that is parallel to two other intermediate shafts. These designs have at least two output shafts driving two or more objects as, for example, front and rear wheels at the same time. Six designs (FIG. 8B, 8C, 9, 10A, 10B, and 12) are uncommon. The ten designs are for land-based vehicles and for sea-based and air-based vehicles.

In contrast to the general MDUFEE gearbox family design for vehicles and machine tools, these designs comprise less number of gears and drive all front and rear wheels in a temporary time mode when used in land-based vehicles and provide additional efficient driving functions when used in water-based vehicles. A brief description follows.

Figures 8A, 8B, 8C:
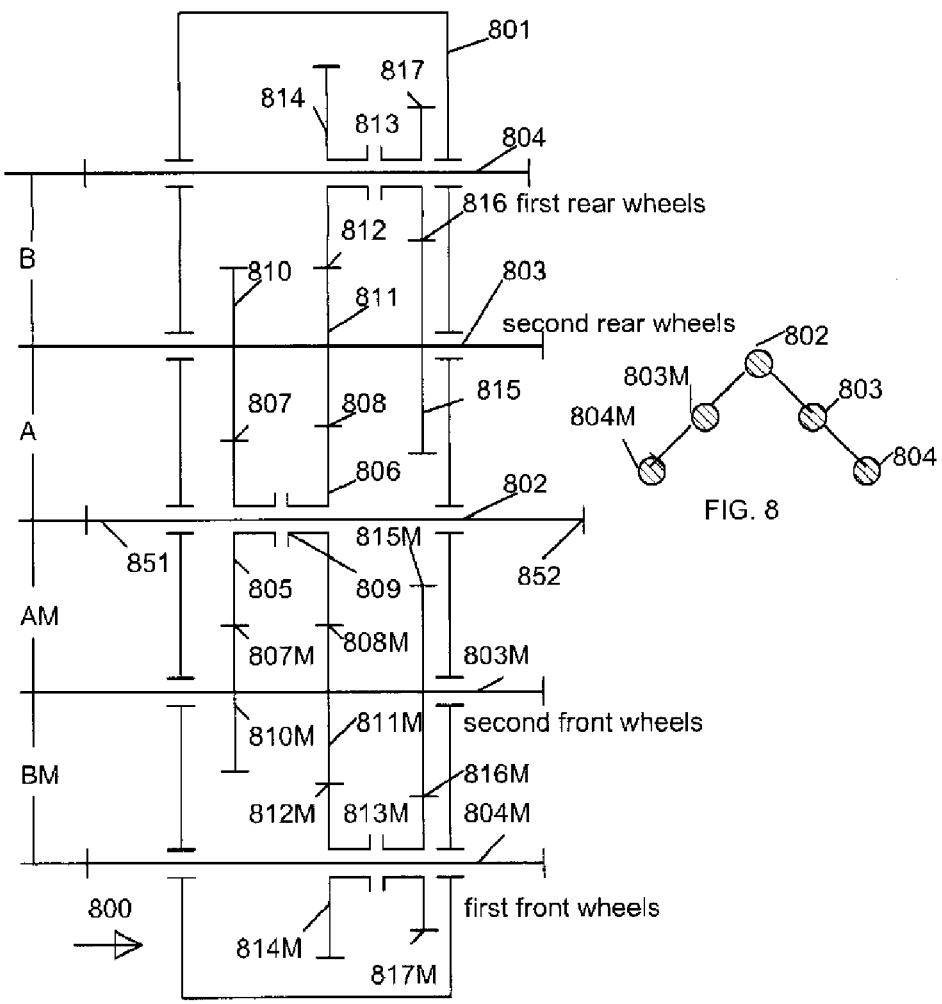
Figure 9:
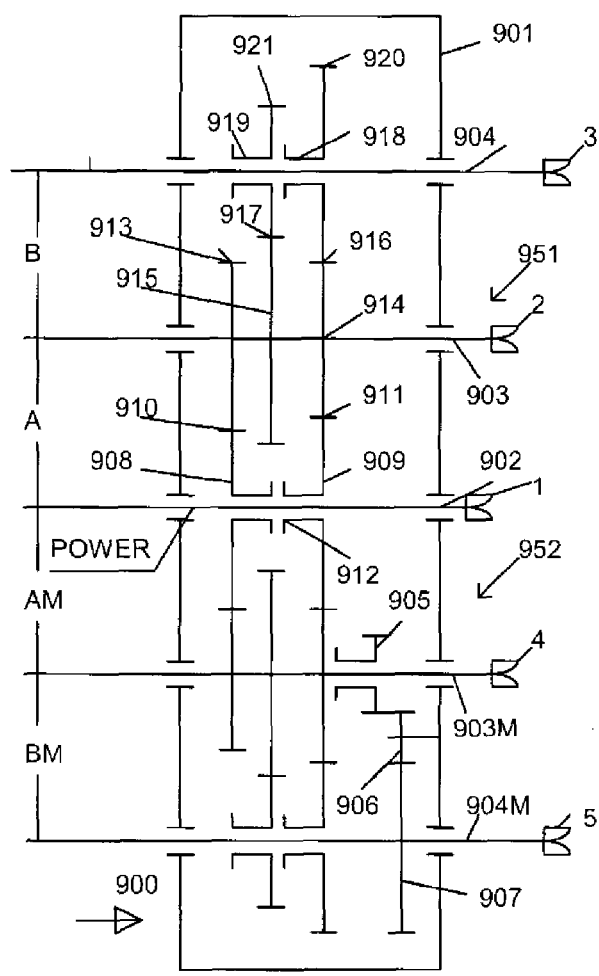
FIGS. 9 and 9A are diagrams of the said cross-compound MDUFEE gearbox family 900 of cross-open type produced 342 mutual forward, 288 mutual left-turns, 288 mutual right-turns, 288 mutual top-turns, 288 mutual bottom-turns and 2 reverse speeds included the chosen overdrive speeds of 232 mutual forward speeds by 9 shafts and 25 gears.
Figure 9A:
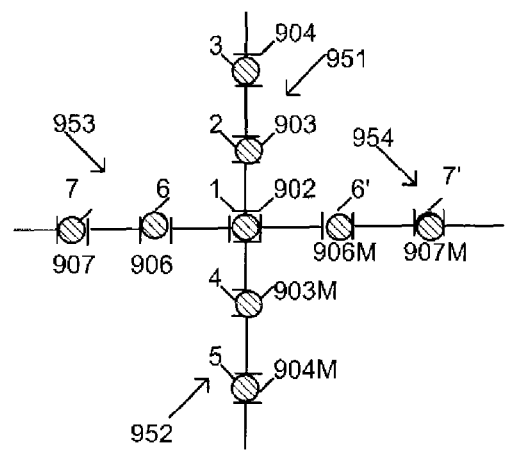
Figure 10:
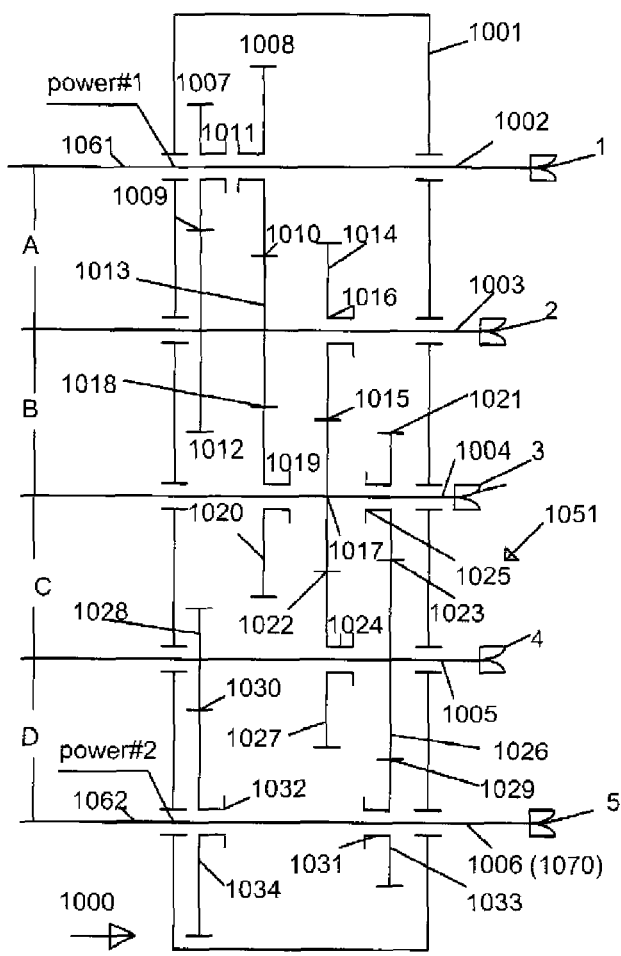
FIG. 10 in combination with 10A are diagrams of compound MDUFEE gearbox family of close-many-sided type with two power sources produces 62 forward twin-combination speeds included 16 forward-up or down, 40 left or right-turns in horizontal surface, mutual 16 right or left-up-turns and 16 right or left-down-turns with the half number of overdrive speeds by 8 shafts and 24 gears.
Figure 10:
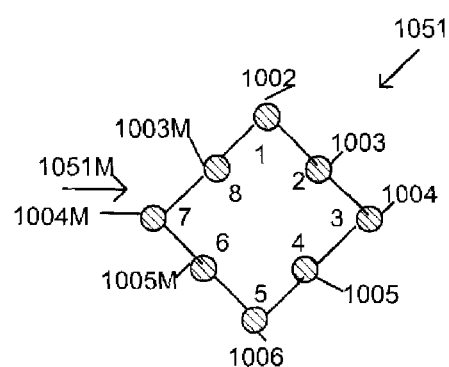

1. A diagram of a MDUFEE gearbox family 100 with two output shafts according to formula 8×8+1 producing 65 forward included direct speeds for front wheels and 16 reverse speeds for rear wheels (FIG. 1C).
2. A diagram of a MDUFEE gearbox family 600 according to formula (1+2×2)+(2×2×2×2+2×2) producing 25 forward and 10 reverse speeds, 16 forward with 4 overdrive forward speeds for front wheels and 8 forward plus direct speed for first rear wheels and 10 reverse speeds (2 overdrive) for two pair of second rear wheels by 5 shafts and 14 gears (FIG. 6).
3. A diagram of a (1+2×2)+(2×2+2×2) MDUFEE gearbox family 700 producing 13 forward and 4 reverse speeds included direct, 4 overdrive forward and 2 reverse speeds for front wheels 8 forward and 2 reverse speeds for rear-wheels drive by 4 shafts and 13 gears (FIG. 7).
4. A diagram of (2×2)+(2×2) of compound MDUFEE gearbox family 800 of said mirror type has first design produced 8 forward and 4 reverse speeds included half overdrive speeds. Four output shafts are connected to two pair of front wheels with 4 forward and 2 reverse speeds and two pair of rear wheels with 4 forward and 2 reverse speeds by 5 shafts and 12 gears (FIG. 8B). It gives opportunity to create new vehicle design that will not be turn around and has two ways are front and rear movements.
5. A diagram of (2×2) compound MDUFEE gearbox family 800 of mirror type produces 4 forward and 2 reverse speeds separately and simultaneously to first front and rear wheels and second front and rear wheels by 5 shafts and 12 gears. This design drives separately or simultaneously front or/and rear wheels. (FIG. 8C).
6. A diagram the (1+2)+(2×2+2)+1 MDUFEE gearbox family 1100 produces 10 forward and 7 reverse speeds including 6 forward and 2 reverse overdrive speeds for the front-wheels drive, 2 forward, direct and 2 reverse overdrive speeds for the first rear-wheels, and one forward and 3 reverse speeds for the second rear-wheels. It drives also four wheels in three cases (4×4): two pair of rear wheels, two pair front and first rear wheels, and two pair front and second rear wheels. It drives also all wheels (6×6) by 6 shafts and 11 gears (FIG. 11).
7. A diagram of 2×2 compound MDUFEE gearbox family 1200 with two drive shafts produces 4 overdrive forward speeds by 5 shafts and 12 gears (FIG. 12). This design increases safety of vehicle by two or more engines and additional improves fuel economy.
8. A diagram of MDUFEE gearbox family 1000 with two engines of a said mirror-close-many-sided type produces 272 forward and 170 reverse torques and overdrive speeds by 27 gears and 9 shafts. This design has two small engines instead one that provides additional fuel economy when power of one engine is changed by force of inertia in movement (FIG. 10, 10B).
9. Eight output shafts of compound MDUFEE gearbox family 900 of said cross-open type is created by four MDUFEE gearbox families have one input general shaft such that they extended from input shaft to outsides. (FIG. 9, 9A). A diagram of the said cross-compound MDUFEE gearbox family 900 of said cross-open type produced 342 mutual forward, 288 mutual left-turns, 288 mutual right-turns, 288 mutual top-turns, 288 mutual bottom-turns and 2 reverse speeds included the chosen overdrive speeds of 232 mutual forward speeds by 9 shafts and 25 gears.
10. Six output shafts of compound MDUFEE gearbox family 1000 of said close-many-sided type have two input general shaft with two power sources such that both joined by two MDUFEE gearbox families with FEES extended for creation of many-sided design (FIG. 10, 10A). A diagram of compound MDUFEE gearbox family of close-many-sided type with two power sources produces 62 forward twin-combination speeds included 16 forward-up or down, 40 left or right-turns in horizontal surface, mutual 16 right or left-up-turns and 16 right or left-down-turns with the half number of overdrive speeds by 8 shafts and 24 gears.

It is well known that a vehicle has different mechanical inertias of movement when it is fully loaded, empty or partly loaded. The excessive energy consumption of the power source is prevented by timely shifted gear that necessary in this moment of time. A said forced energy economy system comprising a shifting mechanism, said load switch-sensor, existing speed sensor, microprocessor and the shifting levers or push buttons pattern. The selection of a first shifting gear is provided by a said switch-sensor of loads when a power source has idle speed powered or vehicle is stopped. A said load switch-sensor sends the signal-information about weight in each stop to computer and then it turns off A computer chooses torque significance according to weight of object and inertia magnitude in the movement process.

Figure 1C:
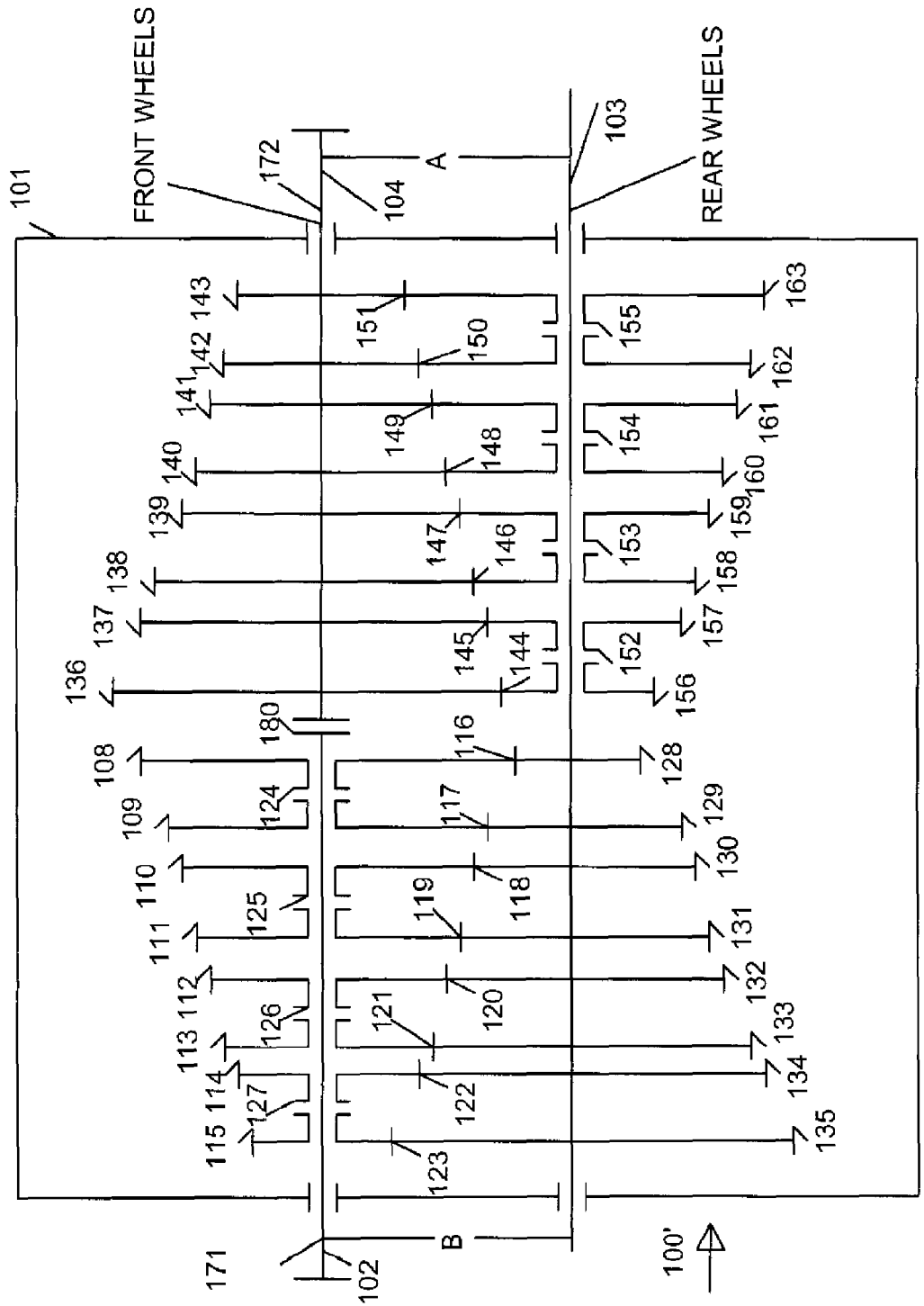
FIG. 1C is a diagram of a compound MDUFEE gearbox family of splitter type according to formula 8×8+1 producing most number of 65 forward and 16 reverse gears including 24 forward and half reverse overdrive speeds by 3 shafts and 32 gears.

In the first embodiment of two designs in the same frame, members 101 shown in FIGS. 1 and 1C there are 64 and 65 gears of forward included 24 overdrive speeds and 8 and 16 reverse speeds. One design of range type has a mathematical gearbox formula 8×8 shown in FIG. 1. Other design of range-splitter type is compound MDUFEE gearbox family has a mathematical gearbox formula 8×8+1 shown in FIG. 1C.

Other difference is intermediate shaft 103 is second output shaft 103 of 16 reverse speeds connected to rear wheels. This provide to eliminate reverse mechanism comprising gears 105, 106, and 107 and to add one gear for forward speeds but to produce direct speed in addition than design shown in FIG. 1, which has described below.

A MDUFEE gearbox family 100 has frame members 101 supporting drive shaft 102, intermediate shaft 103 and output shaft 104 supported units A and B.

Power enters to left side of the MDUFEE gearbox family 100 on outward end 171 of the drive shaft 102 or on opposed outward end 172 if the shafts are reversed for using the opposite side of the gear teeth. The drive shaft 102 passes through double synchronizer clutches 124, 125, 126 and 127, with pinions 108, 109, 110, 111, 112, 113, 114, and 115 that may be separately selected. When pinions 108, 109, 110, 111, 112, 113, 114, and 115 are selected they engage drive shaft 102, and engages and turns joined gear 128, 129, 130, 131, 132, 133, 134, and 135 on intermediate shaft 103 to form gearset 116, 117, 118, 119, 120, 121, 122, and 123 with ratios of 1 to $R^{24+5}$, $R^{16+5}$, $R^{8+5}$, $1/R^{0+3}$, $1/R^8$, $1/R^{16+3}$, $1/R^{24+3}$, and $1/R^{32+3}$ between the drive shaft 102 and the first intermediate shaft 103 are unit B gearsets.

The intermediate shaft 103 passes through double synchronizer clutches 152, 153 and 154 with pinions 137, 138, 139, 140, 141, and 142 that may be separately selected. When pinions 137, 138, 139, 140, 141, and 142 is selected it engages the intermediate shaft 103, and engages and turns joined gear 157, 158, 159, 160, 161, and 162 on output shaft 104 to form gearset 145, 146, 147, 148, 149, and 150 with ratios of $1/R^5$, $1/R^4$, $1/R^3$, $1/R^2$, $1/R$, 1 in accordance.

The intermediate shaft 103 has also fixed two pinions 128 and 136 meshed with gears 155 and 156 to form gearsets 143 and 144 with ratios of $1/R^7$ and $1/R^6$. Gearsets 143, 144, 145, 146, 147, 148, 149, and 150 between the intermediate shaft 103 and the output shaft 104 are unit A gearsets.

The output shaft 104 may be run in 8 reverse speeds by engaging reverse pinion 105, which connects to idler gear 106 and reverse gear 107.

Another MDUFEE gearbox family 100' has the same description of production the forward speeds including direct speed. It is available when the drive split shaft 102 joined to output split shaft 104 by clutch 180. The main difference is intermediate shaft 103 is the second output shaft 103 connected to rear wheels and first output shaft 104 connected to front wheels The MDUFEE gearbox family 100' produces 16 reverse speeds by two units A and B supported between drive split shaft 102 joined by clutch 180 to first output shaft 104 and the second output shaft 103.

When the various clutches are selected to operate the various combinations of gears in MDUFEE gearbox family 100, sixty-four forward and eight reverse speeds may be selected from in a 8,8 pattern from unit A, and B gearsets. The MDUFEE gearbox family 100' produces sixty-five forward and sixteen reverse torques and overdrive speeds The table in FIG. 1A shows the combinations of pinions selected at the clutches to yield the 8×8, 7×8, 7×7, 6×7, 6×6, 5×6, 5×5, 4×5, 4×4, 3×4, 3×3, 2×3, 2×2 MDU gearbox family with FEES having the 64, 56, 49, 42, 36, 30, 25, 20, 16, 12, 9, 6 and 4 forward and 8, 7, 6, 5, 4, 3 and 2 reverse speeds. The efficient ratios are 72, 63, 56, 48, 42, 35, 30, 24, 20, 15, 12, 8 and 6/(34, 32, 30, 28, 26, 24, 22, 20, 18, 16, 14, 12 and 10+3 shafts)=1.95, 1.8, 1.7, 1.55, 1.45, 1.3, 1.2, 1.04, 0.95, 0.8, 0.7, 0.53 and 0.46.

As shown the table in FIG. 1B the combinations of gears yield eight ratios of gearsets 1, $1/R$, $1/R^{2'}$, ..., $1/R^7$ in unit A, eight ratios of gearsets 1, $1/R^8$, $1/R^{16}$, $1/R^{24}$, $1/R^{32}$, $1/R^{40}$, $1/R^{48}$ and $1/R^{56}$ in unit B. A least number of overdrive speeds is most degree in unit B plus one or 8>7. A degree of 56 is too much in unit B since it is transformed to faltering geometric sequences $R^{24}$, $R^{16}$, $R^8$, 1, $1/R^8$, $1/R^{16}$, $1/R^{24}$, $1/R^{32}$ and the chosen number of 24. Then it is transformed to two faltering geometric sequences. For eliminating three items of 1, $1/R$, and $1/R^2$ the right geometric sequence is multiplied by inverse common ratio in third degree $1/R^3$ in result $1/R^{0+3}$, $1/R^{8+3}$, $1/R^{16+3}$, $1/R^{24+3}$ and $1/R^{32+3}$, in unit B. For eliminating three items of R, $R^2$, $R^3$, $R^4$ and $R^5$ a left geometric sequence is multiplied by common ratio in fifth degree $R^5$ in result $R^{24+5}$, $R^{16+5}$, $R^{8+5}$ in unit B. There is two faltering geometric sequences available $R^{29}$, ..., $R^6$, $1/R^3$, ..., $R^{64-24+3=43}$ an with different common ratios R and $1/R$. Available are 40 torques with a minimum gear ratio of $1/R^3$ and 24 overdrive speeds have minimum gear ratio $R^6$.

As shown the table in FIG. 1D the combinations of gears yield eight ratios of gearsets 1, $1/R$, $1/R^{2'}$, ..., $1/R^7$ in unit A, eight ratios of gearsets 1, $1/R^8$, $1/R^{16}$, $1/R^{24}$, $1/R^{32}$, $1/R^{40}$, $1/R^{48}$ and $1/R^{56}$ in unit B is the same as shown the table in FIG. 1B. The differences are direct speed, increased number of reverse speeds for rear wheels and forward torques and overdrive speeds for front wheels.

Figure 2:
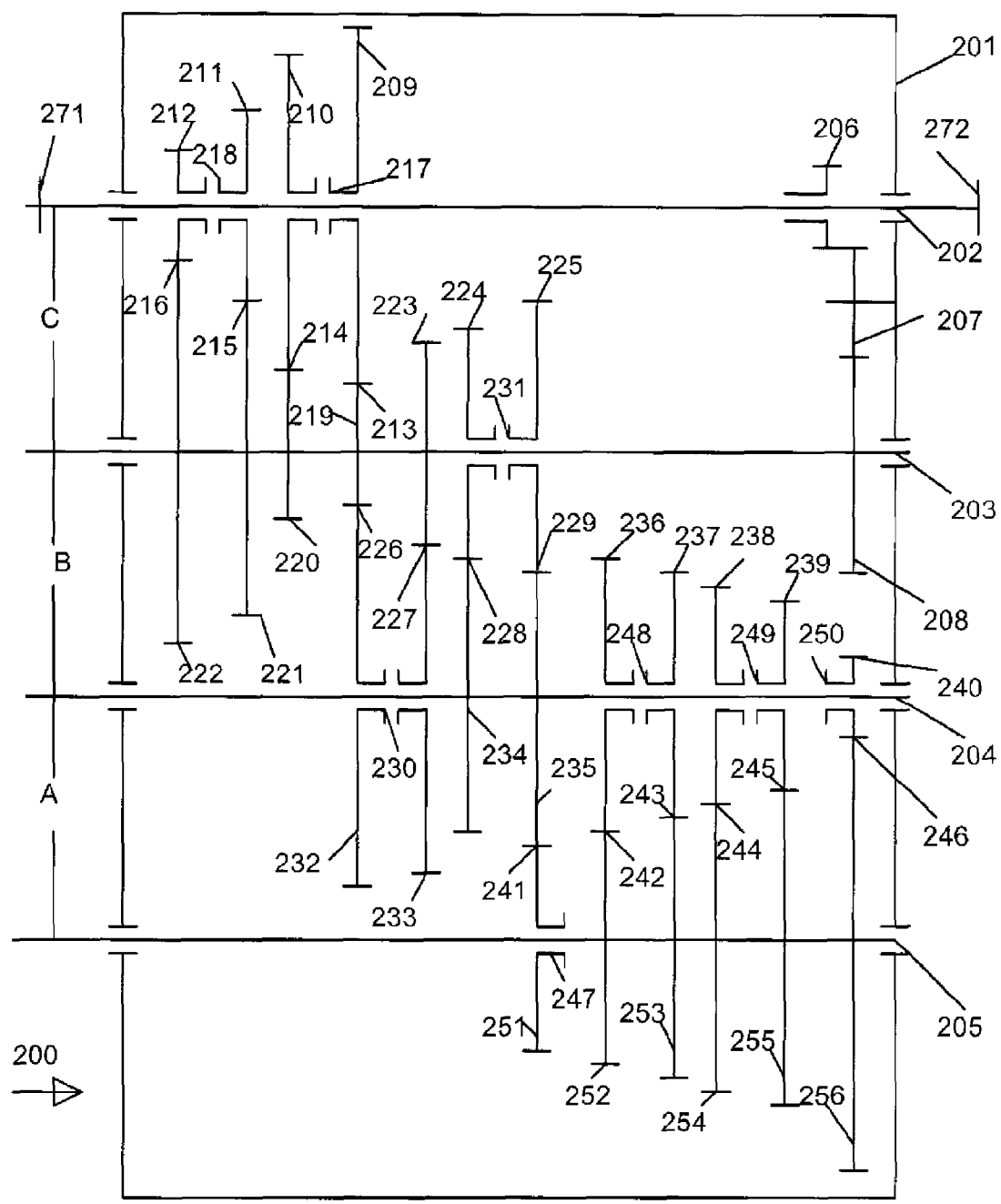
FIG. 2 is a diagram of a MDUFEE gearbox family according to formula 4×4×6 is produces most number of 96 forward and 24 reverse gears including half-forward and reverse overdrive speeds

A MDUFEE gearbox family 100 at FIG. 1 is shifted by from 2 to 8 gearshift levers at the manual regime and from 1 to 4 gearshift levers at the semi-automatic regime A MDUFEE gearbox family 100 at FIG. 1,C is shifted by from 3 to 9 gearshift levers at the manual regime and from 2 to 5 gearshift levers at the semi-automatic regime In the second embodiment, shown in FIG. 2, there are 96 gears of forward included 47 overdrive speeds and 24 reverse speeds available from MDUFEE gearbox family 200 having mathematical gearbox formula 4×4×6 in order. There are three units.

MDUFEE gearbox family 200 has frame members 201 supporting drive shaft 202, first intermediate shaft 203, second intermediate shaft 204 and output shaft 205.

Power may enter the MDUFEE gearbox family 200 on the left side on outward end 271 of the drive shaft 202 or on opposite outward end 272 if the drive shaft 202 in MDU gearbox 200 is turned around for using the opposed side of teeth on the gears. A drive shaft 202 supported two double synchronizer clutches 217 and 218 with pinions 209, 210, 211 and 212, which may be separately selected.

When pinions 209, 210, 211 or 212 is selected, it engages drive shaft 202, and engages and turns gears 219, 220, 221, 222, respectively, on first intermediate shaft 203 to form gearsets 213, 214, 215 or 216, respectively. Gearsets 213, 214, 215, 216 connects drive shaft 202 and the first intermediate shaft 203 such that the first intermediate shaft 203 turns at a rate depending on the ratios of the gears in the gearsets 213, 214, 215, 216 are $R^{36}$, $R^{12}$, $1/R^{12}$, $1/R^{36}$, respectively, belong to unit C.

Then four powers enters to first intermediate shaft 203 with double synchronizer clutch 231 supported pinions 224 and 225 which may be separately selected, and two fixed pinions 219 and 223 meshed to gears 232 and 233 which may be separately selected by double synchronizer clutch 230 supported by second intermediate shaft 204.

When pinion 224 or 225 is selected, it engages first intermediate shaft 203, and engages and turns gear 234 or 235, respectively, or gears 232 or 233 is selected it engages second intermediate shaft 204, and pinions 219 or 223 turns second intermediate shaft 204, respectively, on to form gearsets 226 or 227 or 228 or 229, respectively. Gearsets 226, 227, 228, 229 connects first intermediate shaft 203 and the second intermediate shaft 204 such that the second intermediate shaft 204 turns at a rate depending on the ratios of the gears in the gearsets 226, 227, 228, 229 are $1/R^9$, $1/R^3$, $R^3$, $R^9$, respectively, it belongs to unit B.

Then sixteen different powers enter to second intermediate shaft 204 with two double synchronizer clutches 248 and 249 and single synchronizer clutch 250 supported on pinions 236, 237, 238, 239 and 240, which may be separately selected, and one fixed pinion 235 of gear of unit C meshed to gear 251 which may be separately selected by single synchronizer clutch 247 supported by output shaft 205.

When pinions 236 or 237 or 238 or 239 or 240 is selected, it engages second intermediate shaft 204, and engages and turns gear 252 or 253 or 254 or 255 or 256, respectively. Alternatively, gear 251 is selected and engages single synchronizer clutch 247 and second intermediate shaft 204, and pinions 235 turns second intermediate shaft 204 to form gearsets 241 or 242 or 243 or 244 or 245 or 246, respectively. Gearsets 241 or 242 or 243 or 244 or 245 or 246 connects second intermediate shaft 204 and output shaft 205 such that output shaft 205 turns at a rate depending on the ratios of the gears in the gearsets 241, 242, 243, 244, 245, and 246 that are, $1/R^3$, $1/R^2$, $1/R$, 1, R and $R^2$, respectively. It belongs to unit A.

A sliding reverse pinion 206 runs power from the drive shaft 202 to first intermediate shaft 203 by way of idler gear 207 and reverse gear 208. By design choice, as can be readily seen in FIG. 2, the reverse mechanism may have 4 different locations between the 4 shafts to provide 1, 4, 6, and 16 reverse gears.

The output shaft 205 has ninety-six forward and twenty-four reverse powers or torques.

When the various clutches in FIG. 2, are selected to operate the combinations of gears in the gearbox, 96 forward and 24 reverse speeds included 47 overdrive speeds may be selected from in a 4, 4 and 6 pattern from unit A, B and C gearsets by 29 gears and 4 shafts.

In the gearbox depicted in FIG. 2, A is table of other MDU gearbox family with FEES designs comprising 29, 27, 25, 23, 21, 19, 17, 15, 13 gears and 4 shafts. The number of torques and overdrive speeds to gears and shafts ratio equal to 120, 100, 80, 60, 48, 36, 24, 18, 10/(29, 27, 25, 23, 21, 19, 17, 15, 13+4)=364, 323, 276, 222, 192, 157, 114, 95, 59%.

In MDUFEE gearbox family 200 shown in FIG. 2 B there are 3 units C, B and A with 4, 4 and 6 gearsets respectively. A gear ratios of gearsets are 1, $1/R^{24}$, $1/R^{48}$, $1/R^{72}$ in the geometric sequence of unit C; 1, $1/R^6$, $1/R^{12}$, $1/R^{18}$ in the geometric sequence of unit B, and 1, $1/R$, $1/R^2$, $1/R^3$, $1/R^4$, $1/R^5$ in the geometric sequence of unit A. However, gear ratio $1/R^{72}$ too much and is if numbers of overdrive speeds and torque are the same. For minimum size of design, all geometric sequences transformed to faltering geometric sequences $R^{36}$, $R^{12}$, $1/R^{12}$, $1/R^{36}$ in unit C, $R^9$, $1/R^3$, $1/R^9$ in unit B, and $R^2$, R, 1, $1/R$, $1/R^2$, $1/R^3$ in unit A. The left and right geometric sequences of ratios is transformed to two faltering geometric sequences $R^{36+2}$, $R^{12+2}$, $1/R^{12+1}$, $1/R^{36+1}$ by eliminating three items 1, R and $1/R$. Therefore faltering geometric sequence of overdrive speeds is $R^{49}$, ..., $R^3$ or 47 overdrive speeds. There is available 96 forward and 24 reverse speeds included 47 overdrive forward and 12 overdrive reverse speeds may be selected from in a 4, 4 and 6 pattern from unit A, B and C gearsets.

However, highest overdrive speed magnitude may be too much since common ratio magnitude R reduced to $R_1$ as will. A faltering geometric sequence of torques is $1/R$, $1/R^2$, ..., $1/R^{49}$ or 49 torques. However, highest torque magnitude may be too small since common ratio magnitude R increased to $R_2$ as will.

Figure 3:
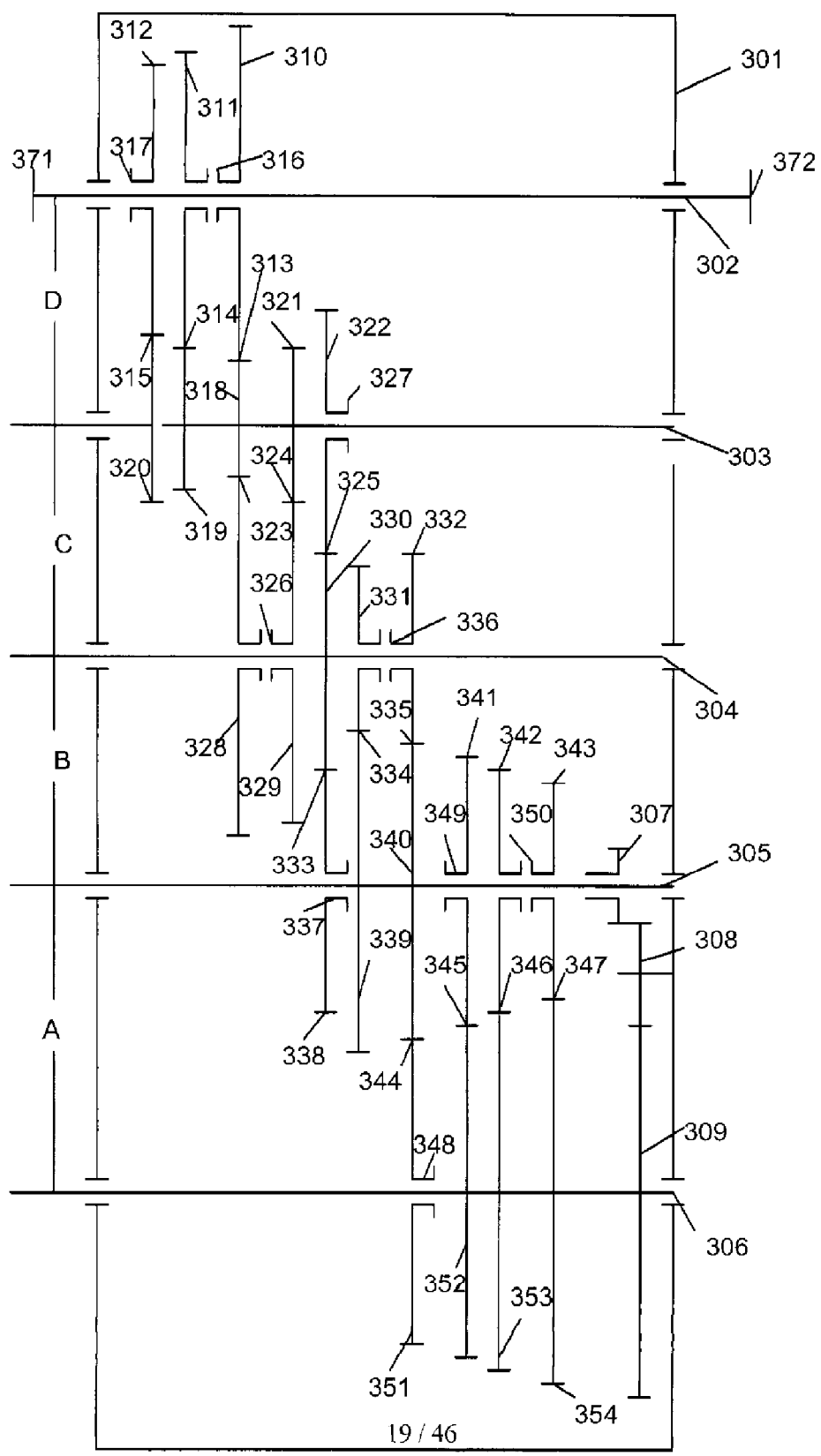
FIG. 3 is a diagram of a MDU gearbox family with FEES according to formula 3×3×3×4 producing most torque number of 108 forward and 27 reverse torque with 36 forward and half reverse overdrive speeds

A MDUFEE gearbox family 200 is shifted by from 3 to 8 general gearshift levers at the manual regime and from 1 to 3 gearshift levers at the semi-automatic regime In the third embodiment shown in FIG. 3 there are 108 forward and 27 reverse speeds included 36 overdrive forward and 9 overdrive reverse speeds. MDUFEE gearbox family 300 of mathematical gearbox formula 3×3×3×4 has frame members 301 supporting drive shaft 302, first intermediate shaft 303, second intermediate shaft 304, second intermediate shaft 305 and output shaft 306.

Power may enter the MDUFEE gearbox family 300 on the left side on outward end 371 of the drive shaft 302 or on opposite outward end 372 if the drive shaft 302 is turned around for using the opposed side of teeth on the gears. Power entering at outward end 371 enters single synchronizer clutch 317 with pinion 312 and double synchronizer clutch 316 have pinions 310 and 311 which may be separately selected.

When pinion 310 or 311 or 312 is selected, it engages drive shaft 302, and engages and turns gear 318 or 319 or 320, respectively, on first intermediate shaft 303 to form gearset 313 or 314 or 315, respectively. Gearsets 313, 314, and 315 connects drive shaft 302 and the first intermediate shaft 303 such that the first intermediate shaft 303 turns at a rate depending on the ratios of the gears in the gearsets 313, 314, and 315 are $R^{36+3}$, $1/R^{+3}$, and $1/R^{36+3}$, respectively, and belong to unit D.

Then three powers enters to first intermediate shaft 303 with double synchronizer clutch 327 supported pinion 322 which may be separately selected, and two fixed pinions 318 and 321 meshed to gears 328 and 329 which may be separately selected by double synchronizer clutch 326 supported by second intermediate shaft 304.

When pinion 327 is selected it engages first intermediate shaft 303, and engages and turns gear 330, or gears 328 or 329 is selected it engages second intermediate shaft 304, and pinions 318 or 321 or 322 turns second intermediate shaft 304, respectively, on to form gearsets 323 or 324 or 325, respectively. Gearsets 323, 324 and 325 connects first intermediate shaft 303 and the second intermediate shaft 304 such that the second intermediate shaft 304 turns at a rate depending on the ratios are $1/R^{24}$, $1/R^{12}$, 1, respectively, and belongs to unit C.

Then nine different powers enters to second intermediate shaft 304 with double synchronizer clutch 336 supported pinions 331 and 332 which may be separately selected, and one fixed pinion 330 of gear of unit C meshed to gear 338 which may be separately selected by single synchronizer clutch 337 supported by third intermediate shaft 305.

When pinion 331 or 332 is selected it engages second intermediate shaft 304, and engages and turns gear 339 or 340, respectively, or gear 338 is selected it engages third intermediate shaft 305, and pinion 330 turns third intermediate shaft 305 by gear 338 that selected by single synchronizer clutch 337 to form gearsets 333 or 334 or 335, respectively. Gearsets 333, 334 and 335 connects second, intermediate shaft 304 and the third intermediate shaft 305 such that the third intermediate shaft 305 turns at a rate depending on the ratios are 1, $1/R^8$, and $1/R^4$, respectively, and it belongs to unit B.

Then twenty seven different powers entered to third intermediate shaft 305 with double synchronizer clutch 350 supported pinions 342 and 343 and single synchronizer clutch 349 supported pinion 341 which may be separately selected, and one fixed pinion 340 of gear of unit B meshed to gear 351 which may be separately selected by single synchronizer clutch 348 supported by output shaft 306.

When pinion 341 or 342 or 343 is selected it engages third intermediate shaft 305, and engages and turns gear 352 or 353 or 354, respectively, or gear 351 is selected it engages output shaft 306 and pinion 340 turns also output shaft 306 to form gearsets 344 or 345 or 346 or 347, respectively. Gearsets 344, 345, 346 and 347 connect third intermediate shaft 305 and the output shaft 306 such that the output shaft 306 turns at a rate depending to the ratios 1, $1/R$, $1/R^2$, and $1/R^3$, respectively. It belongs to unit A.

A sliding reverse pinion 307 runs power from the third intermediate shaft 305 to output shaft 306 by way of idler gear 308 and reverse gear 309. By design choice, as can be readily seen in FIG. 3, the reverse mechanism may have 6 different locations between the 5 shafts to provide 1, 3, 4, 9, 12 and 36 reverse gears (not showed).

The output shaft 306 has one hundred eight forward and twenty seven reverse powers or torques.

When the various clutches in FIG. 3A are selected to operate the combinations of gears in the gearbox, 108 forward and 27 reverse speeds included 40 overdrive forward and 9 overdrive reverse speeds may be selected from in a 4, 4 and 6 pattern from unit A, B and C gearsets.

In the MDUFEE gearbox family depicted in FIG. 3A there are 135 torques, 108 forward and 27 reverse. Five gearboxes are shown, 3×3×3×3, 2××3×3, 2××3×3, 2××2×3 and 2×2×2×2 comprising 5 shafts and 26, 24, 22, 20, 18, 16 gears for a torque to gears and shafts ratio of 135, 108, 72, 48, 32, 24/(26, 24, 22, 20, 18, 16+5)=435, 372, 267, 192, 139, 114%.

In MDU gearbox family with FEES 300 shown in FIG. 3B there are 4 units A, B, C, and D with 3, 3, 3 and 4 gearsets respectively. A gear ratios of gearsets are 1, $1/R$, $1/R^2$, $1/R^3$ in the geometric sequence of unit A; the geometric sequence 1, $1/R^4$, $1/R^8$ in unit B; the geometric sequence 1, $1/R^{12}$, $1/R^{24}$ in unit C; the geometric sequence 1, $1/R^{36}$, $1/R^{72}$ in unit D.

There it is transformed in left and right geometric sequences $R^{36}$, 1, $1/R^{36}$ only in unit D. Then it is transformed to two faltering geometric sequences. For eliminating five items of 1, $1/R$, $1/R^2$, $1/R^3$ and $1/R^4$, the right geometric sequence is multiplied by inverse common ratio in fifth degree $1/R^5$ to result in $R^{36}$, $1/R^{0+5}$, $1/R^{36+5}$ in unit D. For eliminating three items of $R$, $R^2$, and $R^3$, a left geometric sequence is multiplied by common ratio in third degree $R^3$ to result in $R^{36+3}$, $1/R^{0+5}$, $1/R^{36+5}$ in unit D.

There are two faltering geometric sequences available $R^{42}, \ldots, R^4, 1/R^5, \ldots, R^{108-36+4=76}$ with different common ratios R and 1/R. There are 72 torques with a minimum gear ratio $1/R^5$ and 36 overdrive speeds with a minimum gear ratio $R^4$ available.

A MDUFEE gearbox family 300 is shifted by from 4 to 10 general gearshift levers at the manual regime and from 1 to 2 gearshift levers at the semi-automatic regime.

Figure 4:
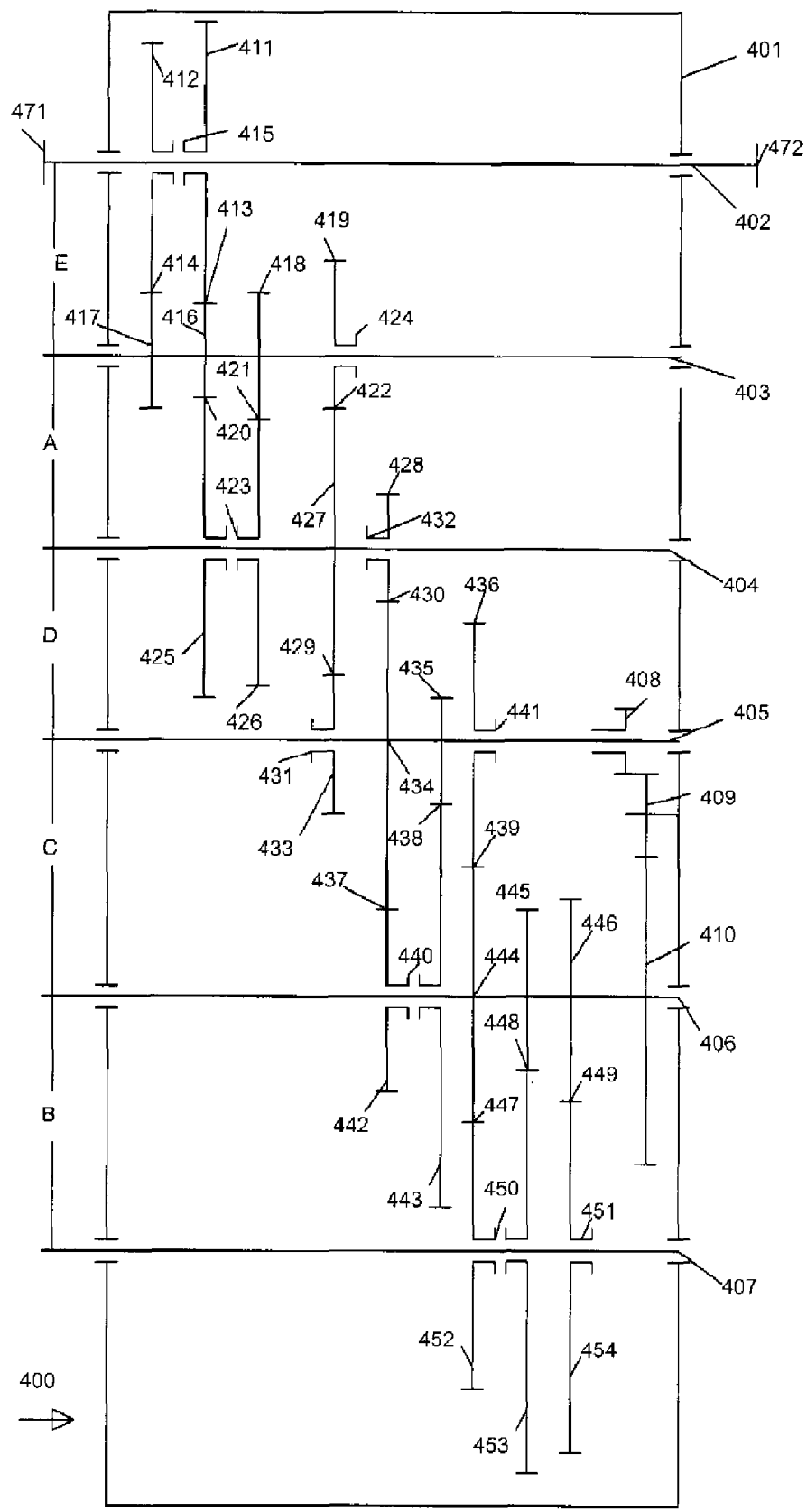
FIG. 4 is a diagram of a MDUFEE gearbox family according to formula 2×2×3×3×3 producing most torque number of 108 forward and 36 reverse torque with 36 forward and half reverse speeds
Figure 5:
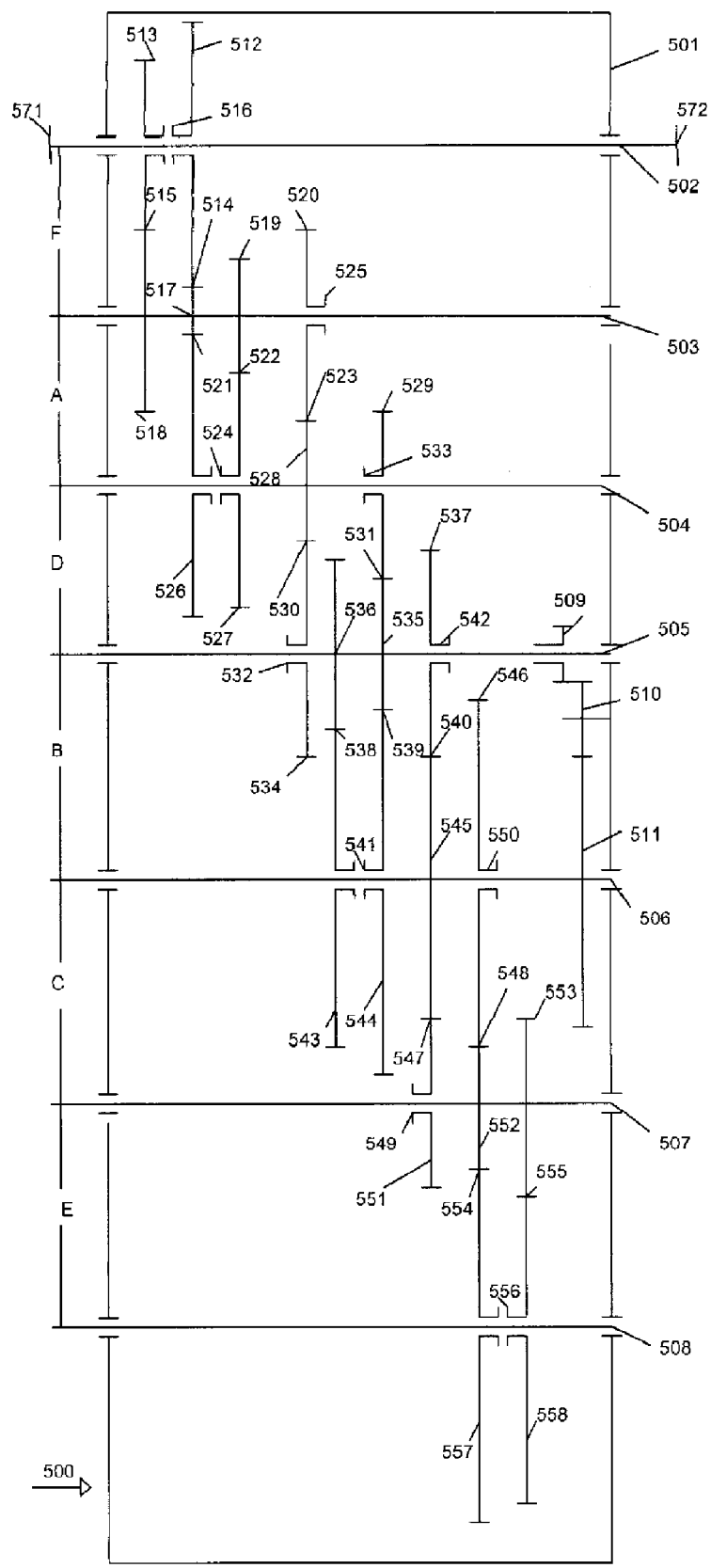
FIG. 5 is a diagram of a MDUFEE gearbox family according to formula 2×2×2×2×3×3 producing most torque number of 144 forward and 48 reverse torque with half forward and half reverse speeds.

In the fourth embodiment shown in FIG. 4 there are 108 forward and 36 reverse speeds included 54 overdrive forward and 18 overdrive reverse speeds. MDUFEE gearbox family 400 of mathematical gearbox formula 2×2×3×3×3 has frame members 401 supporting drive shaft 402, first intermediate shaft 403, second intermediate shaft 404, third intermediate shaft 405, fourth intermediate shaft 406 and output shaft 407.

Power may enter the MDUFEE gearbox family 400 on the left side on outward end 471 of the drive shaft 402 or on opposite outward end 472 if the drive shaft 402 in gearbox 400 is turned around for using the opposed side of teeth on the gears. A drive shaft 402 supported double synchronizer clutch 415 have pinions 411 and 412, which may be separately selected.

When pinions 411 or 412 is selected, it engages drive shaft 402, and engages and turns gear 416 or 417, respectively, on first intermediate shaft 403 to form gearset 413 or 414 with ratios are $R^{27}$ and $1/R^{27}$, respectively. Gearsets 413 and 414 connects drive shaft 402 and the first intermediate shaft 403 belong to unit E Then two powers enters to first intermediate shaft 403 with single synchronizer clutch 424 supported pinion 419 which may be separately selected, and two fixed pinions 416 and 418 meshed to gears 425 and 426 which may be separately selected by double synchronizer clutch 423 supported by second intermediate shaft 404.

When pinion 419 is selected it engages first intermediate shaft 403, and engages and turns gear 427, or gears 425 or 426 is selected it engages second intermediate shaft 404, and pinions 416 or 418 or 419 turns second intermediate shaft 404 by gears on to form gearsets 420 or 421 or 422, respectively. Gearsets 420 and 421 connects first intermediate shaft 403 and the second intermediate shaft 404 such that the second intermediate shaft 404 turns at a rate depending on the ratios of the gears in the gearsets 420, 421 and 422 have I/R, I, R, respectively, it belongs to unit A.

Then six different powers enters to second intermediate shaft 404 with single synchronizer clutch 432 supported pinion 428 which may be separately selected, and one fixed pinion 427 of gear of unit A meshed to gear 433 which may be separately selected by single synchronizer clutch 431 supported by third intermediate shaft 405.

When pinion 428 is selected it engages second intermediate shaft 404, and engages and turns gear 434, or gear 433 is selected it engages third intermediate shaft 405, and pinions 427 or 428 turns third intermediate shaft 405 to form gearsets 429 or 430, respectively. Gearsets 429 and 430 connects second intermediate shaft 404 and the third intermediate shaft 405 such that the third intermediate shaft 305 turns at a rate depending on the ratios of the gears in the gearsets 429 and 430 are $1/R^{13}$ and $R^{14}$, respectively, and it belongs to unit D.

Then twelve powers enters to third intermediate shaft 405 with single synchronizer clutch 441 supported pinion 436 which may be separately selected, and two fixed pinions 434 and 435 meshed to gears 442 and 443 which may be separately selected by double synchronizer clutch 440 supported by third intermediate shaft 406.

When pinion 436 is selected it engages third intermediate shaft 405, and engages and turns gear 444, or gears 425 or 426 is selected it engages second intermediate shaft 404, and pinions 442 or 443 or 444 turns fourth intermediate shaft 406 by gears on to form gearsets 437 or 438 or 439, respectively. Gearsets 437, 438 and 439 connects third intermediate shaft 405 and the fourth intermediate shaft 406 such that the fourth intermediate shaft 406 turns at a rate depending on the ratios of the gears in the gearsets 437, 438 and 439 are $1/R^9$, I, $R^9$, respectively, it belongs to unit C.

Then thirty six powers enters to fourth intermediate shaft 406 with three fixed pinions 444, 445 and 446 meshed to gears 452, 453 and 454 which may be separately selected by double synchronizer clutch 450 and single synchronizer clutch 451 supported by output shaft 407.

When gears 452 or 453 or 454 is selected it engages output shaft 407, and pinions 444 or 445 or 446 turns output shaft 407 by gears on to form gearsets 447 or 448 or 449, respectively. Gearsets 447, 448 and 449 connects fourth intermediate shaft 406 and the output shaft 407 such that the output shaft 407 turns at a rate depending on the ratios of the gears in the gearsets 447, 448 and 449 are $1/R^3$, I, and $R^3$, respectively, it belongs to unit B.

A sliding reverse pinion 408 runs power from the third intermediate shaft 405 to fourth intermediate shaft 406 by way of idler gear 409 and reverse gear 410. By design choice, as can be readily seen in FIG. 4, the reverse mechanism may have 9 different locations between the 6 shafts to provide 1, 2, 3, 4, 6, 9, 12, 18 and 27 reverse gears (no showed). The output shaft 407 has one hundred eight forward and thirty six reverse powers or torques and overdrive speeds.

When the various clutches in FIG. 4A are selected to operate the combinations of gears in the gearbox, 108 forward and 36 reverse speeds included 54 overdrive forward and 18 overdrive reverse speeds may be selected from in a 2, 2, 3, 3, and 3 pattern from unit A, B, C, D and E gearsets.

In the MDU gearbox depicted in FIG. 4B there are 144 torques, 108 forward and 36 reverse and non-showed 3 gearboxes of 2×2×2×3×3, 2××2×2×3 and 2×2×2×2×2 comprising 6 shafts and 25, 23, 21, 19 gears for a torque to gears and shafts ratio of 108, 72, 54, 32/(25, 23, 21, 19+6)=3.48, 2.48, 2.00, 1.28.

There is a uniform separation in the degree of the common ratio of the gearsets in each unit. The degree of common ratios of separation is calculated based on the maximum number of gearsets of transformed number of forward gears or torques as result of multipliers produced by the gearbox In MDU gearbox 400 shown in FIG. 4 B there are 5 units A, B, C, D and E with 2, 2, 3, 3 and 3 gearsets respectively. The gear ratios of gearsets are 1 and $1/R^{54}$ in the geometric sequence where the degree is 2×3×3×3=54 for unit E; 1 and $1/R^{27}$ in the geometric sequence where the degree is 3×3×3=27 for unit D, and 1 and $1/R^9$, $1/R^{18}$ in the geometric sequence where the degree is 3×3=9 for unit C, 1, $1/R^3$, and $1/R^6$ in the geometric sequence where the degree is 3 for unit B, and 1, and $1/R$, $1/R^2$ in the geometric sequence where the degree is 1 for unit A.

All geometric sequences transformed in faltering geometric sequences. There are $R^{27+2}$, $1/R^{27+2}$ of unit E, transformed $R^{14}$, $1/R^{13}$ of unit D, transformed $R^9$, 1, $1/R^9$ of unit C; transformed $R^3$, 1, $1/R^3$ of unit B, transformed R, 1, $1/R$ of unit A. The faltering gear ratio geometric sequence of all torques is $R^{56}, \ldots, R^3, 1/R^2, \ldots$, and $1/R^{55}$ where two geometric sequences are multiplied $1/R^2$ and $R^2$, respectively. There is available 108 forward and 36 reverse speeds included 54 overdrive forward and 14 overdrive reverse speeds may be selected from in a 2, 2, 3, 3 and 3 pattern from unit A, B, C, D and E gearsets.

A MDUFEE gearbox family 400 is shifted by from 5 to 10 general gearshift levers at the manual regime and from 1 to 2 gearshift levers at the semi-automatic regime.

In the fifth embodiment shown in FIG. 5 there are 144 forward and 48 reverse speeds included 72 overdrive forward and 36 overdrive reverse speeds. MDUFEE gearbox family 500 mathematical gearbox formula 2×2×2×2×3×3 has a frame members 501 supporting drive shaft 502, first intermediate shaft 503, second intermediate shaft 504, third intermediate shaft 505, fourth intermediate shaft 506, fifth intermediate shaft 507 and output shaft 508.

Power may enter the MDUFEE gearbox family 500 on the left side on outward end 571 of the drive shaft 502 or on opposite outward end 572 if the drive shaft 502 in MDUFEE gearbox family MDUFEE gearbox family 500 is turned around for using the opposed side of teeth on the gears.

The drive shaft 502 supported double synchronizer clutch 516 has pinions 512 and 513, which may be separately selected.

When pinions 512 and 513 are selected they engage drive shaft 502 and engage and turns gear 517 or 518, respectively, on first intermediate shaft 503 to form gearsets 514 or 515, respectively. Gearsets 514 or 515 connect drive shaft 502 and the first intermediate shaft 503 such that the first intermediate shaft 503 turns at a rate depending on the ratios of the gears in the gearsets 514 and 515 are $R^{36+2}$, $1/R^{36+3}$, respectively, belong to unit F.

Then two powers enters to first intermediate shaft 503 with single synchronizer clutch 525 supported pinion 520 meshed to gear 528, and two fixed pinions 517 and 519 meshed to gears 526 and 527 which may be separately selected by double synchronizer clutch 524 supported by second intermediate shaft 504.

When pinion 520 is selected, it engages first intermediate shaft 503, and engages and turns gear 528, or gears 526 and 527 is selected it engages second intermediate shaft 504, and pinions 517 or 519 or 520 turns second intermediate shaft 504 by gears on to form gearsets 521 or 522 or 523, respectively. Gearsets 521, 522 and 523 connect first intermediate shaft 503 and the second intermediate shaft 504 such that the second intermediate shaft 504 turns at a rate depending on the ratios of the gears in the gearsets 521, 522 and 523 are $1/R$, 1, R, respectively, it belongs to unit A.

Then six different powers enters to second intermediate shaft 504 with single synchronizer clutch 533 supported pinion 529 which may be separately selected, and one fixed pinion 528 of gear of unit A meshed to gear 534 which may be separately selected by single synchronizer clutch 532 supported by third intermediate shaft 505.

When pinion 529 is selected, it engages second intermediate shaft 504, and engages and turns gear 535, or gear 534 is selected it engages third intermediate shaft 505, and pinions 529 or 528 turns third intermediate shaft 505 to form gearsets 530 or 531, respectively. Gearsets 530 and 531 connect second intermediate shaft 504 and the third intermediate shaft 505 such that the third intermediate shaft 505 turns at a rate depending on the ratios of the gears in the gearsets 530 and 531 are $1/R^9$ and $R^9$, respectively, and it belongs to unit D.

Then twelve powers enters to third intermediate shaft 505 with single synchronizer clutch 542 supported pinion 537 meshed to gear 545, and two fixed pinions 536 and 535 meshed to gears 544 and 543 which may be separately selected by double synchronizer clutch 541 supported by fourth intermediate shaft 506.

When pinion 537 is selected, it engages third intermediate shaft 505, and engages and turns gear 545, or gears 544 or 543 is selected it engages fourth intermediate shaft 506, and pinions 535 or 536 or 537 turns fourth intermediate shaft 506 by gears on to form gearsets 539, 538 or 540, respectively. Gearsets 538, 539 and 540 connects third intermediate shaft 505 and the fourth intermediate shaft 506 such that the fourth intermediate shaft 506 turns at a rate depending on the ratios of the gears in the gearsets 539, 538 and 540, which are $1/R^3$, 1, and $R^3$, respectively, and belong to unit B.

Then thirty six powers enters to fourth intermediate shaft 506 with single synchronizer clutch 550 supported pinion 546 which may be separately selected, and one fixed pinion 545 meshed to gears 551 which may be separately selected by single synchronizer clutch 549 supported by fifth intermediate shaft 507.

When pinion 546 is selected it engages fourth intermediate shaft 506, and engages and turns gear 552, or gears 551 is selected it engages fifth intermediate shaft 507, and pinions 545 or 546 turns fifth intermediate shaft 507 by gears 551 or 552 on to form gearsets 547 or 548, respectively. Gearsets 547 and 548 connects fourth intermediate shaft 506 and the fifth intermediate shaft 507 such that the fifth intermediate shaft 507 turns at a rate depending on the ratios of the gears in the gearsets 548 or 547 are $1/R^4$ and $1/R^5$, respectively, it belongs to unit C.

Then seventy two powers enters to fifth intermediate shaft 507 with two fixed pinions 552 and 553 meshed to gears 557 and 558 which may be separately selected by double synchronizer clutch 556 supported by output shaft 508.

When gears 557 or 558 is selected it engages output shaft 508, and pinions 552 or 553 turns output shaft 508 by gears on to form gearsets 554 or 555, respectively. Gearsets 554 or 555 connects fifth intermediate shaft 507 and the output shaft 508 such that the output shaft 508 turns at a rate depending on the ratios of the gears in the gearsets 554 or 555 are $1/R^{18}$ and $R^{18}$, respectively, it belongs to unit E.

A sliding reverse pinion 509 runs power from the third intermediate shaft 505 to fourth intermediate shaft 506 by way of idler gear 510 and reverse gear 511 for 48 reverse speeds with half overdrive speeds. By design choice, as can be readily seen in FIG. 2, the reverse mechanism may have 11 different locations between the 6 shafts to provide 1, 2, 3, 4, 6, 8, 9, 12, 16, 18, 24, 27, 36 reverse gears (no showed).

The output shaft 507 has one hundred forty-four forward and forty-eighth reverse powers or torques.

When the various clutches in FIG. 5A are selected to operate the combinations of gears in the MDUFEE gearbox family, 144 forward and 48 reverse speeds included 72 overdrive forward and 36 overdrive reverse speeds may be selected from in 2, 2, 2, 2, 3, and 3 pattern from unit A, B, C, D, E and F gearsets.

In the MDUFEE gearbox family depicted in FIG. 5A there are 192 torques, 144 forward and 48 reverse, using 25, 23, 21, 19, gears and 7 shafts for a torque to gears and shafts ratio of 192, 144, 96/(26, 24, 22+7)=5.81, 4.64, 3.31.

In MDU gearbox 500 shown in FIG. 5B there are 6 units A, B, C, D, E and F with 2, 2, 2, 2, 3 and 3 gearsets, respectively. A gear ratios of gearsets are 1, $1/R^{72}$ in the geometric sequence with degree is 2×2×2×3×3=72 of unit F; 1, $1/R^{36}$ in the geometric sequence with degree is 2×2×3×3=36 of unit E, 1, $1/R^{18}$ in the geometric sequence with degree is 2×3×3=18 of unit D, 1, $1/R^9$ in the geometric sequence with degree is 3×3=9 of unit C, and 1, $1/R^3$, $1/R^6$ in the geometric sequence with degree is 3 of unit B; and 1, 1/R, $1/R^2$ in the geometric sequence with degree is 1 of unit A. There are transformed $R^{36}$, $1/R^{36+1}$ in faltering geometric sequence of unit F, transformed $R^{18}$, $1/R^{18}$ in faltering geometric sequence of unit E, transformed $R^9$, $1/R^9$ in faltering geometric sequence of unit D; transformed $R^5$, $1/R^4$ in faltering geometric sequence of unit C, transformed $R^3$, 1, $1/R^3$ in faltering geometric sequence of unit B, transformed R, 1, 1/R in faltering geometric sequence of unit A. The faltering gear ratio geometric sequence of all torques is $R^{74}$, ..., $R^3$, $1/R^3$, and $1/R^{74}$ where two geometric sequences are multiplied $1/R^3$ and $R^2$ respectively.

There is available 144 forward and 48 reverse speeds included 72 overdrive forward and 24 overdrive reverse speeds that may be selected from in a 2, 2, 2, 2, 3, and 3 pattern from unit A, B, C, D, E and F gearsets.

A MDUFEE gearbox family 500 is shifted by from 6 to 11 general gearshift levers at the manual regime and from 1 to 2 gearshift levers at the semi-automatic regime.

Figure 6:
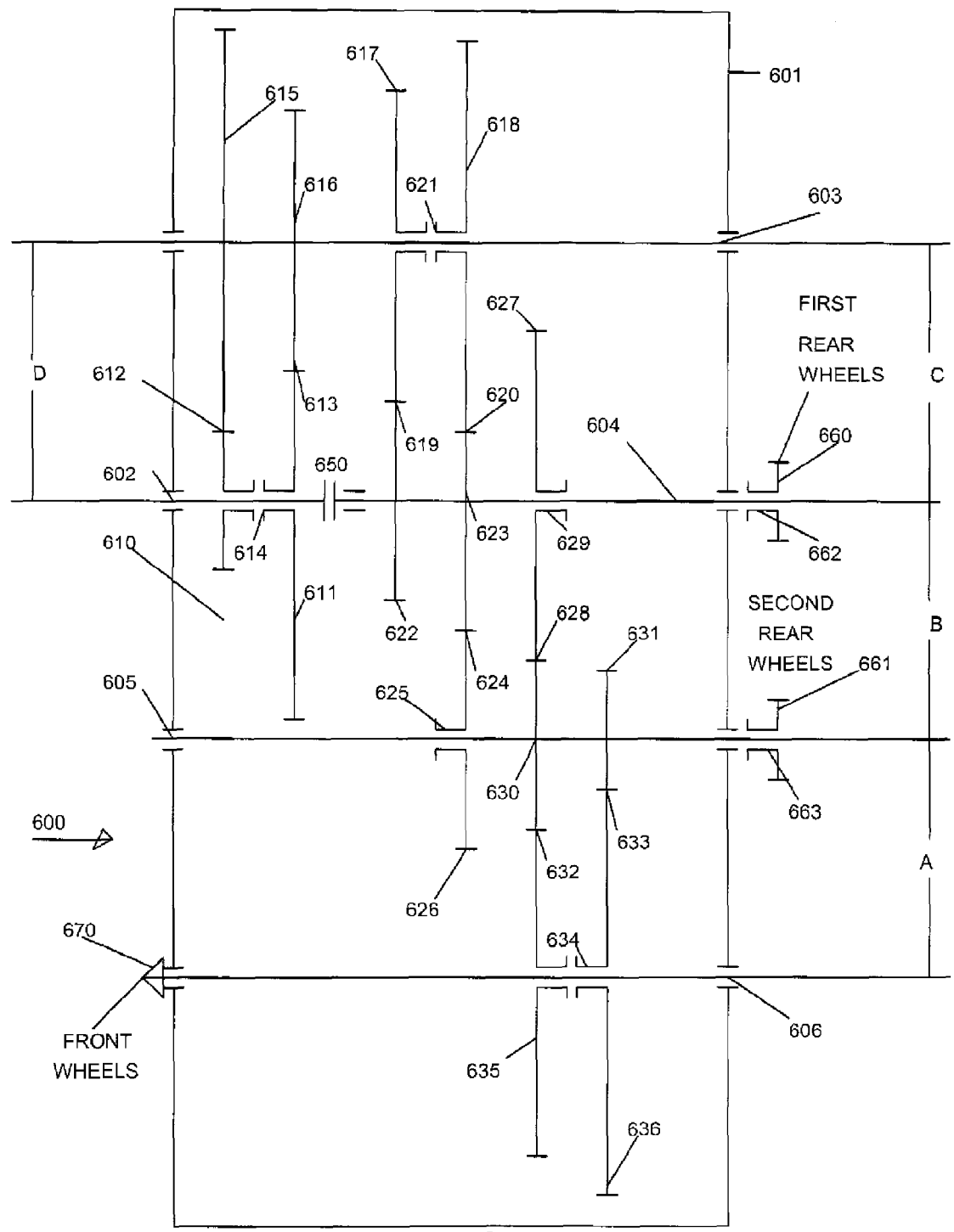
FIG. 6 is a diagram of a MDUFEE gearbox family according to formula (1+2×2)±(2×2×2×2+2×2) producing 25 forward and 10 reverse gears included 16 forward with 4 overdrive speeds for front wheels and one direct, 8 forward and 10 reverse speeds for rear wheels (2 overdrive reverse) by 5 shafts and 17 gears

In the sixth embodiment shown in FIG. 6 the gearbox is one of a compound MDUFEE gearbox family 600 of range-splitter type produces 25 gears of forward included 4 overdrive and 10 reverse speeds included overdrive reverse speed and direct speed by three output shafts of 5 shafts and 14 gears. It has mathematical formula (2×2)+1+(2×2×2×2)+(2×2) in order. A front wheels have 20 forward speeds according formula (2×2×2×2)+(2×2). A first rear wheels have 5 forward speeds included one direct according formula (2×2)+1 and second rear wheels have 10 reverse speeds included one overdrive and direct according formula (2×2)+(2×2×2).

A compound MDUFEE gearbox family 600 has frame members 601 supporting five gear trains with three output shafts connected to two pair of rear wheels and pair of front wheels. Thus, torque can be individually controlled with this embodiment to each of the first rear wheel, the second rear wheel and the front wheels. This is further shown below.

It Drives a First Rear Wheels by Pinion 660 of Clutch 661

A power enters to left side of the MDUFEE gearbox family 600 split drive shaft 602. The drive split shaft 602 passes through pinions 610 and 611 supported on double synchronizer clutch 614 and may be selected and meshed to two gears 615 and 616. When pinion 610 is selected, it engages and turns gear 615 on first intermediate shaft to form gearset 612 with ratio of 1 to $1/R^8$. When pinion 611 is selected, it engages and turns gear 616 on first intermediate shaft 603 to form gearset 613 with ratio of 1 to 1. Gearsets 612 and 613 connects drive split shaft 602 and the first intermediate shaft 603 are unit D gearsets.

The first intermediate shaft 603 passes through pinions 617 and 618 supported on double synchronizer clutch 621 and may be selected and meshed to two gears 622 and 623.

When pinion 617 or 618 is selected it engages and turns join gear 622 or 623 on first output shaft 604 to form gearset 619 or 620 with ratio of 1 to $1/R^8$ and ratio of 1 to $1/R^4$. Gearsets 619 and 620 connects first intermediate shaft 603 and the first output split shaft 604 to form unit C gearsets. A power enters to drive split shaft 602 joined to first output split shaft 604 by clutch 650 is direct connection to first rear wheels. The first rear wheels have 4 only forward according to geometric sequence $1/R^4$, $1/R^8$, $1/R^{12}$, $1/R^{16}$ and direct speeds.

It Drives a Second Rear Wheels by Pinion 662 of Clutch 663

The first output split shaft 604 has 4 torques according to geometric sequence $1/R^4$, $1/R^8$, $1/R^{12}$, and $1/R^{16}$. It has also fixed pinion 623 and free rotated pinion 627 on single synchronizer clutch 625 meshed to free rotated gear 635 on synchronizer clutch and 636 and gear 630 fixed to second intermediate shaft 605.

When first output split shaft 604 turns with pinion 623 it turns join gear 626 and second intermediate shaft 605 by single synchronizer clutch 625 if selected to form gearset 624 with ratio of 1 to $R^3$. When pinion 627 is selected, it engages and turns join gear 630 on second intermediate shaft 605 to form gearset 628 with ratio of 1 to $R^5$. Gearset 624 and 628 are unit B gearsets. The second rear wheels have 8 reverse speeds included one overdrive speed according to geometric sequence $(1/R^4, 1/R^8, 1/R^{12}, 1/R^{16}) \times (R^5, R^3) = R, 1/R, 1/R^3, 1/R^5, 1/R^7, 1/R^9, 1/R^{11}$, and $1/R^{13}$. A drive split shaft 602 joined to first output split shaft 604 by clutch 650. The first output split shaft 604 fixed pinion 623 and free rotated pinion 627 on single synchronizer clutch 629 meshed to free rotated gear 626 on synchronizer clutch 625 and gear 630 fixed to second intermediate shaft 605. The second rear wheels have 2 also overdrive reverse speeds according to geometric sequence $R^5$ and $R^3$.

It Drives Front Wheels by Fixed Pinion 670

A second intermediate shaft 605 has 8 speeds according to geometric sequence $R, 1/R, 1/R^3, 1/R^5, 1/R^7, 1/R^9, 1/R^{11}$, and $1/R^{13}$ and description in upper. The second intermediate shaft 605 has fixed pinion 630 and 631 meshed to gear 635 and 636 on double synchronizer clutch 634 and may selected. When gear 635 or 636 selected by double synchronizer clutch 634 second intermediate shaft 605 with pinion 630 or 631 turns third output shaft 606 to form gearset 632 or 633 with ratio of 1 to 1/R or ratio of 1 to 1. Gearset 632 and 633 connects second intermediate shaft 605 and the third output shaft 606 to form unit A gearsets. The front wheels driven by 16 torques according to geometric sequence $(R, 1/R, 1/R^3, 1/R^5, 1/R^7, 1/R^9, 1/R^{11}$, and $1/R^{13}) \times (1, 1/R) = R, 1/R, \ldots,$ and $1/R^{14}$ included one overdrive speed. Other gear train, the drive split shaft 602 connected to first output split shaft 604 by synchronizer clutch 650. A first output split shaft 604 connected to third output shaft 608 by units A and B that have description upper. The front wheels also driven by 4 overdrive speeds according to geometric sequence $(R^5, R^3) \times (1, 1/R) = R^5, R^4, R^3, R^2$. The front wheels have total 20 forward torques included 5 overdrive speeds.

When the various clutches are selected to operate the various combinations of gears in compound MDUFEE gearbox family 600, 25 forward and 10 reverse speeds may be selected from in unit A, B, C and D respectively.

The table in FIG. 6A shows the combinations of pinions. The overdrive speeds and torques can be calculated from the combinations of degrees of common ratios of the gears and pinions. There are 35 overdrive speeds and torques, 25 forward and 10 reverse included 5 forward and 3 reverse overdrive speeds by 14 gears and 5 shafts for a torque to gears and shafts ratio of 35/(14+5)=184%.

As shown the table in FIG. 6 B the combinations of gears yield two ratios of gearsets from the of two possibilities 1 and 1/R in unit A, two ratios of gearsets from the of two possibilities $R^3$ and $R^5$ in unit B, two ratios of gearsets from the of two possibilities $1/R^8$ and $1/R^4$ in unit C, two ratios of gearsets from the of two possibilities $1/R^8$ and 1 in unit D a total of 25 forward and 10 reverse torque combinations with 5 forward and 3 reverse overdrive speeds. The number of common ratio degrees in the gear ratios for this is defined according to the mathematical MDU gearbox formula of 2×2×2×2 of range or splitter type. It has 2 gearsets in each unit, degree is 1 for unit A, degree in unit B 1×2=2 since there a 2 gearsets in unit A, degree in unit C 2×2=4 since there a 2 gearsets in unit B, degree in unit D 4×2=8 since there a 2 gearsets in unit C. The compound MDU gearbox family with FEES design of the range-splitter type demand transformed gear ratios of each unit such that all torque and overdrive speed significances are different.

A MDUFEE gearbox family 600 is shifted by 5 or 6 general gearshift levers at the manual regime and 2 gearshift levers at the semi-automatic regime.

Figure 7:
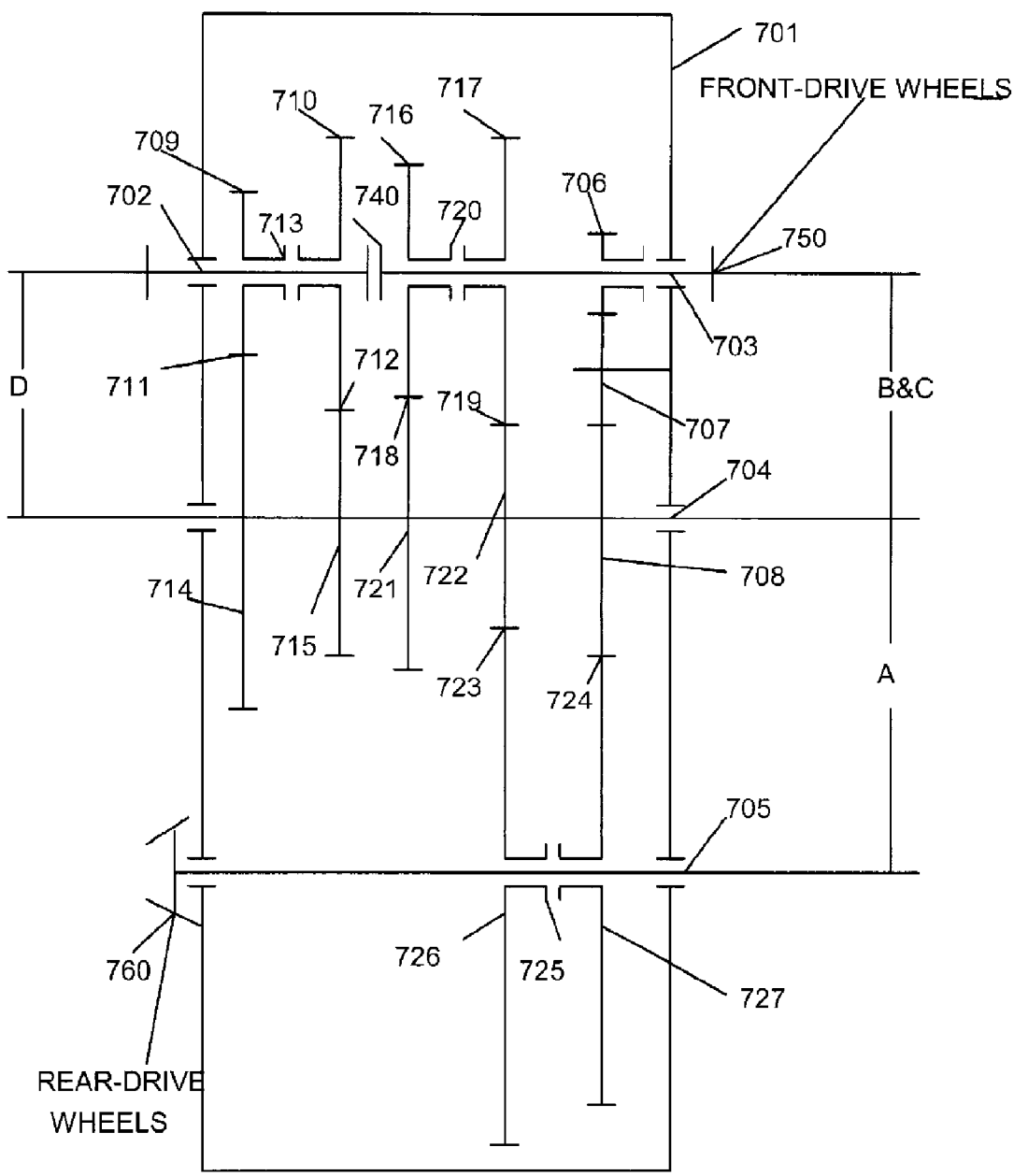
FIG. 7 is a diagram of a (1+2×2)+(2×2+2×2) MDUFEE gearbox family producing 13 forward and 4 reverse speeds included direct, 4 overdrive forward and 2 reverse speeds for front wheels and direct speed, 8 forward and 2 reverse speeds for rear wheels and direct speed of all wheels drive (4×4) by 4 shafts and 13 gears

A seventh embodiment, shown in FIG. 7, is different than embodiment, shown in FIG. 6, by reverse mechanism that is installed instead one output shaft and use one pair of rear wheels. There are 13 forward and 4 reverse speeds included two direct speeds by 4 shafts and 13 gears according to mathematical gearbox formula (1+2×2)+(2×2+2×2) in order. The front wheels have 5 forwards speeds as one direct, 2 forward torques, 2 forward and 2 reverse overdrive speeds. The rear wheels have one direct and 6 forward and 2 reverse torques, and one forward overdrive speed for rear wheels.

A compound MDUFEE gearbox family 700 has frame members 701 supporting three gear trains with two output shafts connected to front, rear wheels by pinions 750 and 760. The frame members 701 comprises drive split shaft 702, intermediate shaft 704, first output split shaft 703 connected to front wheels the pinion 750, second output shaft 705 connected to the rear wheels by pinion 760, which support three gear trains.

Power enters to left side of the compound MDUFEE gearbox family 700. The drive split shaft 702 give power to three gear trains. Each are further described below.

It Drives the Rear Wheels by Fixed Pinion 760

The first gear train is drive split shaft 702 has two free rotated pinions 709 and 710 fixed by synchronizer clutch 713 and meshed to gears 714 and 715 fixed to first intermediate shaft 704 having also two fixed pinions 722 and 708 and meshed to free rotated gears 723 and 724 fixed to first output split shaft 705 by synchronizer clutch 725. The first train is the drive split shaft 702 passes through double synchronizer clutch 713 with pinions 709 and 710 which may selected. When pinion 709 or 710 is selected, it engages drive split shaft 702, and engages and turns gear 714 or 715 on intermediate shaft 704 to form gearset 711 or 712 with a chosen ratio of $1/R^3$ or $1/R$.

Gearset 711 and 712 connects drive split shaft 702 and intermediate shaft 703 formed unit B1 of two gearsets. The pinions 708 and 722 fixed to the intermediate shaft 704 connected to gears 726 and 727 supported on double synchronizer clutch 725. When selected gear 726 or 727 engages by double synchronizer clutch 725 the second output shaft 705 a pinion 708 or 722 turns it to form gearset 723 or 724 with ratio of 1/R or 1. Gearset 723 and 724 connects second intermediate shaft 704 the second output shaft 705 and form unit A of gearsets.

The second gear train is when a drive split shaft 702 joined to first output split shaft 703 by synchronizer clutch 740. A first output split shaft 703 passes through double synchronizer clutch 720 with pinions 716 and 717, which may selected. When gear 716 or 717 is selected it engages first output split shaft 703, and join pinion 721 or 722 on intermediate shaft 704 engages and turns to form gearset 718 or 719 with a ratio of $1/R^5$ or $R^2$. Gearsets 718 and 719 are unit B2 gearsets is between first output split shaft 703 and intermediate shaft 704 such that the intermediate shaft 704 turns at a rate of 1 to $1/R^5$ and 1 to $R^2$. When selected gear 726 engages by double synchronizer clutch 725 the second output shaft 705 a pinion 722 turns it to form gearset 723 with ratio of 1 to $1/R^2$. When selected gear 727 engages by double synchronizer clutch 725 the second output shaft 705 a pinion 708 turns it to form gearset 724 with ratio of 1 to 1/R. Gearset 723 and 724 connects second intermediate shaft 704 the second output shaft 705 and form unit A of gearsets.

The rear wheels have 8 forward speeds included one overdrive and direct speed according to the faltering geometric sequence $R, 1, 1/R^2, 1/R^3, 1/R^4, 1/R^5, 1/R^6$ and $1/R^7$.

Two reverse speeds available are when reverse pinion 706 is selected and fixed by single synchronizer clutch and a first output split shaft 703 connected to drive shaft 702 by clutch 740. A reverse gear 707 joined to pinion 708 fixed to intermediate shaft 704. When selected gear 726 engages by double synchronizer clutch 725 the second output shaft 705 a pinion 722 turns it to form gearset 723 with ratio of 1 to $1/R^2$. When selected gear 727 engages by double synchronizer clutch 725 the second output shaft 705 a pinion 708 turns it to form gearset 724 with ratio of 1 to 1/R

It Drives the Front Wheels by Fixed Pinion 750 of Synchronizer Clutch 751

The drive split shaft 702 joined to first output split shaft 703 by synchronizer clutch 740 is direct torque and speed. The third gear train is comprised unit B1 that had description upper. The intermediate shaft 704 having also two fixed pinions 722 and 722 and meshed to free rotated gears 716 and 717 fixed to first output split shaft 703 by synchronizer clutch 720. A fixed pinion 721 of intermediate shaft 704 turns gear 716 when it selected and engaged the first output shaft 703 by double synchronizer clutch 720 to form gearset 718' with ratio of 1 to $R^5$. A fixed pinion 722 of intermediate shaft 703 turns gear 717 when it selected and engaged the first output shaft 703 by double synchronizer clutch 720 to form gearset 719' with ratio of 1 to $1/R^2$. Gearset 718' and 719' connects intermediate shaft 704 to first output shaft 703 and form unit 1/B2 of gearsets. The front wheels have 4 forward speeds included 2 overdrive according to the faltering geometric sequence $R^4$, $R^2$, $1/R^3$, and $1/R^5$ from this gear trains.

Two reverse speeds are available. When pinion 709 is selected, it engages drive split shaft 702, and engages and turns gear 714 on intermediate shaft 704 to form gearset 711 with a chosen ratio of $1/R^3$. When pinion 710 is selected, it engages drive split shaft 702, and engages and turns gear 715 on intermediate shaft 704 to form gearset 712 with a chosen ratio of $1/R^2$. A intermediate shaft 704 turns fixed pinion 708 that turns reverse gear 707, which turns a first output split shaft 703 is selected and fixed by reverse gear 707 on single synchronizer clutch.

It Drives all Wheels

When pinion 709 or 710 is selected it engages drive split shaft 702, and engages and turns gear 714 or 715 on intermediate shaft 704 to form gearset 711 or 712 with a chosen ratio of $1/R^3$ or 1/R. The fixed joined pinion 722 of intermediate shaft 704 turn two selected gears 717 and 726 when they engaged by two double synchronizer clutches 720 and 725 in the same time to first and second output shafts 703 and 706, that have the same ratio $1/R^5$ or $1/R^3$.

The second gear train is when a drive split shaft 702 joined to first output split shaft 703 by synchronizer clutch 740 for direct speed to first output split shaft 703. It passes through double synchronizer clutch 720 with pinion 717, which may be selected.

When gear 717 is selected it engages first output split shaft 703, and join pinion 722 on intermediate shaft 704 engages and turns to form gearset 719 with a ratio of $R^2$ A pinion 722 turns second output shaft 705 by gear 726 that selected by double synchronizer clutch 725 to form gearset 719 with a ratio of $1/R^2$. The second output shaft 705 has direct speed too ($1/R^2 \times R^2 = 1$).

When the various clutches are selected to operate the various combinations of gears in compound MDUFEE gearbox family 700, thirteen forward and four reverse speeds may be selected from in a 2, 2, 2 pattern using gearsets in unit A, B1, B2 and 1/B2 respectively.

The table in FIG. 7A shows the combinations of pinions selected at the clutches to yield the 13 forward and 4 reverse speeds. The speeds can be calculated from the combinations of degrees of common ratios of the gears and pinions. There are 17 torques on 13 gears and 4 shafts for a torque to gears and shafts ratio of 17/(13+4)=100%.

Combinations of gear ratios are shown in the table in FIG. 7B. It has mathematical gearbox formula $(1+2\times2)+(2\times2+2\times2)$. There is one unit A connected to two units B1 and B2 having different degrees of common ratio to form a faltering geometric sequence of gear ratios in unit B2. have 2 gearsets for calculation; one unit gearsets could be Three geometric sequences of gear ratios B1 is 1, $1/R^2$; B2 is 1, $1/R^2$; A is 1, 1/R transforming to B1 is $1/R^3$, 1/R by 1/R; B2 is 1, $R^2$; A is 1, 1/R. Then 1 of 1, $R^2$ multiplied by $1/R^5$ in unit B1 since 5>3. A faltering geometric sequence of the torques $R^2$, R, 1/R, $1/R^2$, $1/R^3$, $1/R^4$, $1/R^5$, and $1/R^6$ for rear wheels and a front wheels have the faltering geometric sequence $R^4$, $R^2$, $1/R^3$, and $1/R^5$. A MDUFEE gearbox family 700 is shifted by 4 general gearshift levers at the manual regime and 2 gearshift levers at the semi-automatic regime.

In an eighth embodiment, shown in FIGS. 8 and 8A, the gearbox is one of a compound MDU FEE gearbox family 800 of said mirror-range type with four output shafts. This design is unusual than other so that four output shafts extended from general drive shaft in both sides by intermediate shafts supported gearsets with separated gear ratios as will. Other words, two changeable compound MDUFEE gearbox families of range type with one general drive shaft.

It has two different designs that produce 8 forward speeds by 5 shafts and 12 gears according to two mathematical formulas of $(2\times2)$ and $2(2\times2)$. One design produces 4 identical forward and 2 identical reverse speeds for front and rear pair of wheels that provide to use simultaneously two pair front and rear wheels (4×4) in the same speeds. Other design produces 8 forward and 4 reverse different speeds since both gear trains comprising gearsets having different ratios.

A compound MDU FEE gearbox family 800 has design such that from one general drive shaft extended two independent gear trains in the same frame of members 801 or two the same frames of members 801 and 801M (no showed). Each gear train has a mathematical MDU gearbox formula of 2×2. A frame members 801 supporting two gear trains as two MDU FEE gearbox families comprising one general drive shaft 802, four output shafts 803, 804 and 803M, 804M and any angle between two gear trains (FIG. 8 A). The intermediate shaft 803 and 803M are two output shafts 803 and 803M connected to first pair of rear and front wheels for 2 reverse speeds, the output shafts 804 and 804M connected to second pair of rear and front wheels for 4 front speeds. Two the same gear trains are general drive shaft 802, two intermediate shafts 803 and 803M are output shafts 803 and 803M, two output shafts 804 and 804M connected to two pair of rear wheels and two pair of front wheels (no showed).

The gearbox drives two pair of front wheels or two pair of rear wheels. One pair of first front and rear wheels is for reverse speeds and other pair of second front and rear wheels is for forward. It drives pair of front or rear wheels or simultaneously by the same speeds dependent to uphill or downhill for saving energy.

Power enters to left side of the MDUFEE gearbox family 800 on outward end 851 of the drive shaft 802 or on opposed outward end 852 if the shaft is turned over for using the opposed side of teeth of gears. The drive shaft 802 gives power to two gear trains in the same time. The first train is the drive shaft 802 passes through double synchronizer clutch 809 with pinions 805 and 806, which may selected. When pinion 805 is selected it engages drive split shaft 802, and engages and turns gear 810 on intermediate shaft 803 to form gearset 807 with a chosen ratio of 1/R. When pinion 806 is selected, it engages drive shaft 802, and engages and turns gear 811 on first intermediate shaft 803 to form gearset 808 with a chosen ratio of 1. Gearset 807 and 808 connects drive shaft 802 and intermediate shaft 803 formed unit A of two gearsets.

The pinions 810 and 811 fixed to the intermediate shaft 803 connected to gears 814 and 817 supported on double synchronizer clutch 813. When gear 814 is selected it engages output shaft 804, and join pinion 810 on intermediate shaft 803 engages and turns to form gearset 812 with a ratio of $1/R^{12}$. When gear 817 is selected it engages output shaft 804, and join pinion 815 on intermediate shaft 803 engages and turns to form gearset 816 with a ratio of $R^6$. Gearsets 816 and 812 are unit B gearsets is between intermediate shaft 803 and output shaft 804 such that the output shaft 804 turns at a rate of 1 to $1/R^{12}$ and 1 to $R^6$. There is the same for second train.

Both gear trains of MDUFEE gearbox family 800 produces 4 forward and 2 reverse the same speeds separately or simultaneously for pair of front or rear wheels. There are an each unit has 2 gearsets; one unit of two gearsets could be 1, $1/R^2$ and second unit 1, 1/R gear ratios in the geometric sequence. Then they could transform at will.

There is one unit A connected to unit B having different degrees of common ratio to form a faltering geometric sequence of gear ratios in unit B. Two geometric sequences of gear ratios B1 are 1, $1/R^2$; A are 1, 1/R. Transformed faltering geometric sequence is R, 1/R in unit B. Then two geometric sequences transformed to two faltering geometric sequences by $R^6$ and $1/R^{12}$. There $1/R^2$ is multiplied by chosen $1/R^{10}$ and R is multiplied by chosen $R^5$ in unit B.

A faltering geometric sequence of the 2 forward torques and 2 overdrive speeds has $R^6$, $R^5$, $1/R^{12}$, $1/R^{13}$ for four wheels or second front wheels and second rear wheels if it have been driven separately.

Two intermediate shafts 803 and 803M are two output shafts connected to first front and first rear wheels. They have two reverse speeds separately or simultaneously.

A MDUFEE gearbox family 8A is shifted by 3 general gearshift levers at the manual regime and 1 gearshift lever at the semi-automatic regime.

Other design has two different gear trains. One gear train has 4 overdrive forward and 2 reverse speeds and other has 4 forward and 2 reverse torques. First gear train has two units with gearsets having ratios $R^6$, $1/R^{12}$ and 1/R, 1 as upper. A second gear train has two units with gearsets having inverse ratios $1/R^6$, $R^{12}$ and R, 1 form the faltering geometric sequence $R^{13}$, $R^{12}$, $1/R^6$, $1/R^5$.

A MDUFEE gearbox family on FIG. 8,B is shifted by from 6 to 11 general gearshift levers at the manual regime and 1 gearshift lever at the semi-automatic regime.

In a ninth embodiment the gearbox is one of an open-many-sided compound MDUFEE gearbox family 900 design of a said cross-mirror type with all output shafts connected to propellers as shown in FIGS. 9 and 9A. It different from that shown in FIGS. 8 and 8A by additional five output shafts are driven by general drive shaft. such that it could be used by machines such as, for example, boat, ship, submarine, helicopter, airplane, wind generator that are supported by air or water. Moreover, it has opportunity to eliminate rudder and other operation control system of water and air. This design significantly increases the maneuverability.

There are four gear trains. Each gear train for MDUFEE gearbox families has a mathematical formula of 2×2. There are an each unit has 2 gearsets; one unit of two gearsets could be 1, $1/R^2$ and second unit 1, 1/R gear ratios in the geometric sequence. Then it transforms at will. There are the said open-many-sided compound MDUFEE gearbox family 900 that produces 342 mutual forward, 288 mutual left-turns, 288 mutual right-turns, 288 mutual top-turns, 288 mutual bottom-turns and 2 reverse speeds included the chosen overdrive speeds of 232 mutual forward speeds by 9 shafts and 25 gears. The said open-many-sided compound MDUFEE gearbox family 900 comprising one general drive shaft 902 extending by four independent gear trains 951, 952, 953, and 954 to form cross-design with the angles between them. Each gear train of forward speeds have two shafts with propellers are 1, 2; 3, 4; 5, 6; 5', 6' with 7 gears as 908, 909, 913, 914, 915, 920 and 921; The two independent gear trains 951 and 952 in series of vertical flatness and two independent gear trains 953 and 954 in series of horizontal flatness. The two pinions 908 and 909 of the general drive shaft permanently meshed to four gears 913 and 914 of four trains in the same time since it has total number of gears equals 25 gears (with included 3 gears of a reverse mechanism) supported by 9 short shafts.

A cross-frame member 901 comprising general drive shaft 902 connected to eight output shafts 903, 904, 903M, 904M, 906, 907, 906M, and 907M that are supporting four gear trains 951, 952, 953, and 954. A propeller of drive shaft 902 has the location before 4 propellers 2, 4, 6 and 6' that have location before 4 propellers 3, 5, 7 and 7.

First and second gear trains 951 and 952 are located on vertical flatness but two gear trains 953 and 954 are located on horizontal flatness so that it provides turns in water and air. The third and fourth gear trains 953 and 954 are the same. Power enters to left side of the drive shaft 902 to propeller having direct speed.

The first train 952 has the drive shaft 902 passes through double synchronizer clutch 912 with pinions 908 and 909, which may be selected. When pinion 908 or 909 is selected, it engages drive split shaft 902, and engages and turns gear 913 or 914 on first output shaft 903 to form gearset 910 or 911 with a chosen ratio of $R^2$ or $R^3$. Gearset 910 and 911 connects drive shaft 902 and intermediate shaft 903 formed unit A of two gearsets. The first output shaft 903 has 2 forward speeds The pinions 914 and 915 fixed to the intermediate shaft 903 connected to gears 920 and 921 supported on two single synchronizer clutches 918 and 919.

When gear 920 or 921 is selected it engages output shaft 904, and join pinion 914 or 915 on intermediate shaft 903 engages and turns to form gearset 916 or 917 with a ratio of $R^2$ or $R^4$ Gearsets 916 and 917 are unit B gearsets is between intermediate shaft 903 and output shaft 904 such that the output shaft 904 turns at the two rates of 1 to $R^2$ and 1 to $R^4$. The second output shaft 904 has 2×2=4 forward speeds. Both two output shafts have 2+4=6 forward speeds.

The first train 951 of the top location produces two geometric sequence of overdrive speeds according to chosen gear ratios $R^2$, $R^3$, $R^4$, $R^5$, $R^6$ and $R^7$. The second gear train 952 of the bottom location has the inverse gear ratios $1/R^2$, $1/R^3$ and $1/R^4$, $1/R^5$, $1/R^6$ and $1/R^7$. Both gear trains 951 and 952 produces the faltering geometric sequence of $R^2$, $R^3$, $R^4$, $R^5$, $R^6$, $R^7$ and $1/R^2$, $1/R^3$, $1/R^4$, $1/R^5$, $1/R^6$, $1/R^7$ of 12 forward single speeds. Then the combinations of using the two or more propellers creates the additional 36 mutual forward speed combinations and total is 36+12=48 forward speeds The third and fourth trains 953 and 954 of the left and right side locations produces the two geometric sequence of 6 overdrive speeds by chosen gear ratios $R^2$, $R^3$, $R^4$, $R^5$, $R^6$ and $R^7$ is chosen the same as first train 951. Both gear trains 953 and 954 produce two identical forward speeds. There are additional six twin speeds and combinations of propeller speeds with all propeller speeds of four gear trains 951, 952, 953, and 954. The total is 48×6+6=294 forward speeds.

The first and second gear trains 951 and 952 of the top and bottom locations together with third and fourth trains 953 and 954 of the left and right side locations produces 294+48=342 forward speeds and 48×6=288 left, right, top, and bottom speeds of turns.

A sliding reverse pinion 905 on intermediate shaft 903M engages idler gear 906 permanently meshed to reverse gear 907. By design choice, as can be readily seen in FIG. 9, the MDU gearbox 900 may have 2 reverse speeds.

A MDUFEE gearbox family 900 is shifted by from 8 to 12 general gearshift levers at the manual regime and 4 gearshift levers at the semi-automatic regime.

Figure 10B:
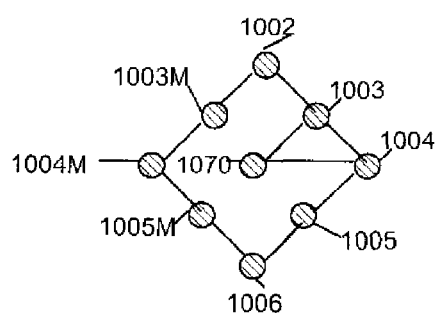

In the tenth embodiment the gearbox is of the close-many-sided compound MDUFEE gearbox family 1000 design shown in FIGS. 10, 10A, and 10B. It is different than design shown in FIGS. 8 and 8A by two small power sources of half power drive with input shafts 1002 and 1006 that simultaneously are two output shafts 1002 and 1006 or one output shaft 1070 (10B). It supported two gear trains form one gear train 1051 with other mirror gear train 1051M is supported by the same two input-output shafts 1002 and 1006. The gear trains 1051 and 1051M have the same gear ratios in each unit defined according to mathematical MDU gearbox formula of 2×2×2×2. This design has a said mirror-close-many-sided type for saving energy by using one power source with inertia of movement. The gear train 1051 has three intermediate shafts supported four units A, B, C and D.

A member frame 1001 comprising two joined input-output shafts 1002 and 1006 by two gear trains 1051 and 1051M symmetrical located both power sources. Each gear train has four units A, B, C and D. An input-output shaft 1002 has double synchronizer clutch 1011 with pinions 1007 and 1008 meshed to gears 1012 and 1013 fixed to first intermediate shafts 1003 that has single synchronizer clutch 1016 with pinion 1014 meshed to gear 1017 fixed to second intermediate shafts 1004 having single synchronizer clutch 1019 with gear 1020 is driven by pinion 1013 fixed to first intermediate shafts 1003. A second intermediate shafts 1004 has also single synchronizer clutch 1025 with pinion 1021 meshed to gear 1026 fixed to third intermediate shafts 1005 having single synchronizer clutch 1024 with gear 1027 is driven by pinion 1017 fixed to second intermediate shafts 1004. A third intermediate shafts 1005 has also two fixed pinions 1026 and 1030 meshed to gears 1033 and 1034 fixed to input-output shafts 1006 by two single synchronizer clutches 1031 and 1034. All shafts connect to propellers 1, 2, 3, 4, 5, 6, 7, and 8 shown FIGS. 10 and 10A for crafts using water and air such as, for example, boat, ship, submarine, helicopter, airplane and spaceships. This design eliminates rudder and other operation control system, which significantly increase the maneuverability of crafts since it has more attention. Two input-output shafts 1002 and 1006 are connected to shaft 1060 joined to wheels by pair of gears for vehicle shown in FIG. 10B.

The drive shaft 1002 give power to two symmetrical gear trains 1051 and 1052 in the same time. The first train 1051 has the drive shaft 1002 passes through double synchronizer clutch 1011 with pinions 1007 and 1008 that may selected. When pinion 1007 is selected, it engages drive shaft 1002, and engages and turns gear 1012 on first intermediate shaft 1003 to form gearset 1009 with a chosen ratio of 1/R. When pinion 1008 is selected, it engages drive shaft 1002, and engages and turns gear 1013 on first intermediate shaft 1003 to form gearset 1010 with a chosen ratio of 1. Gearset 1009 and 1010 connects drive shaft 1002 and first intermediate shaft 1003 formed unit A of two gearsets. The first intermediate shaft 1003 with propeller 2 has 2 rotations.

The pinion 1014 with single synchronizer clutch 1016 and pinion 1013 fixed to the first intermediate shaft 1003 connected to gears 1017 and 1020 supported on single synchronizer clutch 1019. When gear 1020 is selected it engages second intermediate shaft 1004, and join pinion 1013 on first intermediate shaft 1003 engages and turns to form gearset 1018 with a ratio of R. When pinion 1014 is selected it engages first intermediate shaft 1004 and gear 1017 on second intermediate shaft 1004 engages and turns to form gearset 1015 with a ratio of 1/R. Gearsets 1015 and 1018 are unit B gearsets is between first intermediate shaft 1003 and second intermediate shaft 1004 such that the second intermediate shaft 1004 turns at the two rates of 1 to R and 1 to 1/R. The second intermediate shaft 1004 with propeller 3 has 2×2=4 rotations.

The pinion 1021 with single synchronizer clutch 1025 and pinion 1017 fixed to the second intermediate shaft 1003 connected to gears 1027 and 1026 on single synchronizer clutch 1024 supported by third intermediate shaft 1005. When gear 1027 is selected, it engages third intermediate shaft 1005, and join pinion 1017 on second intermediate shaft 1003 engages and turns to form gearset 1022 with a ratio of $R^2$. When pinion 1021 is selected, it engages second intermediate shaft 1003 and gear 1026 on third intermediate shaft 1005 engages and turns to form gearset 1023 with a ratio of $1/R^2$. Gearsets 1022 and 1023 are unit C gearsets is between second intermediate shaft 1003 and third intermediate shaft 1005 such that the third intermediate shaft 1005 turns at the two rates of 1 to $R^2$ and 1 to $1/R^2$. The third intermediate shaft 1005 with propeller 4 has 2×2×2=8 rotations.

The pinions 1026 and 1028 fixed to the third intermediate shaft 1005 connected to gears 1033 and 1034 with two synchronizer clutches 1031 and 1032 supported by output shaft 1006. When gear 1033 is selected it engages output shaft 1006, and join pinion 1026 on third intermediate shaft 1006 engages and turns to form gearset 1029 with a ratio of $R^4$. When gear 1034 is selected it engages output shaft 1006, and join pinion 1028 on third intermediate shaft 1005 engages and turns to form gearset 1030 with a ratio of $1/R^4$. Gearsets 1029 and 1030 are unit D gearsets is between third intermediate shaft 1005 and output shaft 1006 such that the output shaft 1006 turns at the two rates of 1 to $R^4$ and 1 to $1/R^4$. The bottom input-output drive shaft 1006 with propeller 5 has 2×2×2×2=16 rotations.

The said mutual forward speed of object is rotations of two propellers on both symmetrical sides of design in the same time. The mutual forward speeds of object available when direct speed of top or bottom input-output drive shafts 1002 or 1006, two first symmetrical intermediate shafts 1003, 1003M with propeller 2 and 8 having 2 rotations, two symmetrical second intermediate shafts 1004, 1004M with propeller 3 and 7 having 4 rotations, two symmetrical third intermediate shaft 1005, 1005M with propeller 4 and 6 having 8 rotations, bottom input-output shaft 1006 with propeller 5 having 16 rotations. Therefore, four shafts have 1+2+4+8+16=31 mutual forward speeds of object and 62 mutual forward speeds by both power source 1061 and 1062.

The said mutual turn of object is rotations of one or more propellers on one symmetrical side in the same time. The mutual right or left-turn of object in horizontal surface available when first and second intermediate shafts 1003, 1004 with propellers 2 and 3 having 2, 4 rotations and propellers 4, 3 having 8, 4 rotations. There are 2×4+8×4=40 left or right turns by both power sources. The combinations of propellers 2-4 and 8-6 having 2, 8 create 2×8=16 down or up-turns of right or left side.

For Crafts

Each unit has 2 gearsets according to formula 2×2×2×2. Four units of two gearsets could be 1, $1/R^8$; 1, $1/R^4$; 1, $1/R^2$; 1, $1/R$ gear ratios in the geometric sequence. Then it is transformed to four faltering geometric sequence $R^4$, $1/R^4$; $R^2$, $1/R^2$; R, $1/R$; and R, 1 gear ratios. For eliminating a direct speed and other closed items, two geometric sequences of the most degrees is multiplied by $R^5$ and $1/R^5$ in result $R^9$, $1/R^9$. Therefore there are two faltering geometric sequences for overdrive speeds is $R^{13}$, ..., $R^6$ and for torques is $1/R^5$, ..., $1/R^{12}$. There are 62 torques and overdrive on 22 gears and 8 shafts for a torque and overdrive to gears and shafts ratio of 62/(22+8)=307%.

There are 62 forward mutual speeds included 16 forward-up or down, and 40 left or right-turns in horizontal surface, mutual 16 right or left-up-turns and 16 right or left-down-turns with the half overdrive number by 8 shafts and 22 gears.

A MDUFEE gearbox family 1000 at FIG. 10A is shifted by from 6 to 12 general gearshift levers at the manual regime and 2 gearshift levers at the semi-automatic regime.

For Vehicle

A use of the design of tenth embodiment shown in FIG. 10, 10 B is available for vehicle. It is different than design shown in FIGS. 10 and 10 A by one additional general output shaft 1070 located between two gear trains 1051 and 1051M and additional three gears.

A general output shaft 1070 is connected to intermediate shaft 1004 by two pairs of gears that created four gear trains 1002-1003M-1004M-1005M-1006-1005-1004-1070, 1002-1003-1004-1070, 1006-1005-1004-1070, 1006-1005M-1004M-1003M-1002-1003-1004-1070 according to formulas: 2×2×2×2×2×2×2; 2××2; 2××2; 2××2×2×2×2×2 that produces 128+128+8+8=272 forward speeds.

The gear ratios of geometric sequence is created by common ratio $R_1$ in each unit is the same for two gear trains of 128 forward speeds as $1-1/R_1$; $1-1/R_1^2$; $1-1/R_1^4$; $1-1/R_1^8$; $1-1/R_1^{16}$; $1-1/R_1^{32}$; $1-1/R_1^{64}$ according gearbox formula. Each geometric sequence of unit transformed to faltering geometric sequence as $R_1$-1; $R_1$-$1/R_1$; $R_1^2$-$1/R_1^2$; $R_1^4$-$1/R_1^4$; $R_1^8$-$1/R_1^8$; $R_1^{16}$-$1/R_1^{16}$; and $R_1^{32}$-$1/R_1^{32}$ is first gear train. The second gear train is created by multiplying these faltering geometric sequences by gear ratio $R_1^{33}$ and $1/R_1^{32}$ so that each degree is delivered among units. It is $R_1^{10}$-$1/R_1^9$; $R_1^{10}$-$1/R_1^{10}$; $R_1^{10}$-$1/R_1^{10}$; $R_1^{10}$-$1/R_1^{10}$; $R_1^8$-$1/R_1^8$; $R_1^{16}$-$1/R_1^{16}$; and $R_1^{32}$-$1/R_1^{32}$. Therefore, both gear trains produce 256 forward torques and overdrive speeds according to two geometric sequences: $R_1$- ... -$R_1^{128}$ and $R_1$- ... -$R_1^{127}$.

Two other gear trains have the same formula 2×2×2 and basic geometric sequences of $1-1/R$; $1-1/R^2$ and $1-1/R^4$ in units but different number of overdrive speeds and common ratio magnitudes as will. One gear train produces 2 overdrive speeds according to faltering geometric sequence $R_2^2$-$1/R_2^2$ in last unit. Other gear train produces 3 overdrive speeds according to two faltering geometric sequences $R_3$-$1/R_3$ and $R_3^2$-$1/R_3^2$ in last and previous units. Therefore, both gear trains produce 16 forward torques and overdrive speeds according to four geometric sequences: $R_2$-$R_2^2$; $1/R_2$-$1/R_2^2$-$1/R^6$; $R_3$-$R_3^2$-$R_3^3$; and $1-1/R_2$-$1/R_2^2$- ... -$1/R^5$.

A general output shaft 1070 connected also to intermediate shaft 1003 by one gear pair and it is formed four gear trains 1002-1003M-1004M-1005M-1006-1005-1004-1003-1070, 1002-1003-1070, 1006-1005-1004-1003-1070, and 1006-1005M-1004M-1003M-1002-1002-1003-1070 according to formulas: 2×2×2×2×2×2×2×1; 2×1; 2××2×1; 2××2×2×2×2×1 that produces 128+32+2+8=170 reverse speeds.

The gear ratios of geometric sequence is created by common ratio $R_1$ in each unit of gear trains of 128 forward speeds as $1-1/R_1$; $1-1/R_1^2$; $1-1/R_1^4$; $1-1/R_1^8$; $1-1/R_1^{16}$; $1-1/R_1^{32}$; $1-1/R_1^{64}$ according gearbox formula. A geometric sequence of last unit transformed to faltering geometric sequence as $R_1^{32}$-$1/R_1^{32}$ is first gear train. Other three gear trains produce only torques. Therefore all gear trains produce 138 torques and 32 overdrive speeds according to six geometric sequences: $R_1$- ... -$R_1^{32}$; $1/R_1$- ... -$1/R_1^{96}$; $1/R_2$- ... -$1/R_2^{32}$; $1/R_3$- ... -$1/R_3^7$; $1/R_4^2$-$1/R_4^5$ are created by four different common ratios.

There are 272+170=442 forward and reverse torques overdrive speeds on 28 gears and 9 shafts for a torque to gears and shafts ratio of 442/(28+9)=1200%. A said close-many-sided compound MDUFEE gearbox family 1000 produces total 272 forward and 170 reverse torques and overdrive speeds for vehicle.

There is design produces 272-144=128 forward torques and overdrive speeds more by 2 gears and 2 shafts more than fifth embodiment shown in FIG. 5 there are 144 gears of forward available from MDUFEE gearbox family 500 of mathematical formula 2×2×2×2×2×3×3.

A MDUFEE gearbox family 1000 at FIG. 10B is shifted by from 6 to 11 general gearshift levers at the manual regime and 3 gearshift levers at the semi-automatic regime.

Figure 11:
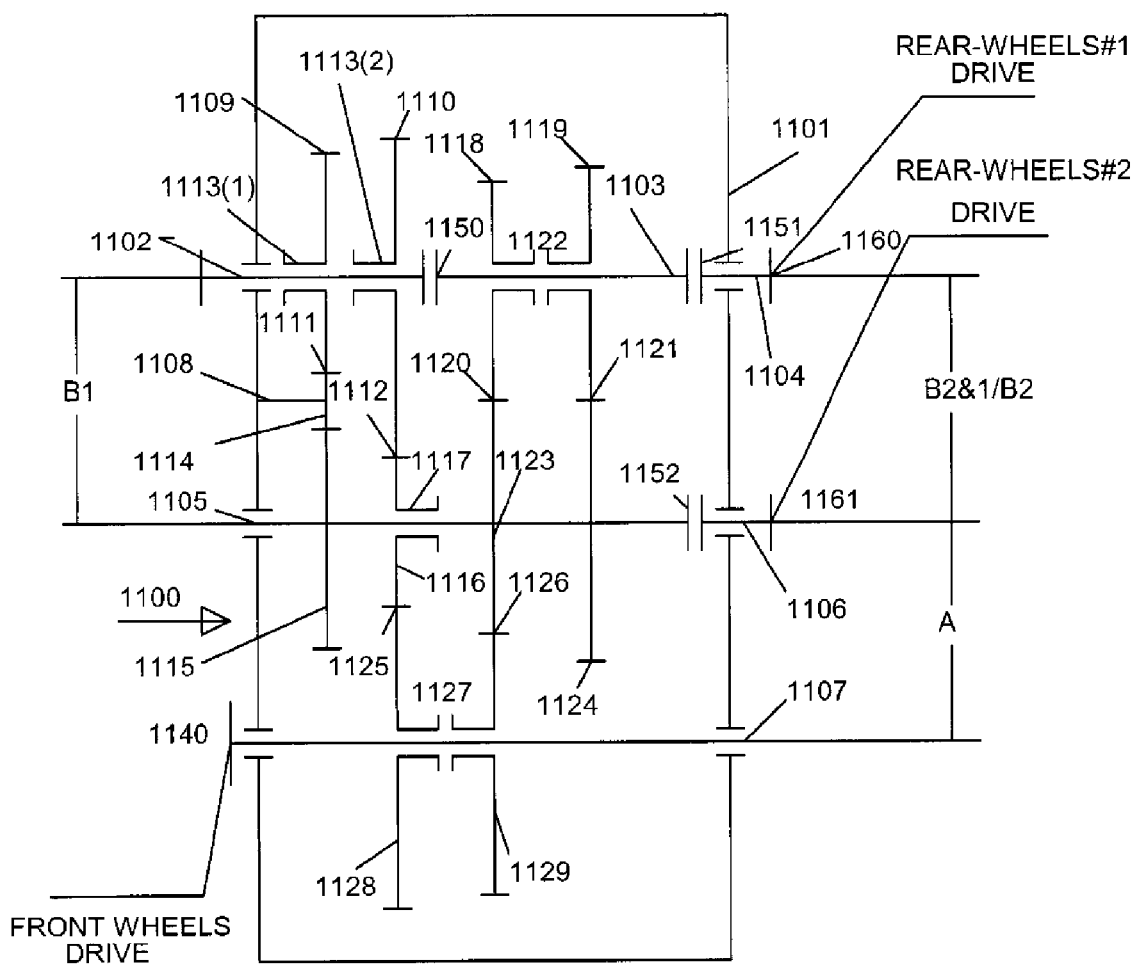
FIG. 11 is diagram the (1+2)+(2×2+2) MDUFEE gearbox family produces 10 forward (3 overdrive and 3 direct speeds) and 7 reverse speeds including 6 forward and 2 reverse overdrive speeds for the front-wheels drive, 3 forward, 1 direct and 2 reverse overdrive speeds for the first pair of rear wheels, and one forward and 3 reverse speeds for the second pair of rear-wheels and direct speed of 3 four-wheels and six or all wheels drive by 6 shafts and 11 gears.

The eleventh embodiment, shown in FIG. 11, produces less forward and reverse speeds shown in FIG. 7. However, compound MDUFEE gearbox family 1100 drives three output shafts and general reverse mechanism is eliminated. It has additional two split shafts and 2 gears less (11 gears). However, compound MDUFEE gearbox family 1100 produces 3 reverse more and 3 forward less but it has design providing simultaneously rotation of three output shafts with the same speed. A MDUFEE gearbox family 1100 produces 10 forward (3 overdrive and 3 direct speeds) and 7 reverse speeds including 6 forward and 2 reverse overdrive speeds for the front-wheels drive, 3 forward, 1 direct and 2 reverse overdrive speeds for the first rear-wheels, and one forward and 3 reverse speeds for the second rear-wheels and direct speed for all rear wheels, front and rear #1 wheels, front and rear #2 wheels, all wheels by 6 shafts and 11 gears according to mathematical gearbox formula (1+2)+(2×2+2)+1 in order.

The MDUFEE gearbox family 1100 has frame members 1101 supporting three gear trains with three output shafts connected to front, two pair of rear wheels by pinions 1140, 1160 and 1161. The frame members 1101 comprises input split shaft 1102 joined to intermediate split shaft 1103 by clutch 1150 then it joined to first output split shaft 1104 by clutch 1151. Other way, an input split shaft 1102 connected by two gearsets 1110 and 1111 with two single synchronizer clutches 1112 and 1113 to the intermediate split shaft 1105 joined to second output split shaft 1106 by clutch 1152. A gearset 1110 has pinion 1108 is meshed to reverse pinion 1114 that meshed to gear 1115 fixed to the intermediate split shaft 1105. A gearset 1111 has pinion 1109 is meshed to gear 1116 free rotated and it is fixed to the intermediate split shaft 1105 by single synchronizer clutch 1117. An intermediate split shaft 1103 also connected by two gearsets 1120 and 1121 with double synchronizer clutch 1122 to intermediate split shaft 1105.

A intermediate split shaft 1105 connected by two gearsets 1125 and 1126 with double synchronizer clutch 1127 to the third output shaft 1107 joined to front wheels by pinion 1140.

The first output split shaft 1104 connected to the first pair of rear wheels by the pinion 1160, second output split shaft 1106 connected to the second pair of rear wheels by the pinion 1161. Power enters to left side of the MDUFEE gearbox family 1100.

It Drives the Front Wheels by Pinion 1140

The input split shaft 1102 passes through two single synchronizer clutches 1112 and 1113 with pinions 1108 and 1109 which may be selected. When pinion 1108 is selected, it engages drive split shaft 1102, and engages and turns reverse gear 1114. Then reverse gear 1114 turns gear 1115 fixed to intermediate shaft 1105 to form gearset 1110 with a chosen ratio of 1.

When pinion 1109 is selected, it engages drive split shaft 1102, and engages and turns gear 1116 free rotated on intermediate shaft 1105 to form gearset 1111 with a chosen ratio of $R^2$. Gearset 1110 and 1111 connects input split shaft 1102 and intermediate shaft 1105 formed unit B1 of two gearsets.

An input split shaft 1102 joined to intermediate split shaft 1103 by clutch 1150. When gear 1118 is selected it engages intermediate split shaft 1103 by synchronizer clutch 1122, and meshed 1123 engages and turns an intermediate split shaft 1205 to form gearset 1120 with a ratio of $1/R^2$. When gear 1119 is selected it engages intermediate split shaft 1103 by double synchronizer clutch 1122, and meshed 1124 engages and turns an intermediate split shaft 1105 to form gearset 1121 with a ratio of $1/R^4$. Gearsets 1120 and 1121 are unit B2 of gearsets is between intermediate split shaft 1104 and intermediate split shaft 1105.

Then an intermediate split shaft 1105 turns third output shaft 1107 at a rate of 1 to 1 in reverse, and three forward 1 to $1/R^2$, 1 to $1/R^4$, and 1 to $R^2$ When gear 1128 is selected and fixed by double synchronizer clutch 1127 it engages third output shaft 1107, and join pinion 1116 free rotated on intermediate shaft 1105 engages and turns it to form gearset 1125 with a ratio of $1/R^2$. When gear 1129 is selected and fixed by it engages third output shaft 1207, and pinion 1123 on intermediate shaft 1105 engages and turns it to form gearset 1126 with a ratio of $1/R$. Gearsets 1125 and 1126 are unit A of gearsets is between intermediate shaft 1105 and third output shaft 1107. A third output shaft 1107 has six forward and two reverse speeds.

It Drives the First Rear Wheels

An input split shaft 1102 joined to intermediate split shaft 1103 by clutch 1150 then it joined to first output split shaft 1104 by clutch 1151. It is direct speed.

When pinion 1108 is selected, it engages drive split shaft 1102, and engages and turns reverse gear 1114. Then reverse gear 1114 turns gear 1115 fixed to intermediate shaft 1105 to form gearset 1110 with a chosen ratio of 1.

When pinion 1109 is selected, it engages output split shaft 1102, and engages and turns gear 1116 that fixed to intermediate shaft 1105 by single synchronizer clutch 1117 to form gearset 1111 with a chosen ratio of $R^2$. Gearset 1110 and 1111 connects input split shaft 1102 and intermediate shaft 1105 formed unit B1 of two gearsets.

When pinions 1118 or 1119 is selected, it engages intermediate split shaft 1103 by double synchronizer clutch 1122, and intermediate split shaft 1105 engages and turns it by fixed gears 1123 and 1124 and to form gearsets 1120' and 1121' with inverse gear ratios $R^2$ and $R^4$. Gearsets 1120' and 1121' connect intermediate split shaft 1103 and intermediate split shaft 1105 formed unit 1/B2 of two gearsets. The first output split shaft 1104 has two forward and two reverse speeds.

It Drives the Second Rear Wheels

An input split shaft 1102 connected by two gearsets 1110 and 1111 with two single synchronizer clutches 1112 and 1113 to the intermediate split shaft 1105 joined to second output split shaft 1106 by clutch 1152. A gearset 1110 included reverse pinion 1114. An intermediate split shaft 1103 also connected by two gearsets 1120 and 1121 with double synchronizer clutch 1122 to intermediate split shaft 1105.

An input split shaft 1102 joined to intermediate split shaft 1103 by clutch 1150. When gear 1118 is selected it engages intermediate split shaft 1103 by synchronizer clutch 1122, and meshed 1123 engages and turns an intermediate split shaft 1105 to form gearset 1120 with a ratio of $1/R^2$. When gear 1119 is selected it engages intermediate split shaft 1103 by synchronizer clutch 1122, and meshed 1124 engages and turns an intermediate split shaft 1105 to form gearset 1121 with a ratio of $1/R^4$. Gearsets 1120 and 1121 are unit B2 of gearsets is between intermediate split shaft 1104 and intermediate split shaft 1105.

The second output split shaft 1104 has one forward and three reverse speeds.

It Drives the Both Rear Wheels

An input split shaft 1102 joined to intermediate split shaft 1103 by clutch 1150 then it joined to first output split shaft 1104 by clutch 1151. It is direct speed.

The pinion 1108 when it is selected and engages drive output shaft 1102, and engaged and turns reverse gear 1114 meshed to gear 1115 that fixed to intermediate split shaft 1105 joined by clutch 1152 to second output split shaft 1106 connected to second pair of rear wheels. It is direct speed of the both rear wheels

It Drives the Front and First Rear Wheels

An input split shaft 1102 joined to intermediate split shaft 1103 by clutch 1150 then it joined to first output split shaft 1104 by clutch 1151 connected to first pair of rear wheels.

When pinion 1109 is selected, it engages drive split shaft 1102, and engages and turns gear 1116 on intermediate shaft 1104 to form gearset 1111 with chosen ratio of $R^2$.

When gear 1128 is selected, it engages third output shaft 1107, and join pinion 1116 free rotated on intermediate shaft 1105 engages and turns it to form gearset 1125 with a ratio of $1/R^2$. It is direct speed of the front and first rear wheels.

It Drives the Front and Second Rear Wheels

When pinion 1108 is selected, it engages drive split shaft 1102, and engages and turns reverse gear 1114. Then reverse gear 1114 reverse turns gear 1115 fixed to intermediate shaft 1105 to form gearset 1110 with a chosen ratio of 1. Intermediate shaft 1105 is joined to second output split shaft 1106 connected to second pair of rear wheels When pinion 1109 is selected, it engages drive split shaft 1102, and engages and turns gear 1116 free rotated on intermediate shaft 1104 with to form gearset 1111 with chosen ratio of $R^2$.

When gear 1128 is selected, it engages third output shaft 1107, and pinion 1116 free rotated on intermediate shaft 1105 engages and turns it to form gearset 1125 with a ratio of $1/R^2$.

It is direct speed of the front and second rear wheels.

It Drives the all Wheels

An input split shaft 1102 joined to intermediate split shaft 1103 by clutch 1150 then it joined to first output split shaft 1104 by clutch 1151 connected to first pair of rear wheels.

When pinion 1108 is selected, it engages drive split shaft 1102, and engages and turns reverse gear 1114. Then reverse gear 1114 reverse turns gear 1115 fixed to intermediate shaft 1105 to form gearset 1110 with a chosen ratio of 1. Intermediate shaft 1105 is joined to second output split shaft 1106 connected to second pair of rear wheels When pinion 1109 is selected, it engages drive split shaft 1102, and engages and turns gear 1116 on intermediate shaft 1104 to form gearset 1111 with chosen ratio of $R^2$.

When gear 1128 is selected, it engages third output shaft 1207, and pinion 1116 with single synchronizer clutch 1117 on intermediate shaft 1105 engages and turns it to form gearset 1125 with a ratio of $1/R^2$.

In addition, it is direct speed of the front and both rear wheels. When the various clutches are selected to operate the various combinations of gears in MDU gearbox 1100, ten forward and seven reverse speeds may be selected from four units A, B1, B2, and 1/B2 respectively.

There are 17 torques on 11 gears and 6 shafts for a torque to gears and shafts ratio of $17/(11+6)=100\%$. The table in FIG. 11A shows the combinations of pinions selected at the clutches to yield the 10 forward and 7 reverse speeds including 3 direct forward speed, 3 forward and 3 reverse overdrive speeds. The front-wheels has 6 forward and 2 reverse speeds, the first rear wheels 2 forward, direct and 2 reverse speeds, and the second rear-wheels one forward and 3 reverse speeds and three 4×4 of direct forward and one 4×4 reverse speed and 6×6 of direct forward speed by 6 shafts and 11 gears. The speeds can be calculated from the combinations of degrees of common ratios of the gears and pinions.

As shown the table in FIG. 11B the combinations of gears yield two ratios of gearsets from the of two possibilities $1/R$ and $1/R^2$ in unit A, two ratios of gearsets from the of two possibilities 1 and $R^2$ in unit B1, two ratios of gearsets from the of two possibilities $1/R^2$ and $1/R^2$ in unit B2, two ratios of gearsets from the of two possibilities $R^2$ and $R^4$ in unit 1/B2 for a total faltering geometric sequence R, 1, $1/R^3$, $1/R^4$, $1/R^5$, and $1/R^6$ of 6 forward and $1/R$ and $1/R^2$ of 2 reverse speeds for front wheels; $R^4$, $R^6$, and direct of three forward speeds and $R^2$, $R^4$ of 2 reverse overdrive speeds for the first rear wheels; direct forward speed of 1 and $R^2$, $1/R^2$, $1/R^4$ of 3 reverse speeds is for second rear wheels; and three 4×4 of direct forward and one 4×4 reverse speed and 6×6 of direct forward speed.

A MDUFEE gearbox family 1100 is shifted by from 5 to 7 general gearshift levers at the manual regime and 2 gearshift levers at the semi-automatic regime.

Figure 12A:
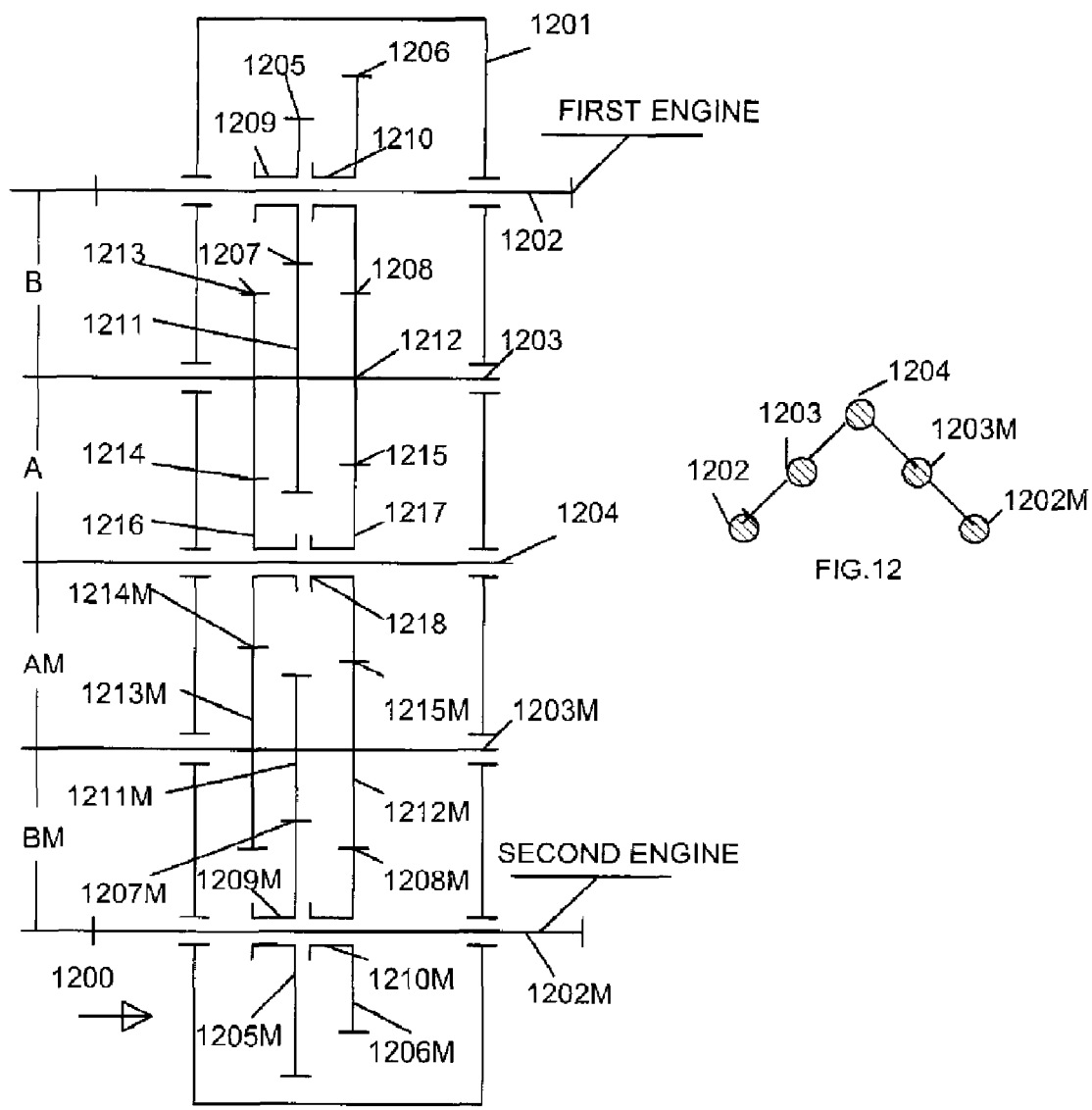

In a twelfth embodiment, shown in FIGS. 12 and 12A, the gearbox is from a compound MDU FEE gearbox family 1200 of said mirror-range type. It is different from the eighth embodiment, shown in FIGS. 8 and 8A, because it has two drive shafts and one output shaft. This design is unusual than other so that two drive shafts extended from general output shaft in both sides by two intermediate shafts supported gearsets with the same gear ratios as will.

A compound MDU FEE gearbox family 1200 has design such that from one general output shaft extended two independent gear trains in the same frame of members 1201 or two the same frames of members 1201 and 1201M (no showed). Each gear train has a mathematical MDU gearbox formula of 2×2. A frame member 1201 supporting two drive shafts 1202 and 1202M, two intermediate shaft 1203 and 1203M, and general output shaft 1204 with two gear trains as two MDU FEE gearbox designs (FIG. 12 A).

Two powers enter to left side of the MDUFEE gearbox family 1200 on two outward ends 1251, 1251M of two drive shafts 1202, 1202M or on opposed outward end 1252, 1252M if the shaft is turned over for using the opposed side of teeth of gears. The two trains are two drive shafts 1202, 1202M passes through four single synchronizer clutches 1209, 1210 and 1209M, 1210M with four pinions 1205, 1206 and 1205M, 1206M, which may selected. When pinions 1205, 1205M is selected it engages two drive shafts 1202, 1202M and engages and turns gear 1211,1211M on two intermediate shafts 1203, 1203M to form gearset 1207, 1207M with a chosen ratio of $R^{112}$. When pinions 1206,1206M is selected it engages two drive shafts 1202, 1202M and engages and turns gears 1212,1212M on two intermediate shafts 1203, 1203M to form gearset 1208, 1208M with a chosen ratio of $R^{10}$. Four gearsets 1207, 1207M and 1208, 1208M connects two drive shafts 1202, 1202M and two intermediate shafts 1203, 1203M formed two units A and AM of four gearsets.

The pinions 1212,1212M and 1213,1213M fixed to two intermediate shafts 1203, 1203M connected to gears 1216, 1216M and 1217, 1217M supported on double synchronizer clutch 1218. When two gears 1216, 1216M is selected it engages output shaft 1204, and join two pinions 1213,1213M on two intermediate shaft 1203, 1203M engages and turns to form two gearsets 1214, 1214M with a ratio of R. When two gears 1217, 1217M is selected it engages output shaft 1204, and join two pinions 1212,1212M on two intermediate shafts 1203, 1203M engages and turns to form two gearsets 1215, 1215M with a ratio of 1. Gearsets 1214, 1214M and 1215, 1215M are two units B and BM gearsets is between two intermediate shafts 1203, 1203M and output shaft 1204 such that the output shaft 1204 turns at a rate of 1 to 1 and 1 to R.

Both gear trains of MDUFEE gearbox family 1200 produce the geometric sequence of 4 forward overdrive speeds in the same time. There are an each unit has 2 gearsets; one unit of two gearsets could be 1, $1/R^2$ and second unit 1, 1/R gear ratios in the geometric sequence. Then they could transform at will.

Two geometric sequences of two gear ratios B and BM are $R^{10}$, $R^{12}$; two units A and AM are 1, R that form geometric sequence $R^{10}$, $R^{12}$, $R^{13}$ and $R^{14}$ of overdrive speeds. Therefore, power of existing engine could reduce up to $R^{14}$ times.

A MDUFEE gearbox family 1200 is shifted by from 3 to 4 general gearshift levers at the manual regime and 1 gearshift lever at the semi-automatic regime.

Figure 13:
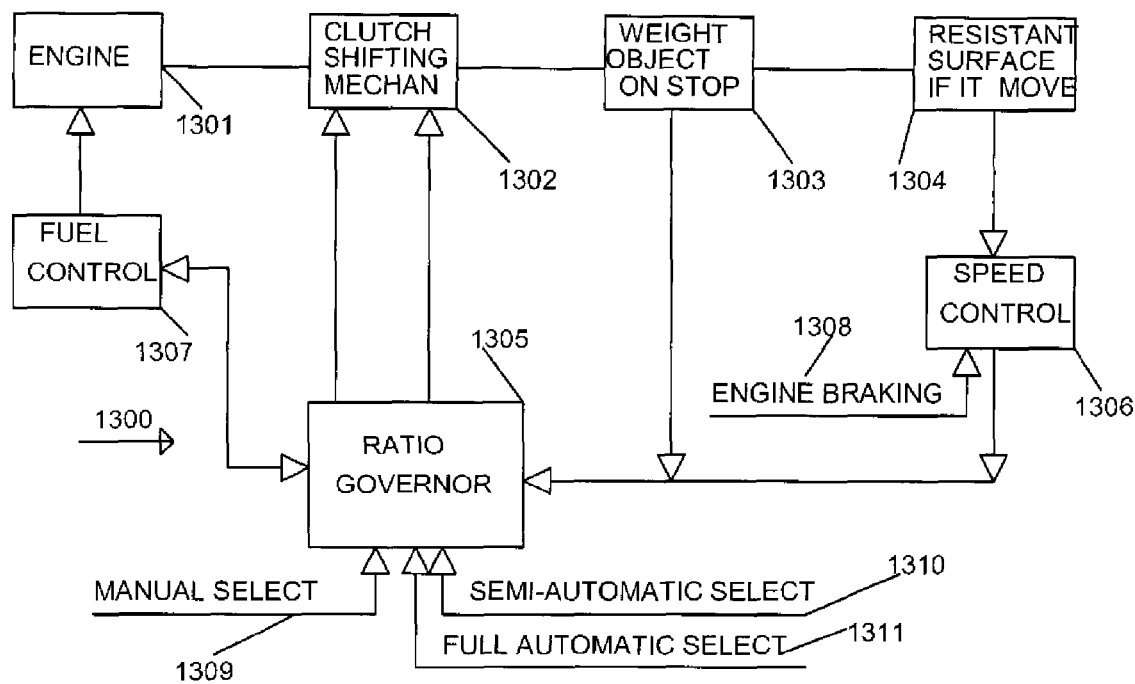
FIG. 13 is diagram of energy economy system included the manual-semi-full-automatic regimes

The thirteenth embodiment, shown in FIG. 13 illustrates the energy economy system 1300 including manual, semi, and full automatic regimes. It comprises power source 1301, clutch and shifting mechanism 1302, weight object 1303 after each stop, resistant force of surface in movement 1304, ratio governor 1305, speed control 1306, energy control 1307, power source braking 1308, and three regimes: manual 1309, semi-automatic 1310, and full automatic 1311.

MDU gearbox family with FEES has two or more shifting levers or push buttons and its number equal or more number of gearset units in manual regime 1309. Operator uses one shifting lever in most times. This mechanical system can switch over to semi-automatic and automatic system. Since each shifting lever has two opposite movements the differential hydraulic or pneumatic cylinders or solenoids with simple movement of electrical system available to shift gear in automatic system that provides at least two independent units of gearsets.

The semi-automatic regime 1310 controls part of the shifting gear levers (buttons). The full automatic regime 1311 available when the hydraulic or pneumatic or electric system automatically cuts power by clutch and moves rods of gear forks by cylinders or electric solenoids according to direction of ratio governor 1305.

The energy economy system 1300 has ratio governor 1305 that shift the need gearset combination in this moment of movement. It get signals from sensor of weight object after each stop 1303, resistant of surface in movement 1304, speed control 1306, fuel control 1307, engine braking 1308, and operator who chooses regime of movement from manual 1309, semi-automatic 1310, and full automatic 1311. Then it selects gearset combination in units and shifts by shifting mechanism with clutch 1302. The sensor of object weight defines and gives signal on each stop of object and turns off if object is in movement.

I claim:

1. A motorized machine, comprising,
   at least one motor in communication with a source of energy and comprising an internal acceleration system,
   at least one drive shaft connected to the motor, and
   a gear box connected by at least one drive shaft to the motor, comprising,
   at least two independent shafts,
   at least one output shaft, and
   a sufficient number of gearsets with gear ratios selected from a faltering geometric sequence and arranged to provide a sufficient number of torques and overdrive speeds to the output shaft to satisfactorily operate the machine over a conventional range of machine speeds and at least limit the use of the acceleration system in the motor to reduce the heat and power generated from the motor to less than 50 percent that used to generate a similar conventional range of machine speeds using a motor with a conventional gear box.

2. The motorized machine of claim 1 wherein the motor does not contain the acceleration system to change the torque and speed of the drive shaft as it enters the gear box and power generated is less than 25 percent that of a motor with the acceleration system in communication with the drive shaft of a conventional gear box.

3. The motorized machine of claim 1, comprising,
   a plurality of gears forming gearsets configured so that at least two adjoining shafts may also work as drive and output shafts having at least two gearsets having gear ratios in at least two geometric sequences created by direct and inverse common ratios in degrees of separation of the common ratio as will achieve a number of overdrive speeds and torques from gearsets arranged in at least one faltering geometric sequence,
   wherein, the degrees of separation of the common ratio for each pair of adjoining shafts are determined in a first step by the formation of a geometric sequence with the common ratio in direct degree, in a second step by the partial transformation of the sequence to form a geometric sequence with the common ratio in inverse degree and in a third step by the creation of at least one faltering geometric sequence,
   wherein, the first step includes the determination of the degree of separation of the common ratio as equal to one of the common ratios in the first chosen pair of shafts or unit A, the degree the separation of the common ratio in the second pair of shafts or unit B as equal to the product of the degree of the first pair and the chosen number of gearsets in the first pair of shafts or unit A, the degree of separation of the common ratio of the third pair of shafts or unit C as a product of the number of gearsets in second pair of shafts or unit B and the degree of separation of the common ratio of the second pair of shafts or unit B, and each subsequent pair of shafts or units as a product of the previous numbers of gearsets in the previous pair of shafts or unit and the degree of separation of that pair until all common ratio degrees for the gearsets are known in all shaft pairs or all units,
   wherein, the second step provides the transformation of the geometric sequence with direct common ratio magnitude of at least two adjoining shafts so that there will be at least one geometric sequences having direct and inverse common ratio magnitudes, and,
   wherein, the third step provides the transformation of at least one geometric sequence so that the gear ratio equal to one is eliminated and the interruption is increased between the highest overdrive speed and the highest torque to reduce the total number of gears and shafts in the design of the machine from that arrived at before this step.

4. The motorized machine of claim 3 wherein the gear box, further comprises,
   a gearbox family of 8×8, comprising,
   a plurality of gears forming gearsets, each gearset including at least one shaft extending from the gearset, wherein at least one gearset has ratio magnitude more than one to form second geometric sequence of inverse common ratio R in at least one pair of shafts, wherein the gearbox includes no more than 35, 33, 31, 29, 27, 25, 23, 21, 19, 16, 15, 13, and 11 gears and the gearsets are configured to form the gearbox that comprises 64, 56, 49, 42, 36, 30, 25, 20, 16, 12, 9, 6, and 4 forward and 8, 7, 7, 6, 6, 5, 5, 4, 4, 3, 3, 2, and 2 reverse speeds, and 16, 16, 14, 14, 12, 12, 10, 10, 8, 8, 6, 3, and 2 forward overdrive speeds.

5. The motorized machine of claim 3 wherein the gear box, further comprises,
   a gearbox family of 4×4×6, comprising,
   a plurality of gears forming gearsets, each gearset including at least one shaft extending from the gearset, wherein at least one gearset has ratio magnitude more than one to form second geometric sequence of inverse common ratio R in at least one pair of shafts,
   wherein the gearbox includes no more than 31, 29, 27, 25, 23, 21, 19, 17, and 15 gears and four shafts and the gearsets are configured to form the gearbox that comprise 96, 80, 64, 48, 36, 27, 18, 12, and 8 forward speeds and 48, 40, 32, 24, 18, 14, 9, 6, and 4 forward overdrive speeds.

6. The motorized machine of claim 3 wherein the gear box, further comprises,
   a gearbox family of 3×3×3×4, comprising,
   a plurality of gears forming gearsets, each gearset including at least one shaft extending from the gearset, wherein at least one gearset has ratio magnitude more than one to form second geometric sequence of inverse common ratio R in at least one pair of shafts, wherein the gearbox includes no more than 29, 27, 25, 23, 21, and 19 gears and five shafts and the gearsets are configured to form the gearbox that comprises 108, 81, 54, 36, 24, and 16 forward and 27, 27, 18, 12, 8, and 8 reverse speeds, and 36, 27, 13, 9, 8, 6, and 4 forward overdrive speeds.

7. The motorized machine of claim 3 wherein the gear box, further comprises, a gearbox family of 2×2×3×3×3, comprising,
a plurality of gears forming gearsets, each gearset including at least one shaft extending from the gearset, wherein at least one gearset has ratio magnitude more than one to form second geometric sequence of inverse common ratio R in at least one pair of shafts,
wherein the gearbox includes no more than 29, 27, 25, and 23 gears and six shafts and the gearsets are configured to form the gearbox that comprises 108, 72, 54, and 32 forward and 36, 36, 27, 18, and 16 reverse speeds, and 54, 36, 27, and 16 speed forward overdrive speeds.

8. The motorized machine of claim 3 wherein the gear box, further comprises,
a gearbox family of 2×2×2×2×3×3, comprising,
a plurality of gears forming gearsets, each gearset including at least one shaft extending from the gearset, wherein at least one gearset has ratio magnitude more than one to form second geometric sequence of inverse common ratio R in at least one pair of shafts, wherein the gearbox includes no more than 31, 29, and 27 gears and seven shafts and the gearsets are configured to form the gearbox that comprises 144, 96, and 64 forward and 72, 48, and 32 reverse speeds, and 36, 24, and 16 forward overdrive speeds.

9. The motorized machine of claim 1 wherein the gearbox, further comprises,
a plurality of gearsets forming separated gear trains of at least an open or closed type and supported by at least two independent shafts, the gear trains in combination including at least one general drive shaft and at least two output shafts, and at least one gear train has at least a pair of shafts with a gearset that has a ratio magnitude of more than one to form a second geometric sequence with an inverse common ratio for at least one pair overdrive speed,
wherein, the degrees of separation of the common ratio for each pair of shafts is determined for at least one faltering geometric sequence by selecting a degree of separation of the common ratio of other than one for the first pair of shafts or Unit A, multiplying the degree of separation of the common ratio for the first pair of shafts or unit A by its chosen number of gearsets to obtain the degree of separation of the common ratio in the second pair of shafts or unit B, then multiplying the chosen number of gearsets between a second pair of shafts or unit B by its degree separation of the common ratio to form the degree of separation of the common ratio of the third pair of shafts or unit C, and repeating that for each successive pair of shafts until the degrees of separation of the common ratio for all shaft pairs are known,
wherein at least one geometric sequence of a unit transforms into a faltering geometric sequence for the determination of the number of gearset ratios having a magnitude of more than one, and
wherein, two geometric sequences in separation are multiplied by direct and inverse common ratio in degrees for the determination of faltering geometric sequence so that the interruption between least overdrive speed magnitude and least torque magnitude will be maximum for getting opportunity to save additional numbers of gears and shafts when the highest speed magnitude and highest torque magnitude are created in machine design to shift gearsets of a unit that uses at least one gearshift levers or button in a manual regime that is changeable to semi-automatic and automatic regimes under circumstances that depend on conditions of work.

10. The motorized machine of claim 9 wherein the drive shaft is a split drive shaft and wherein the gearbox, further comprises,
a gearbox family of 8×8+1, comprising,
at least one intermediate shaft that is an output shaft having an opposite rotation to the rotation of the output split shaft that is joined by a clutch to the drive split shaft that is first connected to the intermediate shaft.

11. The motorized machine of claim 9, wherein the gearbox, further comprises,
a gearbox family of (1+2×2)+(2×2+2×2), comprising,
at least two output shafts have the same rotations is provided by addition at least one parallel intermediate shaft is connected to at least one output shaft supported a general unit having gearset ratios, which calculated with gearset ratios of two gear trains arranged with separated calculation of gear ratios in each unit in parallel .

12. The motorized machine of claim 11, wherein the gearbox, further comprises,
a gearbox family of (1+2×2)+(2×2+2×2), comprising,
a combination gear ratios in each unit arranged such that at least two output shaft have at least two the same forward rotations 13. The motorized machine of claim 9, wherein the gearbox, further comprises,
a gearbox family of (1+2×2)+(2×2×2×2+2×2), comprising,
a drive split shaft is joined to two intermediate split shafts that are joined to first and second output split shafts by clutches and one intermediate split shaft is connected to at least one output shaft by at least intermediate shaft supported two gear trains arranged with separated calculation of gear ratios in each unit to series 14. The motorized machine of claim 13, wherein the gearbox, further comprises,
a gearbox family of 1+2+2+(2×2), comprising,
a gear ratio faltering geometric sequence of each pair of shafts or the units calculated such that it has three pairs of output shafts and all output shafts have the same speed for a temporary time.

15. The motorized machine of claim 9, wherein the gearbox, further comprises,
a gearbox family of (2×2+2×2) or 2×2, comprising,
a general input shaft extended to output shafts in opposite sides by at least one parallel intermediate shaft supported gearsets with independent calculated gear ratios for one pair of output shafts such that at least one output shaft of gear train is turned simultaneously with output shaft of other gear train.

16. The motorized machine of claim 9, wherein the gearbox, further comprises,
a gearbox family of, comprising,
a general input shaft extended to at least two opposite sides of output shafts such that at least one output shaft of side is turned simultaneously with output shaft of other side in horizontal flatness of operation in water and air.

17. The motorized machine of claim 9, wherein the gearbox, further comprise,
a gearbox family, comprising,
at least two general input shafts extended to plurality of output shafts to create closed plurality of sides of intermediate shafts such that at least one output shaft of side is turned simultaneously with output shaft of other side in horizontal flatness of operation in water and air.

18. The motorized machine of claim 9, wherein the gearbox, further comprises, a gearbox family of 2(2×2×2×2×2×2×2)+2(2x2x2), comprising, at least two general input shafts extended by at least two intermediate shafts to at least output shaft is created such that it connects to closed plurality of sides that formed gearbox for forward and reverse torques and overdrive speeds.

19. The motorized machine of claim 9, wherein the gearbox, further comprises, a gearbox family of 2×2, comprising, at least two drive shafts connected to one output general shaft 20. The motorized machine of claim 9, wherein the automatic system has been used by generator of the wind energy technology to improve efficiency of permanent electricity production when the force of wind goes up or down.

21. The motorized machine of claim 9, wherein the automatic system has been used by conveyer for timely shifts needed gear according to changeable weight of the loads in the movement process.

22. The motorized machine of claim 9, wherein at least one part comprises chemical or non-metal material.

23. A motorized machine, comprising, at least one motor that does not comprise an acceleration system to change the torque and speed of its drive shaft and a gearbox connected by at least one drive shaft to the motor, comprising, at least two independent shafts, at least one output shaft, and a sufficient number of gearsets with gear ratios selected from a faltering geometric sequence and arranged to provide a sufficient number of torques and overdrive speeds to the output shaft to satisfactorily operate the machine over a conventional range of machine speeds and without the use of an acceleration system within the motor to reduce the heat and power generated from the motor to less than 25 percent of that used to generate a similar conventional range of machine speeds using the motors with the acceleration system and a conventional gearbox.

24. The motorized machine of claim 23, wherein the motorized machine may be land-based, sea-based or air-based.

* * * * *